United States Patent
Reiner et al.

(10) Patent No.: US 6,816,854 B2
(45) Date of Patent: *Nov. 9, 2004

(54) METHOD AND APPARATUS FOR DATABASE QUERY DECOMPOSITION

(75) Inventors: David Reiner, Lexington, MA (US); Jeffrey M. Miller, Lexington, MA (US); David C. Wheat, Grafton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 09/877,427

(22) Filed: Jun. 8, 2001

(65) Prior Publication Data

US 2002/0032676 A1 Mar. 14, 2002

Related U.S. Application Data

(60) Continuation of application No. 08/791,898, filed on Jan. 31, 1997, now Pat. No. 6,289,334, which is a division of application No. 08/189,497, filed on Jan. 31, 1994, now Pat. No. 5,742,806.

(51) Int. Cl.[7] .............................................. G06F 17/30
(52) U.S. Cl. ............................ 707/3; 707/10; 707/102
(58) Field of Search .......................... 707/2, 3, 10, 102

(56) References Cited

U.S. PATENT DOCUMENTS

| 4,870,568 | A |   | 9/1989  | Kahle et al.    |         |
|-----------|---|---|---------|-----------------|---------|
| 4,876,643 | A |   | 10/1989 | McNeill et al.  |         |
| 5,325,525 | A |   | 6/1994  | Shan et al.     |         |
| 5,367,675 | A |   | 11/1994 | Cheng et al.    |         |
| 5,437,032 | A | * | 7/1995  | Wolf et al.     | 709/103 |
| 5,446,885 | A |   | 8/1995  | Moore et al.    |         |
| 5,495,606 | A | * | 2/1996  | Borden et al.   | 707/3   |
| 5,548,770 | A |   | 8/1996  | Bridges         |         |
| 5,590,319 | A |   | 12/1996 | Cohen et al.    |         |
| 5,742,806 | A |   | 4/1998  | Reiner et al.   |         |
| 5,765,146 | A | * | 6/1998  | Wolf et al.     | 707/2   |
| 6,289,334 | B1|   | 9/2001  | Reiner et al.   |         |

* cited by examiner

*Primary Examiner*—Jean R. Homere
(74) *Attorney, Agent, or Firm*—Meyertons Hood Kivlin Kowert & Goetzel, P.C.; Rory D. Rankin; B. Noël Kivlin

(57) ABSTRACT

An improved system for database query processing by means of "query decomposition" intercepts database queries prior to processing by a database management system ("DBMS"). The system decomposes at least selected queries to generate multiple subqueries for application, in parallel, to the DBMS, in lieu of the intercepted query. Responses by the DBMS to the subqueries are assembled by the system to generate a final response. The system also provides improved methods and apparatus for storage and retrieval of records from a database utilizing the DBMS's cluster storage and index retrieval facilitates, in combination with a smaller-than-usual hash bucket size.

26 Claims, 17 Drawing Sheets

METHOD AND APPARATUS FOR DATABASE QUERY DECOMPOSITION

This application is a continuation of U.S. patent application Ser. No. 08/791,898, filed Jan. 31, 1997 now U.S. Pat. No. 6,289,334, which is a divisional application of U.S. application Ser. No. 08/189,497, filed Jan. 31, 1994, now U.S. Pat. No. 5,742,806, issued Apr. 21, 1998.

REFERENCE TO APPENDICES

The disclosure of this patent document contains material which is subject to copyright protection. The owner thereof has no objection to facsimile reproduction by anyone of the patent document or the patent disclosure, as it appears in the U.S. Patent and Trademark Office patent file or records, but otherwise reserves all copyright whatsoever.

BACKGROUND OF THE INVENTION

This invention relates to digital data processing and, more particularly, to methods and apparatus for database management systems on multiprocessor digital data processing systems.

In addition to performing calculations, computers have traditionally been used to store and retrieve large amounts of data. Early computer systems were typically programmed for this on an ad hoc basis. For example, to track a company's employees, a program was typically written to handle all steps necessary to input, sort and store employee data in a computer file and, as necessary, to retrieve and collate it to generate reports. Special-purpose software packages, referred to as database management systems (or "DBMS's"), were later developed to handle all but the highest-level of these tasks.

Among the most widely used database management systems are the so-called relational systems. From an operator's perspective, these store data in two-dimensional tables. For example, each row (or record) of an employee data table might include the following columns (or fields) of information: name of an employee, his or her identification number, address, and department number.

| . | . | . | . |
|---|---|---|---|
| . | . | . | . |
| . | . | . | . |
| Smith | 1056 | 5 Oak Avenue | 10 |
| James | 1058 | 3 State Street | 41 |
| Wright | 1059 | 15 Main Street | 25 |
| . | . | . | . |
| . | . | . | . |
| . | . | . | . |

One or more indexes on large tables are generally provided to facilitate the most common data accesses, e.g., look-ups based on employee name.

In relational systems, corresponding rows in two or more tables are identified by matching data values in one or more columns. For example, the department name corresponding to a given employee may be identified by matching his or her department number to a row in a department data table that gives department numbers and department names. This is in contrast to hierarchical, network, and other DBMS's that use pointers instead of data values to indicate corresponding rows when tables are combined, or "joined."

Relational DBMS's typically permit the operator to access information in the database via a query. This is a command that specifies which data fields (columns) are to be retrieved from a database table and which records (rows) those fields are to be selected from. For example, a query for the names of all employees in department 10 might be fashioned as follows:

SELECT name, department_number
FROM employee
WHERE department_number=10

There is no particular ordering of the resulting rows retrieved by the DBMS, unless the query specifies an ordering (e.g., ORDER BY name).

A query may also involve multiple tables. For example, to retrieve department names instead of numbers, the above query might be refashioned as follows:

SELECT name, department_name
FROM employee, department
WHERE department_number=10
AND employee.department_number=department.department_number A particular relational data table need not be stored in a single computer file but, rather, can be partitioned among many files. This makes such tables particularly suited for use on multiprocessor computer systems, i.e., computer systems having multiple processors and multiple disk drives (or other storage devices) of the type disclosed in U.S. Pat. No. 5,055,999. Unfortunately, prior art DBMS's have not proven capable of taking full advantage of the power of such multiprocessing systems and, particularly, their power to simultaneously process data (in parallel) from multiple partitions on multiple storage devices with multiple central processing units.

In view of the foregoing, an object of the invention is to provide improved methods and apparatus for database management and, particularly, improved methods and apparatus for data base management capable of operating on multiprocessor systems.

A further object of the invention is to provide improved systems for database management capable of effectively accessing a relational database contained in multiple tables and multiple partitions.

A still further object is to provide improved methods and apparatus for storing and retrieving data for access by a DBMS.

These and other objects are evident in the attached drawings and the description which follows.

SUMMARY OF THE INVENTION

The foregoing and other objects are attained by the invention which provides, in one aspect, improvements to digital data processors of the type having a database management system (DBMS) that accesses data records stored in a database table contained among plural independently accessible partitions (e.g., data partitions contained on separate disk drives), where that DBMS has a standard interface for processing queries to access those data records.

The improvement is characterized by a parallel interface that intercepts selected queries prior to substantive processing by the standard interface. The standard interface is often called the "server" interface; it is accessed by clients that are the source of queries. A decomposition element within the parallel interface generates multiple subqueries from the intercepted query. Those subqueries, each representing a request for access to data stored in a respective partition of the table, are applied in parallel to the standard interface in lieu of the intercepted query. Responses by the DBMS to the subqueries are reassembled to generate a final response representing the response the DBMS would have generated to the intercepted query signal itself. Such reassembly can include interleaving the data contained in the responses (e.g., to create a single sorted list) or applying an aggregate function (e.g., sum or average) to that data.

According to a further aspect of the invention, the decomposition element generates the subqueries to be substantially identical to the intercepted signal but including an "intersecting predicate" (i.e., additional query conditions) that evaluates true for all data records in respective partitions of said database table and false for all others. This can be, for example, a logically AND'ed condition that evaluates true for records in the respective partition. Continuing the first example above, assuming that the employee database is partitioned randomly across multiple partitions, a subquery for the first partition could be generated as follows (where rowid has three parts, the last of which indicates the partition number):

SELECT name, department_number
    FROM employee
    WHERE department_number=10 AND
    employee.rowid>=0.0.1 AND
    employee.rowid<0.0.2

In another aspect, the invention contemplates a further improvement to a digital data processing system of the type described above, wherein the DBMS responds to selected queries for accessing data records joined from one or more of database tables, and wherein the DBMS includes an optimizer for determining an optimal strategy for applying such queries to the tables. The improvement of this aspect is characterized by an element for identifying, from output of the optimizer, a driving table whose partitions will be targeted by subqueries generated in responding to an intercepted query. The improvement is further characterized by generating the subqueries to include, in addition to the predicate list of the intercepted query, an intersecting predicate for all data records in respective partitions of the driving database table. Those skilled in the art will appreciate that tables referenced in the query other than the driving table need not be identically partitioned to the driving table, nor co-located with its partitions on storage devices. Tables may be accessed through either full-table scans or indexed scans, i.e., whether the DBMS searches all blocks of the relevant partition or only those indicated by a relevant index.

According to another aspect, the invention provides an improvement to a digital data processing system of the type described, wherein the DBMS's standard interface is invoked by a procedure or function call. The improvement is characterized by functionality for invoking the parallel interface in lieu of the client-side portion of the standard interface in response to such a procedure/function call. And, by responding to a query for generating plural subqueries in the form of further procedures/functions to the standard server interface. The parallel interface can form part of an object code library for linking with a computer program including procedures/function calls for invoking the DBMS.

In still another aspect, the invention contemplates an improvement to a digital data processing system as described above, wherein the standard interface normally responds to insert/select queries by placing requested data from the database table means in a further database table (i.e., as opposed to merely printing the requested data or otherwise outputting it in text form or merely returning the data to the requesting program). The improvement of this aspect is characterized by generating the plural subqueries so as to cause the DBMS to place the data requested from each respective partition in the designated database table.

In yet another aspect of the invention, a digital data processing system as described above can include functionality for executing multiple threads, or "lightweight processes," each for applying a respective subquery signal to the DBMS's interface element. Those threads can be executed in parallel on multiple central processing units, and can be serviced by multiple server processes within the DBMS that also execute in parallel.

Further aspects of the invention provide improvements to a digital data processing system of the type having a storage element (e.g., a disk drive or other random-access media) for storing and retrieving data records, as well as a DBMS having (i) a hashing element to effect storage of data records in "hash bucket" regions in the storage element, where each record is stored in a root hash bucket region corresponding to a hash function of a selected value of the data record or, alternatively, to effect storage of data records in an overflow hash bucket region associated with that root hash bucket region; and (2) an indexing element to index each stored data record for direct access in accord with a respective value of that data record.

The improvement is characterized by a scatter cluster retrieval element that responds to a request for accessing a data record previously stored via the hashing element, by invoking the indexing element to retrieve that record in accord with the index value thereof, where stored records have previously been indexed by the indexing element with respect to the same fields (columns) used by the hashing element. In a related aspect of the invention, the hashing element stores the data records in hash bucket regions that are sized so as to create at least one overflow hash bucket region per root bucket region, and such that overflow bucket regions for a given root bucket region are distributed roughly evenly across different storage partitions.

Another aspect of the invention provides a digital data processing system of the type described above, in which plural subcursor buffers are associated with each subquery signal for storing results generated by the DBMS's standard interface means in response to that subquery signal. To assemble all results of those subqueries, a root buffer stores a then-current result, while a fetching element simultaneously assembles a final result signal based upon those results currently stored in selected subcursor buffers. As results are taken from each of those buffers, they are emptied. For each such emptied buffer, a subquery is applied to the standard interface asynchronously with respect to demand for that buffer's contents in assembling the final result. In the case of queries involving aggregates, the root buffer stores then-current results in a temporary table to be queried later by an aggregate query generated by the decomposition element.

In still other aspects, the invention provides a method for digital data processing paralleling the operation of the digital data processing system described above; i.e., "transparent" to the DBMS client other than by improved performance.

BRIEF DESCRIPTION OF THE DRAWINGS

A better appreciation of the invention may be attained by reference to the drawings, in which.

DETAILED DESCRIPTION OF THE ILLUSTRATED EMBODIMENT

Figure 1:
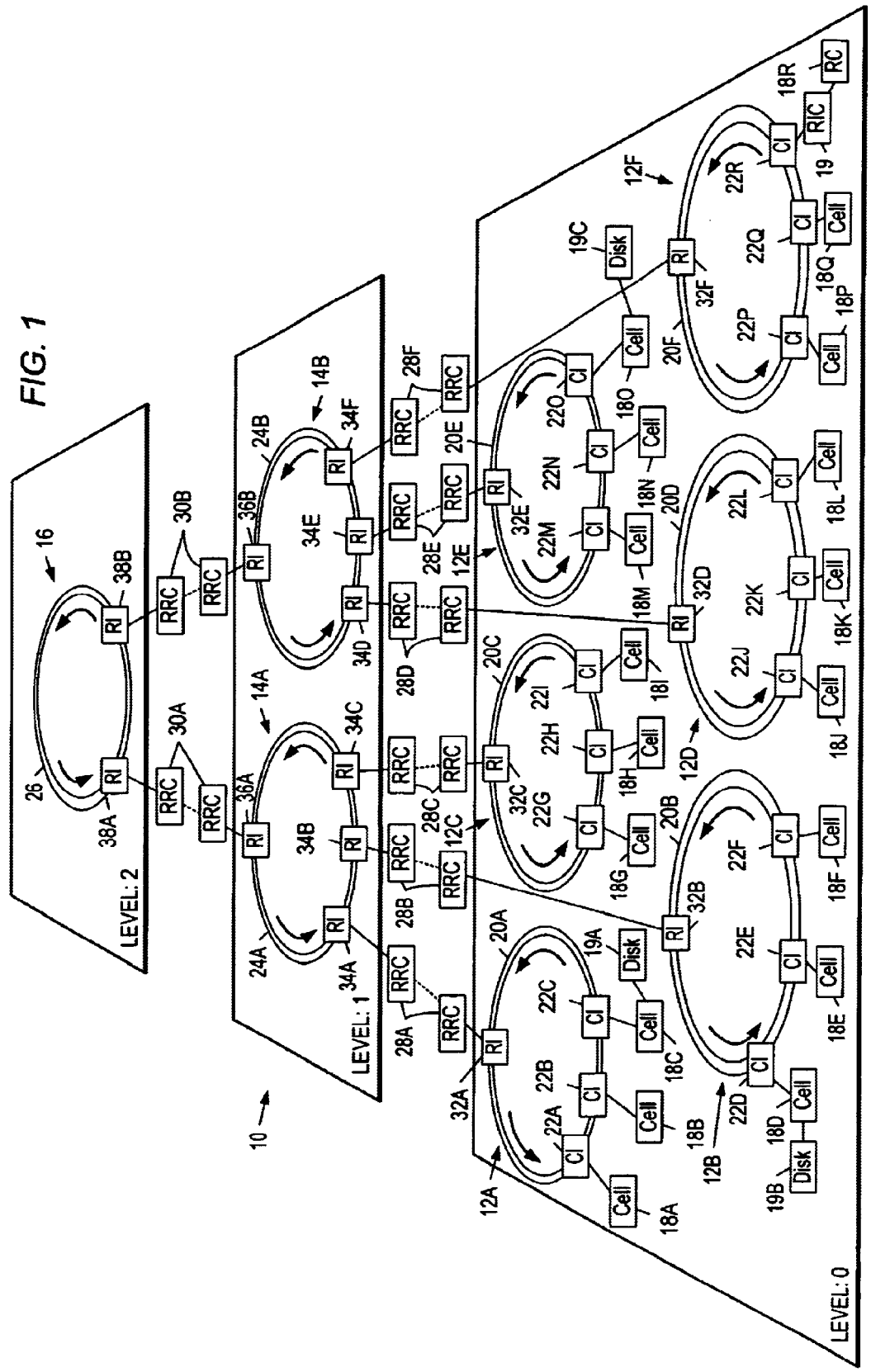
FIG. 1 depicts a preferred multiprocessing system used to practice the invention.

FIG. 1 depicts a preferred multiprocessing system used to practice the invention. The illustrated system 10 includes three information transfer levels: level:0, level:1, and level:2. Each information transfer level includes one or more level segments, characterized by a bus element and a plurality of interface elements. Particularly, level:0 of the illustrated system 10 includes six segments, designated 12A, 12B, 12C, 12D, 12E and 12F, respectively. Similarly, level:1 includes segments 14A and 14B, while level:2 includes segment 16.

Each segment of level:0, i.e., segments 12A, 12B,... 12F, comprise a plurality of processing cells. For example, segment 12A includes cells 18A, 18B and 18C; segment 12B includes cells 18D, 18E and 18F; and so forth. Each of those cells include a central processing unit and a memory element, interconnected along an intracellular processor bus (not shown). In accord with the preferred practice of the invention, the memory element contained in each cells stores all control and data signals used by its associated central processing unit.

Certain cells of the processing system 10 are connected to secondary storage devices. In the illustrated system, for example, cell 18C is coupled with disk drive 19A, cell 18D is coupled with disk drive 19B, and cell 18O is coupled with disk drive 19C. The disk drives 19A–19C are of conventional design and can be selected from any of several commercially available devices. It will be appreciated that secondary storage devices other than disk drives, e.g., tape drives, can also be used to store information.

Figure 2:
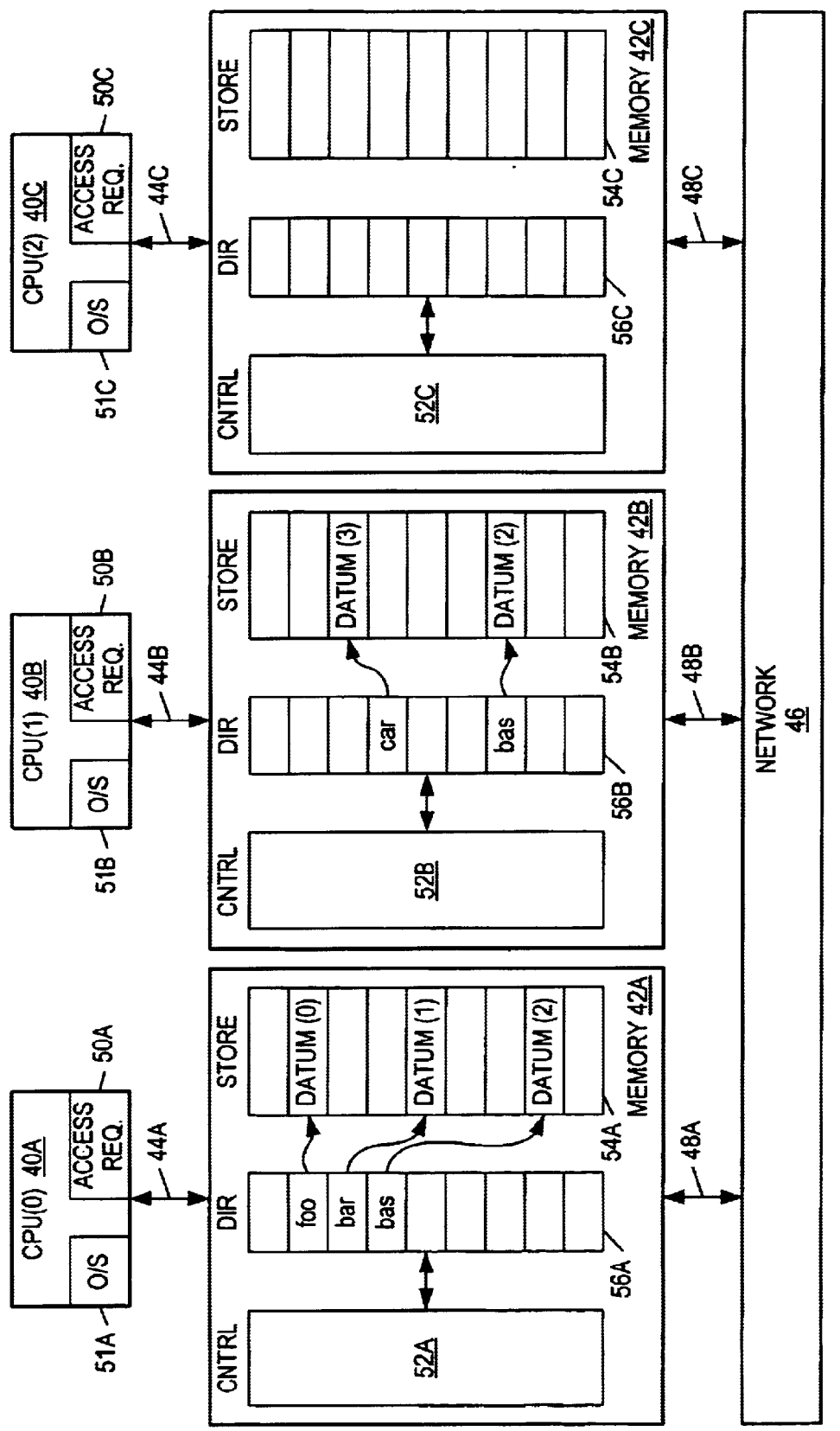
FIG. 2 illustrates in greater detail processing cells and their interconnection within the processing system of FIG. 1.

FIG. 2 illustrates in greater detail processing cells and their interconnection within the processing system of FIG. 1.

In the drawing, plural central processing units 40A, 40B and 40C are coupled, respectively, to associated memory elements 42A, 42B and 42C. Communications between the processing and memory units of each pair are carried along buses 44A, 44B and 44C, as shown. Network 46, representing the aforementioned level segments and routing cells, transfers information packets (passed to the network 46 over buses 48A, 48B and 48C) between the illustrated processing cells 42A–42C.

In the illustrated embodiment, the central processing units 40A, 40B and 40C each include an access request element, labeled 50A, 50B and 50C, respectively. These access request elements generate requests for access to data stored in the memory elements 42A, 42B and 42C. Among access requests signals generated by elements 50A, 50B and 50C is the ownership-request, representing a request for exclusive, modification access to a datum stored in the memory elements. In a preferred embodiment, access request elements 50A, 50B and 50C comprise a subset of an instruction set implemented on CPU's 40A, 40B and 40C. This instruction subset is described below.

The central processing units 40A, 40B, 40C operate under control of an operating system 51, portions 51A, 51B and 51C of which are resident on respective ones of the central processing units. The operating system 51 provides an interface between applications programs executing on the central processing units and the system 10 facilities, and includes a virtual memory management system for managing data accesses and allocations.

A preferred operating system for controlling central processing units 40A, 40B and 40C is a UNIX-like operating system and, more preferably, OSF/1, modified in accord with the teachings herein.

The memory elements 40A, 40B and 40C include cache control units 52A, 52B and 52C, respectively. Each of these cache control units interfaces a data storage area 54A, 54B and 54C via a corresponding directory element 56A, 56B and 56C, as shown. Stores 54A, 54B and 54C are utilized by the illustrated system to provide physical storage space for data and instruction signals needed by their respective central processing units.

A further appreciation of the structure and operation of the illustrated digital data processing system 10 may be attained by reference to the following co-pending, commonly assigned applications, the teachings of which are incorporated herein by reference:

| Application No. | Title | Filing Date |
|---|---|---|
| 07/136,930 (now U.S. Pat. No. 5,055,999) | MULTIPROCESSOR DIGITAL DATA PROCESSING SYSTEM | 12/22/87 |
| 07/696,291 (now U.S. Pat. No. 5,119,481) | MULTIPROCESSOR SYSTEM WITH SHIFT REGISTER BUS | 04/26/91 |
| 07/370,341 (now U.S. Pat. No. 5,297,265) | SHARED MEMORY MULTIPROCESSOR SYSTEM AND METHOD OF OPERATION THEREOF | 06/22/89 |
| 08/100,100 (now abandoned) | IMPROVED MEMORY SYSTEM FOR A MULTIPROCESSOR | 7/30/93 |
| 07/370,287 (now U.S. Pat. No. 5,251,308) | IMPROVED MULTIPROCESSOR SYSTEM | 06/22/89 |
| 07/521,798 (now U.S. Pat. No. 5,182,201) | DYNAMIC PACKET ROUTING NETWORK | 05/10/90 |

-continued

| Application No. | Title | Filing Date |
|---|---|---|
| 07/763,507 (now abandoned) | PARALLEL PROCESSING APPARATUS AND METHOD FOR UTILIZING TILING | 09/20/91 |
| 07/499,182 (now U.S. Pat. No. 5,335,325) | HIGH-SPEED PACKET SWITCHING APPARATUS AND METHOD | 03/26/90 |
| 07/526,396 (now, U.S. Pat. No. 5,226,039) | PACKET ROUTING SWITCH | 05/18/90 |
| 07/531,506 (now U.S. Pat. No. 5,344,483) | DYNAMIC HIERARCHICAL ASSOCIATIVE MEMORY | 05/31/90 |
| 07/763,368 (now abandoned) | DIGITAL DATA PROCESSOR WITH IMPROVED PAGING | 09/20/91 |
| 07/763,505 (now U.S. Pat. No. 5,313,647) | DIGITAL DATA PROCESSOR WITH IMPROVED CHECKPOINTING AND FORKING | 09/20/91 |
| 07/763,132 (now abandoned) | IMPROVED DIGITAL DATA PROCESSOR WITH DISTRIBUTED MEMORY SYSTEM | 09/20/91 |
| 07/763,677 (now abandoned) | FAULT CONTAINMENT SYSTEM FOR MULTIPROCESSOR WITH SHARED MEMORY | 09/23/91 |

Query Decomposition

Figure 3A:
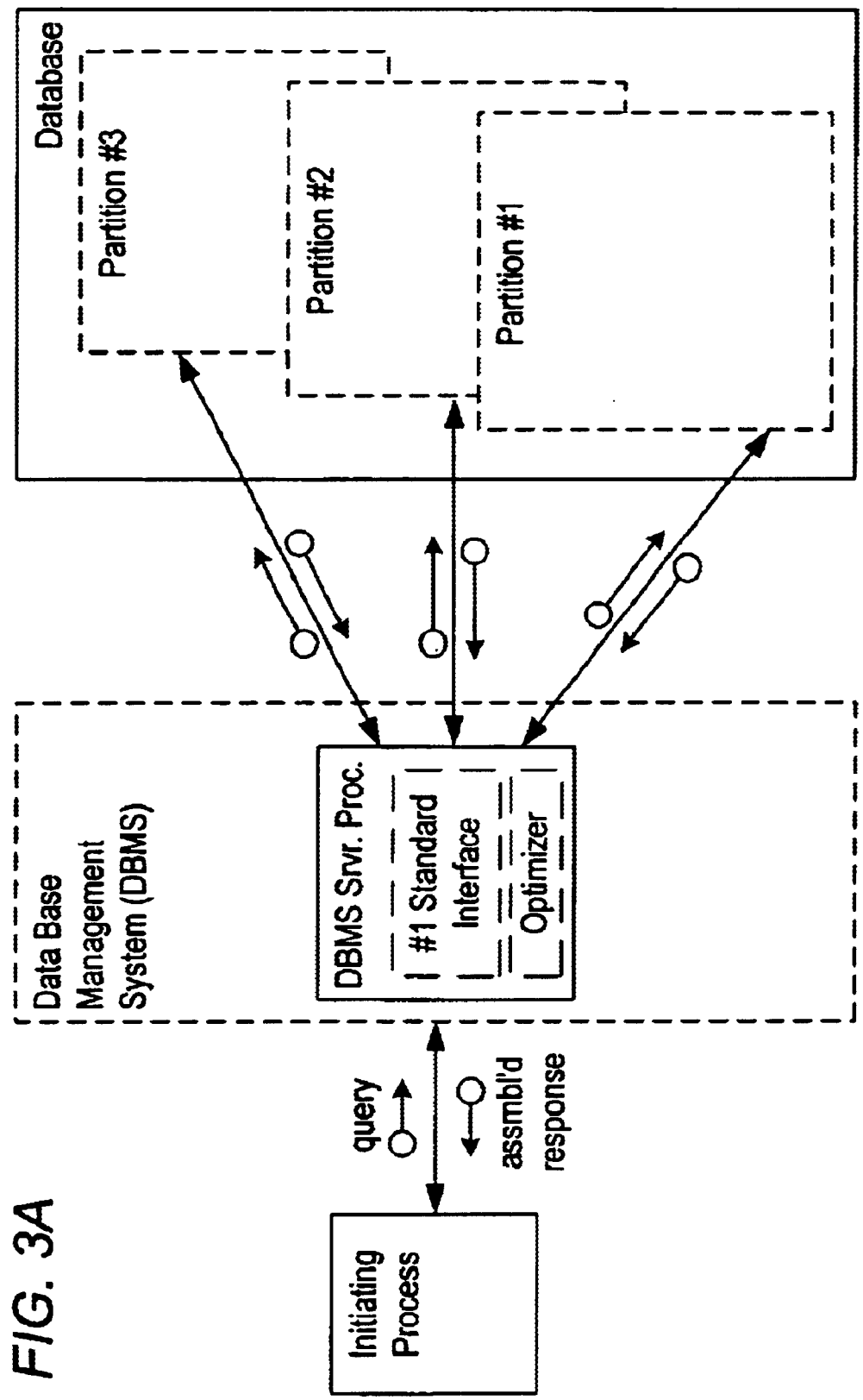
FIG. 3A depicts a standard arrangement of processes and software modules utilized in digital data processor 10 without query-decomposition and data access according to the invention.

FIG. 3A depicts a standard arrangement of processes and software modules utilized in digital data processor 10 without query decomposition and data access according to the invention.

Figure 3B:
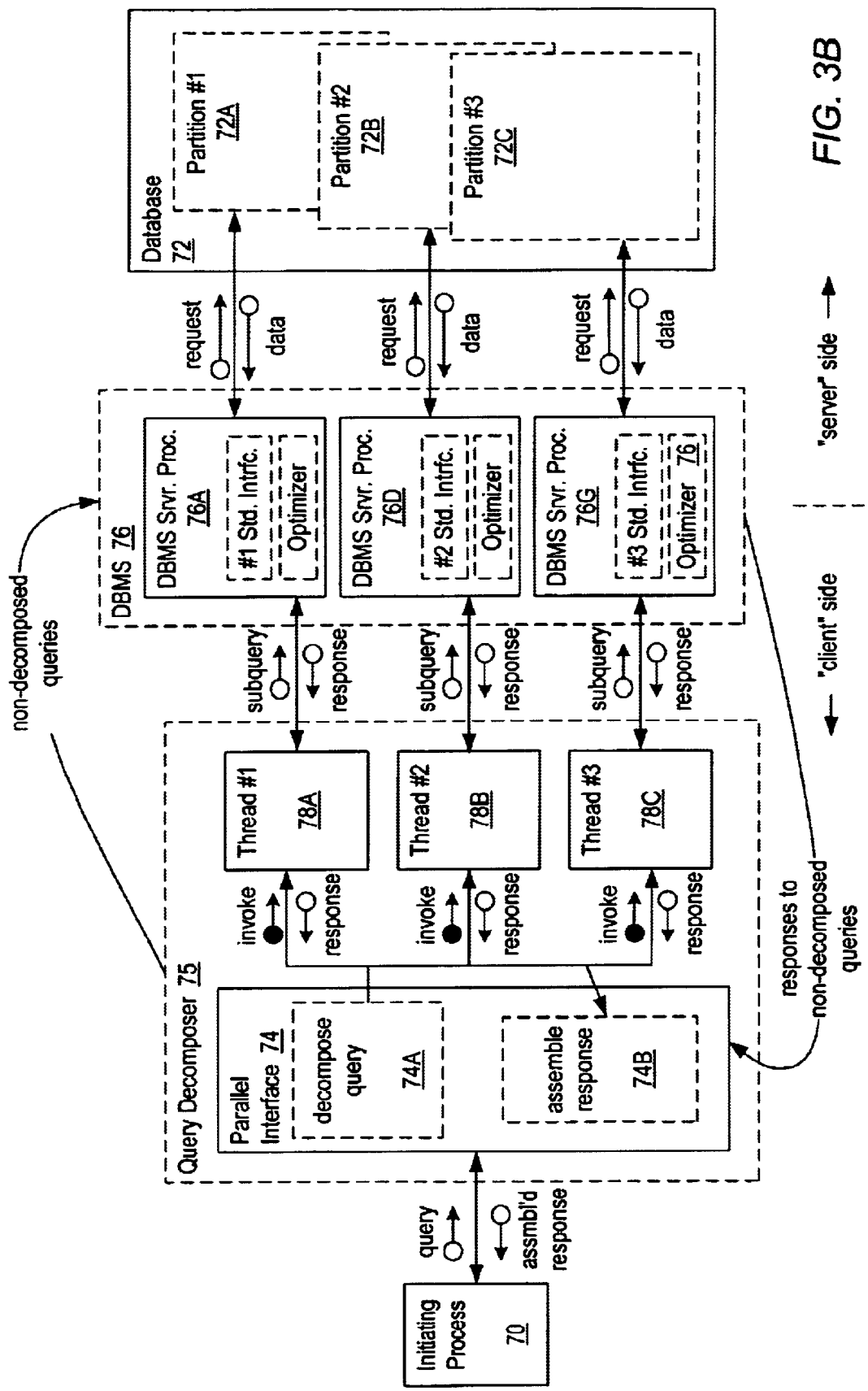
FIG. 3B depicts a preferred arrangement of threads, processes and software modules utilized in digital data processor 10 for query decomposition and data access according to the invention.

FIG. 3B depicts a preferred arrangement of processes and software modules utilized in digital data processor 10 for query decomposition and data access according to the invention. An initiating process 70 generates a query for accessing data stored in relational database 72 having data partitions 72A, 72B, 72C. The query is generated in a conventional format otherwise intended for a conventional DBMS 76. In a preferred embodiment, that conventional format is SQL and that conventional DBMS is the ORACLE7™ Database Management System (hereinafter, "ORACLE" or "ORACLE Version 7") of Oracle Corporation. Those skilled in the art will appreciate that other DBMS's and query formats may be substituted for the preferred ones without deviating from the spirit of the invention. However, those skilled in the art will also appreciate that a DBMS (such as ORACLE Version 7) used in connection with the preferred embodiments of invention disclosed below must be capable of efficiently running queries that specify "intersecting predicates" against relevant database partitions, i.e., they must avoid searching partitions other than those specified in those predicates.

Rather than being routed directly to DBMS 76, the query is intercepted by the parallel user program interface ("PUPI" or "parallel interface"). Element 74A (responsible for decomposing the query) routes queries not susceptible to decomposition to DBMS 76, but for a decomposable query it generates a set of subqueries, each of which is based on the initial query but which is directed to data in one or more respective of the partitions 72A, 72B, 72C of database 72. Then element 74A initiates and invokes threads 78A, 78B, 78C, which initiate execution of the subqueries. The subqueries corresponding to threads 78A, 78B, 78C are routed to the user program interface ("UPI" or "standard interface") of DBMS 76 (in lieu of the intercepted query), as shown in the drawing. Multiple subqueries are preferably applied to the UPI of DBMS 76 in parallel with one another, thus capitalizing on the database partitions and on the multiprocessing nature of the preferred digital data processing system 10. Each thread routes its subquery to a separate server process in DBMS 76.

The DBMS 76 responds in the conventional manner to each subquery by generating appropriate requests (e.g., a disk read) for access to the database 73 and, particularly, for access to respective partitions of that database (unless the data requested is already in memory). Data retrieved from the database 72 in response to each subquery is processed in the normal manner by DBMS 76 and is routed to processes 76A, 76D and 76G. Those responses, in turn, are routed to parallel interface assembly section 74B which assembles a response like that which would have been generated by the DBMS 76 had the intercepted response been applied directly to it. The assembled response produced by assembly section 74B is generally returned to the initiating process 70 more quickly than that which would have been generated by the DBMS 76 had the intercepted query been applied directly to it. This is a consequence of decomposition of the intercepted query and its parallel application to the UPI of DBMS 76. It is also a consequence of the architecture of the underlying multiprocessor, which permits multiple server processes to run simultaneously. Though it will be appreciated that, even when running on a uniprocessor, the concurrent execution of multiple subqueries could speed access where there is overlapping I/O and CPU processing.

As noted above, the decomposer 74A generates subqueries based on the conventional-format query intercepted from the initiating process. For simple, single-table queries, the decomposer 74A generates corresponding subqueries by duplicating the query and appending a predicate for matching records in the corresponding table partition. Thus, for example, a query in the form SELECT name, department_number
FROM employee
WHERE department_number=10 would result in the first subquery of the form:

SELECT name, department_number
FROM employee
WHERE department_number=10 AND
employee.rowid>=0.0.1 AND
employee.rowid<0.0.2 where rowid has three parts, the last of which indicates the partition number. Other subqueries would be of similar form, with changes to the partition numbers referenced in the rowid predicates.

For queries joining two or more tables, the decomposer 74A generates corresponding subqueries by duplicating the query and appending a predicate for matching records in the corresponding table partition of the driving table, which is selected by the decomposer 74A based on the access strategy chosen by the query optimizer portion 76B of the DBMS 76. Those skilled in the art will appreciate that information from the optimizer 76B, including possible tables to be chosen as the driving table, can be obtained from data files generated by the DBMS 76 in connection with the query, and accessed by use of the "EXPLAIN" command.

Figure 4:
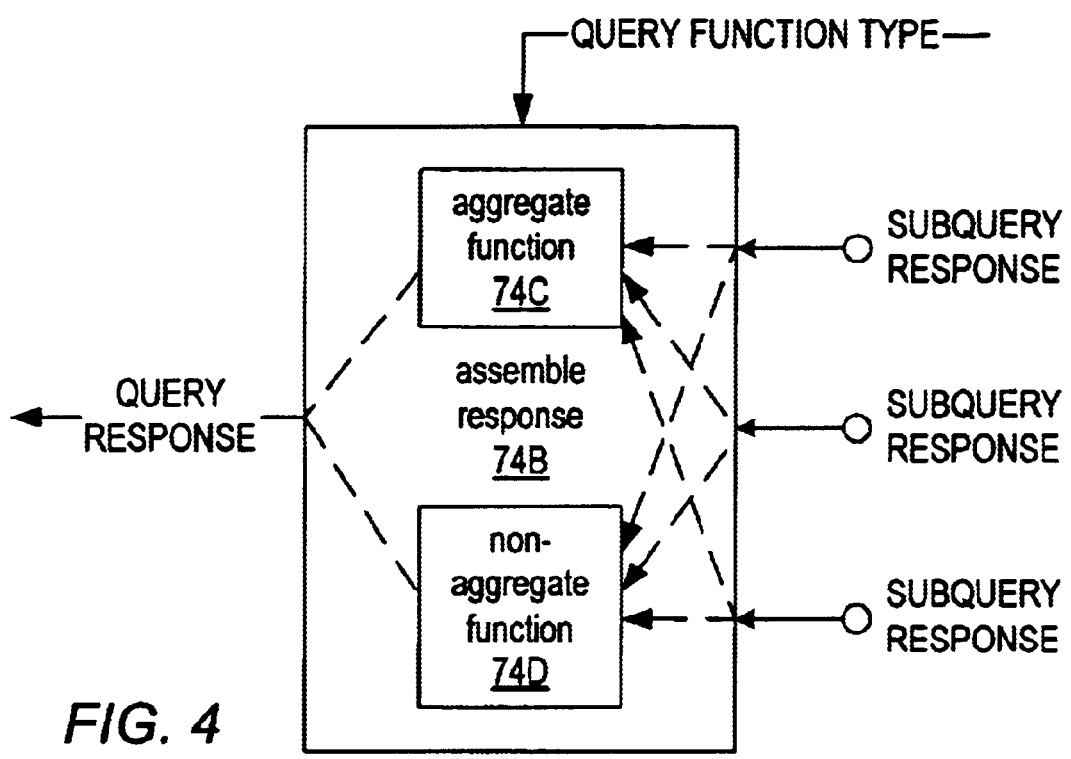
FIG. 4 shows the operation of assembler 74B on results generated by the DBMS 76 and threads 78A, 78B, 78C in response to the subquery signals.

FIG. 4 shows the operation of assembler 74B on results generated by the UPI of DBMS 76 and threads 78A, 78B, 78C in response to the subquery signals. More particularly, the drawing shows that for intercepted queries that call for aggregate data functions, element 74C performs a like or related data function of the results of the subqueries. Thus, for example, if the intercepted query seeks a minimum data value from the database table—and, likewise, the subqueries seek the same minimum value from their respective partitions—then element 74C generates a final result signal representing the minimum among those reported to the assembler 74B by the DBMS 76 and threads 78A, 78B, 78C.

Likewise, if the intercepted query seeks an average value from the database table—and, likewise, the subqueries seek a sum and a count from the respective partitions—then element 74C generates an average table value through a weighted average of the reported subquery results. Moreover, if the intercepted query seeks a standard deviation or variance from the database tables, the decomposer 74A generates subqueries requesting related functions of the data, e.g., the sum, count and sum of the squares of the data.

Such aggregate processing is preferably applied to, for example, intercepted queries requesting (i) a minimum or maximum of an item in the records (ii) an average of selected items, (iii) a standard deviation and variance of selected items, and (iv) a sum and a count of selected items.

As further shown in FIG. 4, for intercepted queries that call for non-aggregate data functions, element 74D generates a final result signal by interleaving the results of the subqueries. For example, if the intercepted query seeks a sorted list of data values from the database table—and, likewise, the subqueries seek sorted lists from their respective partitions—then element 74D generates a final result signal by interleaving (in the specified sort order) the items presented in the results reported to the assembler 74B by the DBMS 76 and threads 78A, 78B, 78C. Other non-aggregate queries involving, for example, (i) a distinct value of an entire result row, (ii) a nested selection of items, and/or (iii) a correlated selection of items are processed accordingly.

For queries that combine aggregate and non-aggregate functions, a combination of elements 74C and 74D are invoked.

For queries involving grouping operations, the decomposer 74A generates corresponding subqueries by duplicating the query, along with the grouping clause in its predicate list. For each group, data retrieved by the DBMS in response to those subqueries is placed in a temporary table. For that group, the assembly section 74B generates and passes to the DBMS a "group by" combining query to be applied to the temporary table. The results of those queries are returned to the initiating process 70 in lieu of the response that would have been generated by the DBMS 76 had the intercepted query been applied directly to it.

For queries involving grouping operations and including a "having" clause, the decomposer 74A and assembly section 74B operate in the manner describe above, except, that the "having" clause is not included in the subqueries. That clause is, however, incorporated into the combining queries that are executed on the temporary table.

Figure 5:
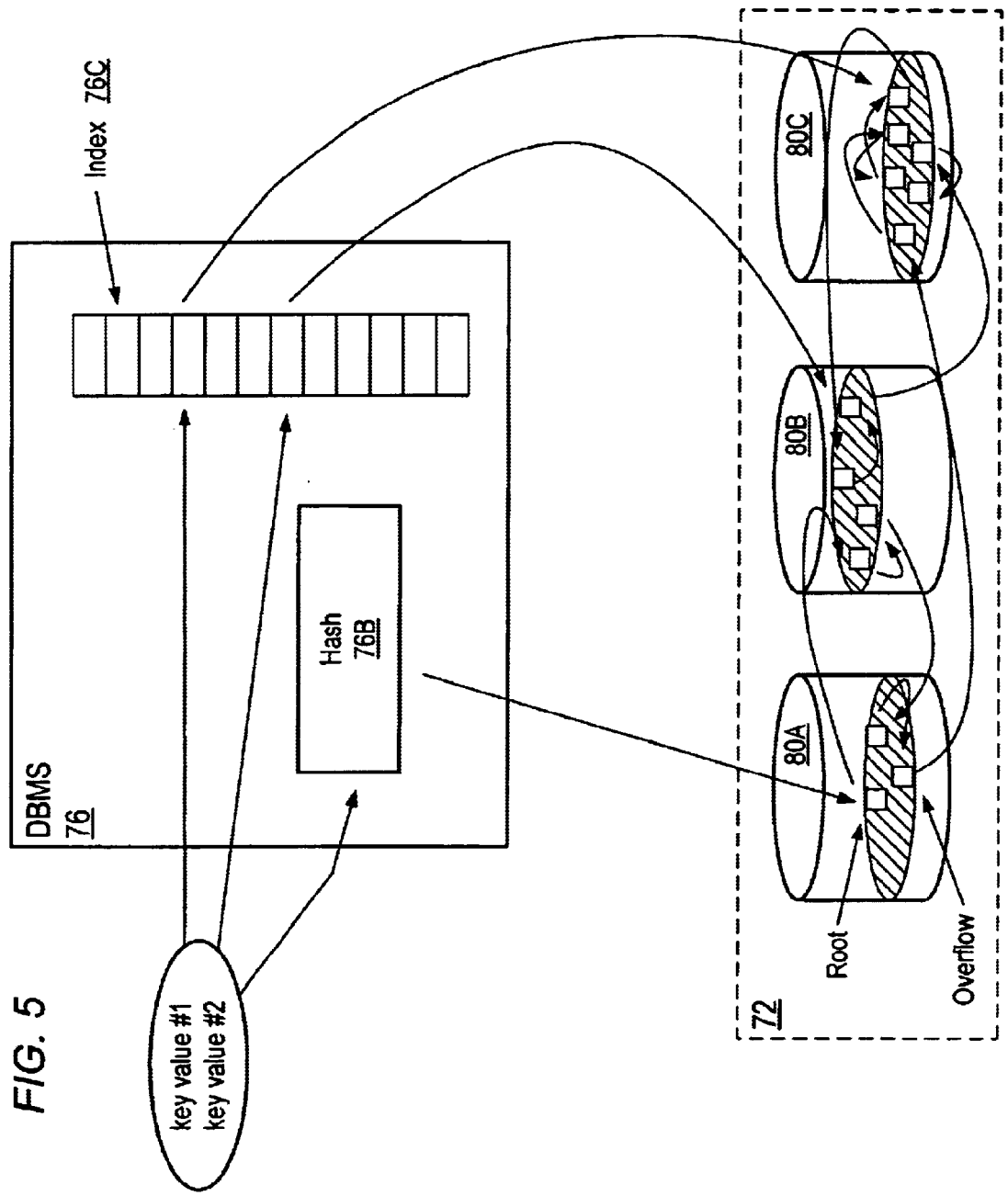
FIG. 5 depicts a preferred mechanism, referred to as "scatter clustering," for storing and retrieving data from database 72.

FIG. 5 depicts a preferred mechanism, referred to as "scatter clustering" or "small bucket hashing," for storing and retrieving data from database 72. The mechanism combines cluster-storage and index-access techniques to disperse and retrieve data records from storage media 80A, 80B, 80C (e.g., disk drives) upon which database 72 is contained. Data records are stored using the DBMS's 76 cluster-storing capabilities, based on a conventional hash function of its key value (as generated by element 76B), and using a smaller-than-normal bucket size chosen to insure that at least one overflow hash bucket will be created for each root bucket. More preferably, the bucket size is chosen to insure that hash buckets are spread over storage devices to maximize the potential for parallel access. Each stored record is simultaneously indexed for direct access in accord with the same key value(s) used by the hash function.

In operation, the DBMS 76 responds to requests to store data records by invoking the hashing element 76B to store those data records in accord with a hash on their key values. The DBMS 76 also populates index 76C by invoking DBMS's 76 corresponding indexing functionality. When accessing data records, the decomposer 74A generates subqueries specifying that requested data records are to be accessed via the index element 76c, not the hashing element 76b.

It will be appreciated that, to maximize the performance of the system depicted in FIG. 3B, the database 72 is organized to achieve the best mix of I/O parallelism and hit ratio. Generally, the greater the former (I/O parallelism), the more threads 78A, 78B, 78C can be used, in parallel, to initiate data retrievals. The greater the latter (hit ratio), the greater the number of relevant records each thread 78A, 78B, 78C gets with each retrieval.

Traditional indexed access schemes lend themselves to high degree of I/O parallelism, but low hit ratio. Parallelism is good because new records are allocated randomly in the physical disk structure. The hit ratio is low, however, because each disk access is likely to get little more of interest than the specific record sought (i.e., the data in neighbors of any given record are unlikely to have any relationship to the data in the given record).

Traditional hashing schemes are generally of low I/O parallelism, but have a high hit ratio. Parallelism is low because most of the data with a given key value is stuffed into just a few buckets: the root and a few necessary overflows. The hit ratio is high, however, because each disk access will get several records of related data (i.e., the. neighbors of any given record are likely to be related to the data in the given record).

By combining the DBMS's 76 indexing and hashing mechanisms in the manner described above, the aforementioned scatter clustering technique achieves a good mix of I/O parallelism and hit ratio. It does this by storing the data records using the DBMS's 76 hash-based storage techniques with abnormally small bucket size, thereby distributing small bucket-size clusters of related information around the disk, and by retrieving the data using the DBMS's indexing mechanism.

Those skilled in the art will, of course, appreciate that the invention contemplates operating on database tables with any plurality of partitions. And, that the invention contemplates using any plurality of subqueries (and corresponding threads) to execute retrievals against those partitions. Moreover, it will be appreciated that the invention does not require that the number of partitions and subqueries be identical. Preferably, the number of subqueries (and threads) is an integral divisor, greater than one, of the number of partitions. Thus, for example, three subqueries can be beneficially run against six partitions.

The sections which follow discuss the design considerations of the illustrated, preferred embodiment of the invention, to wit, a system hereinafter referred to as the "Query Decomposer" or "QD " for parallelizing decision support queries for use on a multiprocessor system of the type shown in FIG. 1 (and commercially available from the assignee hereof, Kendall Square Research Corporation) in connection with version 7 of the ORACLE™ database management system (which is commercially available from Oracle Corporation and can be adapted for operation with a number of computer systems, including the Kendall Square Research Corporation multiprocessors). Each of the sections which follow is identified by a "Database Note Number" (or DBN #). Those identifications are used to cross-reference the sections, typically, in lieu of their titles. The inventors are alternatively referred to as "we," "I," "KSR," and other like terms.

Notwithstanding the grammatical tense of the sections which follow, those skilled in the art will attain the requisite understanding of the invention and the disclosed system upon reading the sections which follow in connection with the other portions of this patent application. In this regard, it will also be appreciated that when the text of the section refers to material "below" or "above," such reference is typically with respect to material contained within that section itself Those skilled in the art will attain from study of the sections that follow, not only an appreciation of the workings of an exemplary, preferred illustrated embodiment, but also of its application to other computer systems and DBMS's.

In this regard, a still better appreciation of a preferred embodiment of the invention may be attained by reference to the software appendices filed herewith.

The sections which immediately follow overview the operation and use of a preferred query decomposition system according to the invention.

SUMMARY & CLAIMS

The foregoing describes a digital data processing apparatus and method meeting the aforementioned objects. Particularly, it describes an improved digital data processing system that intercepts selected queries prior to processing by a database management system, that decomposes those queries to generate multiple subqueries for application, in parallel, to the DBMS, in lieu of the intercepted query, and that assembles responses by the DBMS to generate a final response. The foregoing also describes methods and apparatus for storage and retrieval of records from a database utilizing the DBMS's cluster storage and index retrieval facilities, in combination with a smaller-than-usual hash bucket size, to improve parallel access to the database.

Those skilled in the art will appreciate that the embodiments described above are exemplary only, and that other apparatuses and methods—including modifications, additions and deletions—fall within the scope and spirit of the invention. Thus, for example, it will be appreciated that the techniques described above may be utilized on different computing systems and in connection with database management systems different than those described above. It will also be appreciated that differing data structures than those described in the detailed description may be used. And, by way of further example, that equivalent, but varied, procedures may be used to decompose queries and reassemble results without changing the spirit of the invention.

Chapter 9 ➤ KSR QD Product Overview

The KSR Query Decomposer (KSR QD) is a separate software component developed by Kendall Square Research. It interacts with the underlying implementation of ORACLE7 and leverages the parallelism of KSR/Series computers to greatly speed the execution of decision-support queries. KSR QD is designed for complex queries executed over large databases. A query that might otherwise be a bottleneck to your production can be executed in a reasonable timeframe using query decomposition. Decision-support data can be available in time to react much more quickly to changes in your environment.

Figure 6:
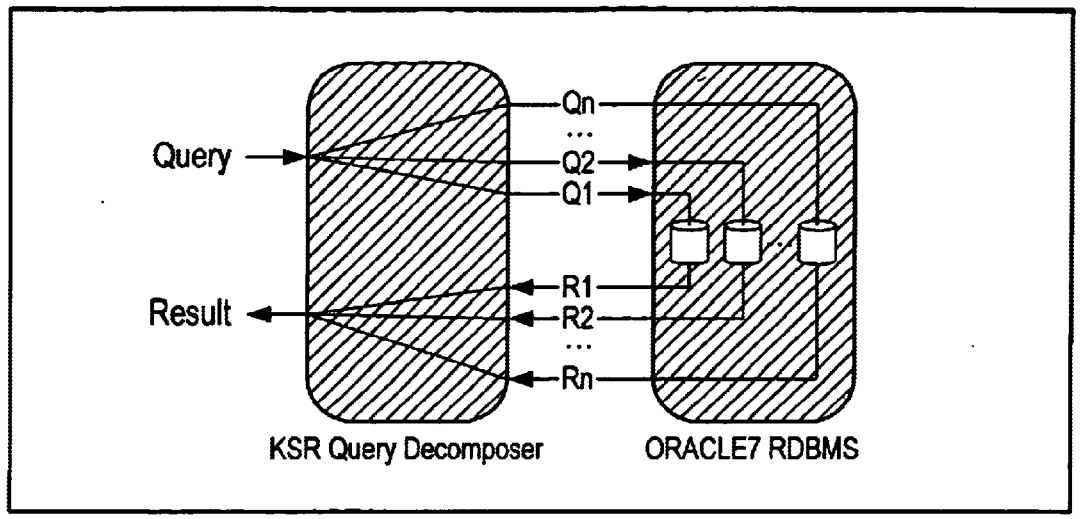
FIGS. 6–7 are used in connection with the discussion of the operation and use of a preferred query decomposition system according to the invention.

KSR QD works in conjunction with the underlying ORACLE7 RDBMS to automatically parallelize SQL queries. Fig. 6 shows the basic steps of query decomposition:

(SEE FIG. 6)

Basic Steps in Processing Flow
1. You submit a query according to your normal operating procedures.
2. KSR QD intercepts it and generates subqueries against existing data partitions on disks.
3. Subqueries are executed in parallel.
4. KSR QD combines results.
5. You receive the results of your query.
6. You see no operational changes; all activity occurs transparently to you.

9.1 The KSR Query Decomposer Implementation

KSR QD is compatible with the ORACLE architecture (transparent to your applications), while at the same time leveraging ORACLE's existing optimization strategies.

Figure 7:
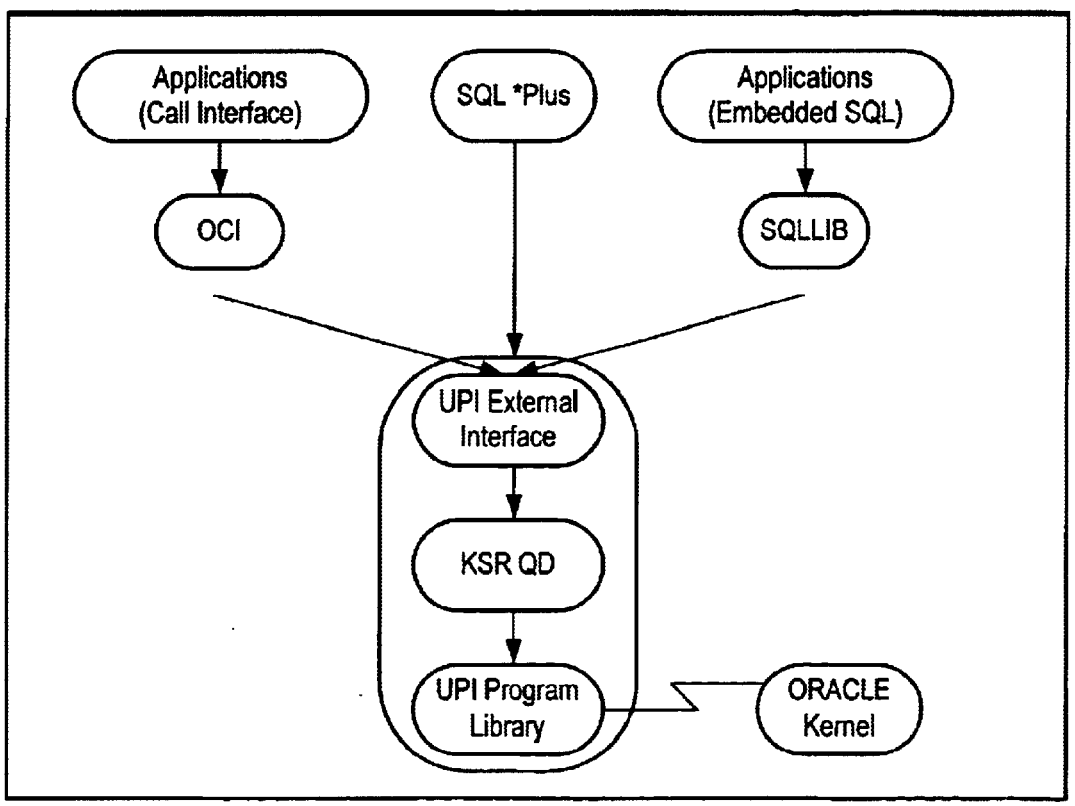

Fig. 7 is a conceptual view of the ORACLE program interface. The UPI (User Program Interface) is the common point of access to the ORACLE kernel for all applications.

(SEE FIG. 7)

The KSR QD implementation sits between the UPI external interface and the UPI program library, transforming a serial interface into a parallel one.

When a query is submitted to ORACLE, KSR QD intercepts it before it reaches the serial UPI library code and does the following:

- Analyzes whether query decomposition is likely to provide performance enhancement
- Decides on the optimal decomposition strategy by analyzing the ORACLE optimizer's execution plan

- Creates the necessary parallel structures to control the decomposition
- Uses multiple, coordinated connections to the database server
- Creates a temporary table for each query, if there is an aggregate function
- Manages the implementation via multiple calls to the UPI library
- Combines subquery results and passes them to the user Decisions made automatically by KSR QD include the following:

- The number of subqueries
- The choice of the table whose partitions "drive" the subqueries (the partitioning table)
- The minor query transformations to handle aggregate functions
- The method of combining subquery results

KSR QD Is Transparent  KSR QD will not notify you whether your query was decomposed, because everything is meant to happen transparently—unless you want it to be otherwise. If you want more details, you should issue an EXPLAIN PLAN command to see the actual execution plan for your query. If it is being decomposed, a row of the execution plan will be labeled KSR PARALLEL EXECUTION. For further information, see Section 11.4.

9.2 Kendall Square Query Decomposition Examples

End users do not need to be aware of KSR Query Decomposer activities. The database administrator, however, must set up a default environment that enhances the performance of queries normally issued in your application environment. The DBA's most important step is to distribute data in a way to take advantage of the parallelism provided by KSR QD.

First Step Is Data Partitioning  KSR QD parallelizes a query by dividing it into subqueries, each of which uses a rowid range predicate on the driving table to specify one or more files to which that query's reads will be restricted. The approach depends on partitioning tables across files on multiple disk drives, so the files can be read in parallel.

Using existing ORACLE data-striping techniques, the DBA partitions large database tables over multiple disks to maximize parallel reads from disk. There may be tens or even hundreds of partitions for a given table. This is described in Chapter 10.

Ordinarily, the DBA partitions tables across many drives to take advantage of the parallelism of KSR/Series computers with KSR QD; however, a simple example is easier to visualize:

Example 1

If the table EMP is partitioned across three files with ORACLE file identifiers 1, 2, and 3, the following query:

```
SELECT * FROM EMP
``` can be decomposed into three subqueries:

```
SELECT * FROM EMP WHERE ROWID >= '0.0.1' and ROWID < '0.0.2'
SELECT * FROM EMP WHERE ROWID >= '0.0.2' and ROWID < '0.0.3'
SELECT * FROM EMP WHERE ROWID >= '0.0.3' and ROWID < '0.0.4'
```

The only change in the subqueries is the addition of the rowid range predicates. The first subquery will read only the blocks of the EMP table which are in file 1; the second, file 2; the third, file 3. This is an example of decomposing a full-table scan. The overall query needs to read all blocks of the table, and you gain near-linear speedup by reading the separate files across which the table is partitioned in parallel. The total number of reads is not changed, but they occur in parallel.

Example 2

Query decomposition also can work with queries that use an index. Suppose you have the following query:

```
SELECT * FROM EMP WHERE DEPTNO = 5
``` and there is an index on DEPTNO. This can be decomposed similarly to the first example:

```
SELECT * FROM EMP WHERE DEPTNO = 5 AND ROWID >= '0.0.1' and ROWID < '0.0.2'
SELECT * FROM EMP WHERE DEPTNO = 5 AND ROWID >= '0.0.2' and ROWID < '0.0.3'
SELECT * FROM EMP WHERE DEPTNO = 5 AND ROWID >= '0.0.3' and ROWID < '0.0.4'
```

Again, the only change in the subqueries is the addition of rowid range predicates. The subqueries read the index blocks concurrently and process them in parallel. Index blocks are cached, so the index blocks should be read in from disk only once. When a subquery finds an index entry for DEPTNO 5, however, it will examine the rowid stored in that index entry to see whether it falls within the range for that subquery. Only if it does will that subquery read the data page containing the row with that DEPTNO value and rowid.

Distribution of Files

Both full-table-scan query decomposition and indexed-scan query decomposition rely on good distribution of target data across the files of a partitioned table for their effectiveness. For full-table scans, each file should ideally contain an equal proportion of the total blocks of the table, even when the table has been loaded only to a fraction of its capacity. In addition, for indexed scans, rows with duplicate key values or rows with adjacent values of a unique key, should be scattered among the partitioning files, rather than contained within one or a few files.

The design of your database is a strategically important first step in being able to take advantage of the parallelism provided by KSR QD. Chapter 10, "Database Administration for KSR QD" provides the specifics of how to configure a database. Note your applications do not need to be changed to work with KSR QD. In particular:

- Logical database design need not be changed.
- Physical database design is slightly different, in that large tables should be striped across disks by the DBA, with one table partition per disk drive.

9.3 Terms and Concepts

Driving Table In a query that joins multiple tables, the table which ORACLE uses to "drive" the joins. Rows from the driving table that satisfy non-join criteria are retrieved, and ORACLE uses values from these rows to determine which rows to retrieve from the other tables.

Execution Plan The sequence of steps the optimizer chooses to execute an SQL statement. The EXPLAIN PLAN command allows you to examine the execution plan.

ORACLE optimizer The component of ORACLE whose goal is to choose the most efficient way to execute an SQL statement

Parallel Subquery One of the several queries into which an ORACLE query is decomposed by KSR QD. These are executed in parallel and are identical, except each retrieves rows from a different partition (or set of partitions) of the partitioning table of the query.

Partitioned Table A table whose data resides in multiple files, deployed across multiple disks. A table must be partitioned to be used as a partitioning table by KSR QD.

Partitioning Table In a query that joins multiple tables, the table whose partitions KSR QD uses to decompose a query into multiple parallel subqueries. In the current release of KSR QD, this is always the driving table of the query, chosen by the ORACLE optimizer.

9.4 KSR QD Features

Query Constructs Supported Queries with the following constructs will be decomposed by KSR QD and executed as a set of parallel subqueries:

- Joins — equijoins, nonequijoins, outer joins, cartesian products
- Queries with an ORDER BY clause
- Queries with a GROUP BY clause
- Queries with a HAVING clause
- Queries with aggregates (all aggregates, including STDDEV and VARIANCE)
- Queries with nested aggregates (for example, avg(count(*)))
- Queries with SELECT DISTINCT (with or without ORDER BY)
- Queries containing subqueries (including correlated subqueries)
- Queries containing host variable references

- Queries with both ORDER BY and GROUP BY
- Queries with INSERT/SELECT clauses

- Queries referencing views
  - The query can contain only one view reference.
  - The view definition must not contain a GROUP BY clause, an aggregate function, or any construct not listed above.
  - The user must have SELECT privilege for the underlying tables of the view.
  - Since ROWID is not directly visible through most views, you must define your view to have explicit columns and name them as a concatenation of the underlying table and the word rowid. For example:

```
create view emp_dept_view
(empno, empname, deptno, deptname, salary, emprowid, deptrowid)
as
select empno, empname, emp.deptno, deptname, salary,
emp.rowid,dept.rowid
from emp, dept
where emp.deptno = dept.deptno;
```

If a query is submitted with constructs other than those listed above, the query will be executed serially as usual, without decomposition. KSR QD will not alert you as to whether decomposition has taken place. You will receive the results of your query without any interrupting messages. KSR QD always runs transparently to your operation.

ORACLE Products Supported

KSR QD supports the following products in a local client/server environment:

- Pro*C
- Pro*COBOL
- SQL*Plus

Other KSR QD Features

For a thorough discussion of KSR QD features, see Chapter 11, "The User Interface to KSR QD."

Chapter 10 ➤ Database Administration for KSR QD

KSR QD is a separate software component that interacts seamlessly with ORACLE for KSR. It is developed and distributed by Kendall Square for use on KSR/Series computers. KSR QD is not expected to impact general database administration procedures.

The DBA's involvement is necessary initially to do the following:

- Ensure the ORACLE installation includes KSR QD components and KSR QD files in the correct directories.

- Run the SQL scripts creating the tables and views necessary for KSR QD operation.

- Ensure the initial KSR QD setup is tailored to the needs of your application environment.

Later, the DBA may be involved intermittently with application developers to do the following:

- Help customize the KSR QD environment to optimize particular applications.

- Help in problem determination and system cleanup if errors occur.

To assist with the above functions, this chapter is structured into three sections:

- Section 10.1, "General KSR QD Start-up Information" — This section provides information for performing a post-installation assessment to make certain all KSR QD files are in place. It provides a procedure to establish the views and tables necessary for KSR QD operation.

- Section 10.2, "Database Configuration" — This section leads you through the process of configuring your database to take advantage of the performance enhancement provided by KSR QD. Helpful strategies also are provided.

- Section 10.3, "Problem Determination" — This section describes procedures that will be necessary if an error should occur.

10.1 General KSR QD Start-up Information

10.1.1 KSR QD Files

The following two sets of files are specific to the KSR QD implementation. They are placed in the identified directories by the ORACLE installation process.

KSR QD Versions of ORACLE Files  The following files are KSR QD versions of ORACLE files:

| | |
|---|---|
| libora.qd.a | This is a customized libora.a file containing all the KSR QD code. There are KSR QD modules and modified UPI modules in this copy of the library. It is located in $ORACLE_HOME/lib. |
| sqlplus.qd | This is SQL*Plus built with KSR QD linked in. It is located in $ORACLE_HOME/bin. |

Chapter 9, "KSR QD Product Overview" describes how KSR QD is related to the ORACLE UPI. The programs comprising the UPI normally are found in the libora.a library. The libora.qd.a file in your distribution is the modified ORACLE libora.a file containing KSR QD code. The sqlplus.qd executable you received was linked with this modified libora.qd.a file. Any new applications automatically will include KSR QD when they are built with libora.qd.a.

Files Needed for KSR QD  These are other files needed for KSR QD:

| | |
|---|---|
| catksrqd.sql | Script for creating KSR_ALL_TABLE_FILES view (see Section 10.1.2) |
| ksr_disable_qd.sql | Script to disable KSR QD for a given database |
| ksr_enable_qd.sql | Script to (re)enable KSR QD for a given database |
| ksrxplan.sql | Script for creating KSR_PLAN_TABLE (see Section 10.1.2) |
| qdcleanup | A utility to remove KSR QD intermediate tables (see Section 10.1.4) |

The .sql scripts are installed in $ORACLE_HOME/rdbms/admin. qdcleanup is located in $ORACLE_HOME/bin.

10.1.2 System Tables and Views

> KSR_ALL_TABLE_FILES — This view must exist in a database for query decomposition to be possible. It permits KSR QD to get a count and list of the files into which a given table is partitioned. It is owned by SYS and must have SELECT privilege granted to public (or, at the DBA's discretion, only to those users permitted to use KSR QD). It is created, with appropriate grants, by the SQL script $ORACLE_HOME/rdbms/admin/catksrqd.sql, which is run as part of database creation.

- KSR_PLAN_TABLE — This is the default plan table for the temporary execution plans generated by KSR QD when it calls EXPLAIN PLAN. This plan table has the same format as a standard ORACLE plan table, is owned by SYS, must have SELECT, INSERT, UPDATE, and DELETE privileges granted to public, and is created, with appropriate grants, by running $ORACLE_HOME/rdbms/admin/ksrxplan.sql.

Standard ORACLE includes a script called utlxplan.sql, which any user can employ to create a private plan table (named PLAN_TABLE by default). For a given user, KSR QD will use PLAN_TABLE if it exists; otherwise, it will use KSR_PLAN_TABLE. If KSR_PLAN_TABLE does not exist in a given database, only users with a private plan table explicitly named PLAN_TABLE can use KSR QD in that database.

- KSR_DISABLE_QD — This is a public synonym for the table DUAL, which is transparently created when the script $ORACLE_HOME/rdbms/admin/ksr_disable_qd.sql is run. It is transparently dropped when you subsequently run the script /ORACLE_HOME/rdbms/admin/ksr_enable_qd.sql. This table should not be manipulated directly.

10.1.3 Running the KSR QD Start-up Scripts

When a new ORACLE database is created or you want to enable KSR QD support for an existing ORACLE database, two SQL scripts must be executed to create the data dictionary views and tables needed by KSR QD. Follow these steps:

1. Start up ORACLE, if it is not already started:

```
   sqldba lmode=y
   connect internal
   startup
   ```

2. Connect as user SYS and run catksrqd.sql to create the KSR_ALL_TABLE_FILES view:

```
   connect SYS/password
   @$ORACLE_HOME/rdbms/admin/catksrqd.sql
   ```

3. Connect as user SYSTEM and run ksrxplan.sql to create the KSR_PLAN_TABLE table:

```
   connect SYSTEM/password
   @$ORACLE_HOME/rdbms/admin/ksrxplan.sql
   ```

Once these scripts have been executed in a database, KSR QD is enabled for that database.

-27-

10.1.4 KSR QD Temporary Tables

KSR QD creates a temporary table when it decomposes a query containing aggregate functions. It uses this table to gather partial aggregate results from the parallel subqueries. A KSR QD temporary table has a name beginning with QDIT (for Query Decomposer Intermediate Table) with a unique 9-digit suffix. It is owned by the user executing the query and is created in that user's TEMPORARY tablespace (which defaults to SYSTEM).

A user must have the ability to create tables in his or her TEMPORARY tablespace to apply query decomposition to queries containing aggregate functions. The ALTER USER statement can be used to assign a TEMPORARY tablespace for a particular user. The user can be enabled to create tables in that tablespace by either granting the RESOURCE role to the user (which enables creating tables in any tablespace) or using the QUOTA clause of the ALTER USER statement to grant the user a storage quota in a specified tablespace. If a quota is used, it must be sufficient to permit creating a table with default storage attributes. The minimum necessary quota varies depending on the database configuration (e.g., in a database with DB_BLOCK_SIZE of 8192, the minimum quota required to create KSR QD intermediate tables is 40 KB).

If a user without the ability to create tables in the TEMPORARY tablespace attempts to execute a query for which KSR QD requires an intermediate table, the query will be executed without using query decomposition, and no warning will be issued.

10.1.5 ORACLE Initialization Parameters

There are no new ORACLE initialization parameters specific to KSR QD. Use of KSR QD, however, might cause you to reassess the settings of some of your ORACLE initialization parameters.

When a query is decomposed into subqueries, many system resources will be used more heavily than usual, because of the multiplication factor of the degree of parallelism involved. One user submitting a query for decomposition will impact the system as if many users were submitting queries. For example, you might consider increasing the value of PROCESSES.

10.2 Database Configuration

10.2.1 Configuring Tables for Effective Query Decomposition

Partitioning Data Across Multiple Disks  For KSR QD to be used effectively to speed up queries, the data to be queried must be partitioned across multiple disks. This is accomplished by the following steps:

-28-

1. Create an ORACLE tablespace consisting of multiple files, each on a different disk.

2. Create one or more tables in that tablespace. Each file of the tablespace constitutes a KSR QD "partition" for each table.

3. Load data into the partitioned tables. ORACLE extents are automatically allocated in a balanced manner across the tablespace as data is loaded.

Number of Table Partitions

A database may contain multiple partitioned tablespaces, each of which may have a different number of partitions. A table created in a partitioned tablespace potentially has the same number of partitions as the tablespace. However, when decomposing a query on a particular partitioning table, KSR QD will consider as partitions only those files which contain at least one extent of the table in question. For example, if a tablespace has 20 files, but a particular table in the tablespace has extents in only 10 of those files, KSR QD considers that table to have 10 partitions, not 20. This means KSR QD generates at most 10 parallel subqueries for a query with this table as its partitioning table.

10.2.2 Determining Appropriate Number of Partitions

Determining Effective Degree of Partitioning

The maximum effective degree of partitioning of a tablespace is limited by the number of disk drives, because KSR QD does not benefit significantly from using more than one partition on the same disk, for a given tablespace. *The number of processors does not impose a hard limit on the degree of partitioning*, because multiple KSR QD threads may run on a given processor in a time-sharing fashion. However, a gradual decline of added speedup per additional degree of partitioning will occur as the degree of partitioning exceeds the number of processors. It is recommended the degree of partitioning not exceed the number of processors for the initial run.

The degree of partitioning of a tablespace determines the maximum potential degree of parallelism KSR QD can use for queries whose driving table is in that tablespace. For a given table in the tablespace, the actual maximum degree of parallelism is equal to the number of files in the tablespace that contain at least one extent of the table.

Adjusting the Degree of Parallelism

KSR QD can be made to use a smaller degree of parallelism than the maximum by using the KSR_MAXPARTITIONS environment variable or query directive, as explained in Section 11.1, "KSR QD Environment Variables."

Partitioning a Single Large Table

If you are only concerned with queries driven on a single large table (at a given time), partition it across all available disks, particularly if the number of disks does not exceed the number of processors. See Section 10.2.7, "Scatter Clustering" for a mechanism improving performance under certain conditions.

Partitioning Multiple Large Tables

If you have several large tables to be partitioned, and these may be queried concurrently by separate queries, then ideally you should partition each of them over a separate, non-overlapping set of disks to avoid disk contention between the queries.

There is a trade-off between maximizing parallelism for queries on a given table (achieved by partitioning that table across the most possible disks) and minimizing disk contention among concurrent queries (achieved by minimizing overlapping of the sets of disks accessed by those queries).

If you have several large tables to be partitioned, and these often will be joined in the same query, choose one of the following two approaches:

➤ Partition each table across a separate, non-overlapping set of disks.

➤ If your joins usually will be on the same set of columns, create one partitioned tablespace for all the tables, then define a cluster on that set of columns, and define the tables to be in that cluster.

For queries containing joins, KSR QD divides its work according to the partitions of one table, the "driving" table of the join (see Section 11.4, "Kendall Square Extensions to EXPLAIN PLAN," to find out how to determine which is the partitioning table for a given query). A given KSR QD parallel subquery is responsible for fetching rows from a particular partition of the partitioning table, and for each of those rows, finding the matching rows from the other tables. If more than one of the tables being joined is partitioned across the same disks, one parallel subquery looking for matching rows from a non-partitioning table may contend for the same disk with another parallel subquery looking for rows matching its own partition of the partitioning table. Using a cluster solves this problem, because the rows of non-partitioning tables usually are in the same block (and thus the same partition) as the corresponding rows of the partitioning table to which they join.

10.2.3 Creating a Partitioned Tablespace

Soft Links  It is advisable to use soft links rather than hard-coded path names in the SQL statement used to create a partitioned tablespace. Using soft links makes it easy to move the actual files to different locations as needed. (This applies to all database files but is more likely to be an issue when many disks are involved.) This also means all the path names by which ORACLE knows the files can be in one directory, which greatly facilitates housekeeping. This approach also allows you to physically relocate database files without starting up ORACLE.

Example  For example, to create a 5-partition tablespace called QDTEST, with each file containing 4 MB, first create soft links for each partition table space from your KSR OS shell (file and directory names are examples):

```
cd $ORACLE_HOME/dbs
ln -s /db_disk1/qd01.dbf qd01.dbf
ln -s /db_disk2/qd02.dbf qd02.dbf
ln -s /db_disk3/qd03.dbf qd03.dbf
ln -s /db_disk4/qd04.dbf qd04.dbf
ln -s /db_disk5/qd05.dbf qd05.dbf
```

The soft-link names and actual names do not have to be the same, but it makes it easier to keep track of things. You can then use an SQL statement like the following to create the tablespace:

```
create tablespace qdtest
datafile '?/dbs/qd01.dbf' size 4m reuse,
     '?/dbs/qd02.dbf' size 4m reuse,
     '?/dbs/qd03.dbf' size 4m reuse,
     '?/dbs/qd04.dbf' size 4m reuse,
     '?/dbs/qd05.dbf' size 4m reuse;
```

If, for example, you later need to move the file qd01.dbf from /db_disk1 to /db_disk7, simply do the following in the shell (while the database is shut down or the qdtest tablespace is off-line):

```
mv /db_disk1/qd01.dbf /db_disk7/qd01.dbf
rm $ORACLE_HOME/dbs/qd01.dbf
ln -s /db_disk7/qd01.dbf $ORACLE_HOME/dbs/qd01.dbf
```

For More Information Consult the *ORACLE Database Administrator's Guide* for full information about creating tablespaces.

Guideline A useful rule of thumb when creating tablespaces to be used for query decomposition is to define all files of your tablespace to be the same size. This will provide even data distribution across all the files.

10.2.4 Creating a Partitioned Table

To create a partitioned table, use the CREATE TABLE statement to create a table in a partitioned tablespace. For example, the following statement creates a table called EMP in the tablespace created in the previous example:

Example
```
create table emp
     (empno number(9) not null,
     lname char(20),
     fname char(20),
     .
     .
     .
     )
pctfree 5 pctused 90
storage (initial 256K next 256K pctincrease 0)
tablespace qdtest;
```

For More Information Consult the *ORACLE Database Administrator's Guide* for full information about creating tables and the significance of the storage clause in particular.

Guidelines Some useful rules of thumb when creating tables to be used by KSR QD include the following:

-31-

- In the storage clause of your CREATE TABLE statement, specify the same size for both initial and next extent, and specify PCTINCREASE 0 (so all extents will be the same size). ORACLE will round extent size up to a five-block boundary (i.e., to a multiple of five times your ORACLE blocksize), so for clarity it is best to specify an extent size that is a multiple of five blocks.

- Choose a file size that is a multiple of your extent size, plus one extra block (i.e., plus a number of bytes equal to your ORACLE blocksize). The extra block is required by ORACLE for overhead.

10.2.5 Creating Indexes for Partitioned Tables

It is strongly advisable to put any indexes for a partitioned table in a different tablespace than the one containing the table. KSR QD can effectively decompose queries using an index to retrieve rows from the driving table (although speedup will not tend to be as dramatic as for full-table scans), but the reading of the index itself is not decomposed (i.e., each parallel subquery reads the same index blocks). Placing the index in a separate tablespace avoids disk contention between index reads by one parallel subquery and table reads by another parallel subquery.

10.2.6 Minimizing Data Skew

KSR QD is most effective when target data is evenly distributed among all the files of a tablespace. This is so because KSR QD divides the work of a query so each parallel subquery covers the same number of table partitions as nearly as possible. For example, if a given table has 20 partitions (i.e., it has at least one extent in each of 20 files) and the user has specified a maximum degree of decomposition of 10 (using the KSR_MAXPARTITIONS directive, described in Section 11.2), each parallel subquery will be responsible for retrieving data from two partitions. If no maximum degree of decomposition has been specified, each parallel subquery will retrieve data from one partition. If each of the 20 partitions contains roughly the same amount of data, each parallel subquery has roughly the same amount of work to do. Therefore, when they are executed in parallel, all the parallel subqueries will complete at about the same time. The execution time for the overall query is always slightly greater than the execution time for the longest-running parallel subquery, making it very important to divide the workload evenly among the parallel subqueries.

Suppose, on the other hand, the data is skewed such that you have 11 extents in 10 files (1 file with 2 extents and the rest with 1 each). In this case one file contains twice as much data from the table as any other file, and the parallel subquery for the larger file will have twice as much work to do as the other parallel subqueries. When the others have all completed, the larger subquery still will have roughly half its work left to do. For half of the execution time of the overall query, there will be no parallelism. Realistically, unless you know the exact size of a table in advance, this problem cannot be entirely avoided. Selecting smaller extent sizes (i.e., 103 extents in 10 files) can minimize the effects of this problem.

If a given file contains no extents for a given table, that file is not considered a partition of that table by KSR QD. If, for example, a table in a 20-file tablespace has equal amounts of data in each of 10 files and has no extents in the remaining 10 files, a query on that table can be decomposed into 10 parallel subqueries. If the same data were instead distributed among all 20 files, a higher degree of parallelism, and thus a higher degree of speedup, would be possible.

Types of Data Skew

There is a distinction between the type of data skew which affects queries retrieved using a full-table scan and the type which affects queries using an index. When a full-table scan is used, the most important factor is balancing the number of data blocks containing rows of the driving table among files of the partitioned tablespace, because a full-table scan must read each of these blocks once. Of secondary importance is balancing the total number of rows of the table in each file, because there is a CPU cost involved in processing each row (which varies from row to row, depending on how many of the query's predicates the row satisfies). Reasonably good balanced distribution can be achieved simply by ensuring each file contains the same number of extents for the table in question, and all extents are the same size.

When an index is used, data blocks of the table are read only if they contain at least one row which satisfies the predicates applied to the index (e.g., if an index on DEPTNO is used, only those data blocks are read which contain at least one row with a DEPTNO value in the range specified in the query's WHERE clause). Therefore, for a given indexed query, the skew of distribution of data blocks containing rows falling within the specified ranges on the indexed columns is important. This type of skew is more difficult to avoid for two reasons: First, one must predict the most frequently queried value ranges to determine the ideal data distribution. Second, the order in which data is loaded affects the way it ends up distributed among extents and files, and this is difficult to control. There is no simple answer to this problem. Trade-offs must be made based on application analysis.

10.2.7 Scatter Clustering

Scatter clustering can be quite valuable. The goal of scatter clustering is to create a hashed cluster with a large number of overflow blocks, each of which contains records with the same key value.

For example, if an index has a fairly small number of distinct values relative to the number of rows in a table, and rows with a given index value can occur (be scattered) anywhere in the table without regard to their key value on that index. Then even after using the index, a much larger volume of data may have to be read from the table than the volume represented by rows with the desired key values, because only a small fraction of each block read consists of the desired rows. In the worst case, all blocks of the table must be read, so performance is worse than if the index is not used at all (because of the extra reads of the index and the higher proportion of random to sequential I/Os). KSR QD can ameliorate the problem by splitting up the load in parallel, but if the index does not provide speedup relative to full-table scan without query decomposition, it will not provide that speedup with query decomposition either.

If rows with matching key values could be clustered, using an index would reduce total I/O in a much wider variety of cases (again, with or without query decomposition). This essentially is what ORACLE clusters accomplish. To further aid query decomposition, instead of clustering rows with a given key value into one clump, they can be clustered in $n$ clumps, where $n$ is the degree of partitioning of the table. If these clumps can be read in parallel (i.e., if KSR QD can be applied), performance would improve by a factor approaching $n$. This can be accomplished with the following approach:

1. Create a hash cluster keyed on the desired columns, in a partitioned tablespace (i.e., the hash cluster is partitioned over multiple files on multiple disks).

2. Estimate the expected volume of data for each distinct key value, as you would for an ordinary hashed cluster. Instead of using that volume as the size to specify for a hash bucket when creating a hashed cluster, specify a much smaller bucket size (at the largest, $v/n$ where $v$ is the volume of data for each distinct key value and $n$ is the number of table partitions).

3. Assuming your ORACLE block size also is no larger than $v/n$ (i.e., $v$ is large enough to be at least $n*blocksize$), when you load the table, you will get an overflow chain for each key value having at least $n$ blocks (just the opposite of the usual goal in configuring a hashed cluster). By loading the table in random hash-key sequence, you end up with the blocks for each overflow chain well distributed among the files of the partitioned table.

4. Now, create an (ordinary) index on the same columns as the hash columns. Because it is an ordinary index, each index entry consists of a key value/rowid pair, which points directly to the block containing the row in question. It also can be used for range predicates as well as direct match predicates.

When presented with a query with an exact-match predicate on the hash-key columns, the ORACLE optimizer will choose hashed access rather than using the index on those same columns, because under normal circumstances, hashed access would unquestionably be faster. When KSR QD notices (in the execution plan) ORACLE has chosen hashed access and there is a regular index which has all the columns of the hash key as its leading columns, it generates an INDEX optimizer hint in the parallel subqueries, coercing the ORACLE optimizer to use the regular index rather than hashing. Since the parallel subqueries have rowid range predicates, this regular indexed query can be decomposed like any other. Because the data is clustered on the same column values with blocks for each cluster-key value well distributed among the files of the partitioned table, many fewer blocks need to be read than if this were not a hashed table.

As an example, consider the following query:

```
SELECT * FROM HASHED_TABLE WHERE HASHKEY_COLUMN = 5
```

This would be decomposed into parallel subqueries, for example:

```
SELECT /*+ INDEX(HASHED_TABLE REGULAR_INDEX) */ * FROM HASHED_TABLE
   WHERE HASHKEY_COLUMN = 5    AND ROWID >= '0.0.1'
                               AND ROWID <  '0.0.2'
``` where a partitioned table called HASHED_TABLE is hashed on the column HASHKEY_COLUMN, and there also is an index called REGULAR_INDEX on the same column.

The regular index optionally may contain additional trailing columns beyond those which match columns of the hash key. This means it can be used to further restrict the rows read, according to additional predicates in the query. This could be particularly useful to give added flexibility, because a hash key must be chosen by a DBA before a table is created. Once the hashed table is populated, it requires a complete reorganization to add additional hash-key columns. It is much easier, however, to add columns to an index (or replace it with a different index) without affecting the data itself. So, if additional, frequently used selection criteria are identified after a hash table exists, these columns can be added to the regular index.

If more than one regular index has leading columns matching the hash key (but with different trailing columns), KSR QD must choose one of these indexes arbitrarily for ORACLE to use. In this event, however, the user optionally may choose the index by placing the INDEX optimizer hint in the original query. KSR QD always leaves any hints from the original query in the parallel subqueries to provide the user this extra degree of customized control over optimization when needed.

10.3 Problem Determination

10.3.1 Reverting to ORACLE without KSR QD

If an error should occur, it may be necessary to determine whether the problem is due to KSR QD or ORACLE.

First, determine whether you are running KSR QD. If your SQL*Plus has KSR QD linked in, then when you run SQL*Plus, you will see an indication KSR QD is running (e.g., KSR QD version 1.0).

If you are running KSR QD, try the KSR_NOPARTITION environment variable or directive. This disables KSR QD as explained in Section 11.1.

If that does not clarify the source of the problem, it may be necessary to remove the KSR QD code. The unmodified versions of libora.a and sqlplus were included in your distribution and are in the /$ORACLE_HOME/lib and /$ORACLE_HOME/bin directories, respectively. Switch to these modules (instead of the KSR QD modules) and see whether the error persists.

10.3.2 KSR QD Cleanup Utility

Normally, KSR QD intermediate tables are dropped automatically upon completion of query execution, but in exceptional cases (e.g., if an application is cancelled during query execution), they may not be dropped. A utility called qdcleanup is provided for easily removing KSR QD temporary tables.

Syntax

`qdcleanup [user[/password]]`

Parameters user
The user whose temporary tables will be dropped. If user is not supplied on the command line, qdcleanup will prompt for it.

password
The password of the specified user. If password is not supplied on the command line, qdcleanup will prompt for it.

Usage Notes qdcleanup will attempt to drop all KSR QD temporary tables owned by user. If none exist, it will print the following message:

```
There are no KSR QD temporary tables owned by user
```

Otherwise, it will print the following warning before deleting the tables:

```
Warning: KSR QD temporary tables owned by user will be dropped.
Make sure user user is not currently executing a query using QD.
Continue? (y/n)
```

If the user chooses to proceed while there is query decomposition in progress on behalf of that user, the temporary table used by the query being decomposed will be dropped, and the query will be aborted. Answering the Continue? prompt with n prevents this from happening.

As each temporary table is dropped, a message like the following is displayed:

```
Dropping table QDIT115418186... Table dropped.
```

To run qdcleanup, ORACLE must be started and the database must be open.

Chapter 11 ▶ The User Interface to KSR QD

KSR QD is intended to enhance the performance of complex decision-support queries executing over large databases. It works in coordination with the ORACLE optimizer to automatically provide what it believes to be the optimal strategy for running your query, based on what it knows about your application and the structure of your data.

Transparent Performance Enhancement

Generally, KSR QD works on your behalf without you even being aware that it is there, except for the performance enhancements you see in the execution of your queries. Once your database has been partitioned to take advantage of the parallelism offered by KSR QD, the KSR QD environment rarely needs to be changed. You can run your applications unmodified and expect KSR QD to make the right decisions to optimize the execution of your queries.

You have knowledge of your database and application, however, which KSR QD can not be expected to deduce. To further optimize your queries, that information may be made available to KSR QD. This is the purpose of the KSR QD user interface.

Functions of the User Interface

The KSR QD user interface allows you to:

- Initially set up the default environment to allow you (most times) to concentrate on your application and be confidently oblivious to what KSR QD is doing.

- Interact with and control the operation of KSR QD in those instances where your knowledge can be leveraged into better performance decisions.

- Measure your performance gains to assess optimization strategies.

Multiple Levels of Control

This control is provided in a granularity allowing for individual customization:

| | |
|---|---|
| At the database level: | You can transparently accept the system defaults for each option. The DBA can change them. See Section 10.1. |
| At the local user level: | You can set an environment variable for your shell to override any system default for an individual session. See Section 11.1. |
| At the individual query level: | You can issue a directive within your query to override both the system default and the environment variable for an individual query. See Section 11.2. |

Control Options  You have this multi-level control over the following options:

-37-

| Option | Default | Description |
|---|---|---|
| Decompose the query | Yes | You can choose whether or not to use query decomposition. Not all queries benefit from decomposition, and there is an overhead associated with decomposition. See Section 11.3. |
| Employ array fetches | No | You can choose whether to employ array processing for your subqueries. You can set either a size or a threshold and a size. The optimal array size is determined through experimentation. Setting a threshold invokes array fetching only after a particular number of rows have been fetched. See Section 11.7. |
| Set the degree of parallelism | Number of partitions in partitioning table | You can set a minimum or maximum number of partitions. See Section 11.1. |
| Display timing data | No | You can have timing information displayed on your screen or entered into a file. See Section 11.6. |

11.1 KSR QD Environment Variables

Environment variables are used to control the various KSR QD options on a local (per-shell) session basis.

Unless specified otherwise, legal values are non-negative integers. As with all UNIX environment variables, these are case-sensitive, and the convention is to use all-upper-case names. Syntax depends on the shell you use:

| Syntax | | |
|---|---|---|
| | `VARIABLE = value` | Bourne shell |
| | `set VARIABLE = value` or `setenv VARIABLE value` | C shell and its variants |

Parameters

*VARIABLE*
   Specifies the KSR QD control variable being used as an environment variable. See Table 11-1 for a list of KSR QD control variables.

*value*
   Specifies the value assigned to the corresponding KSR QD control variable. Variables can be unset by issuing the unsetenv command with a null value.

Table 11-1 KSR QD Control Variables

| Variable | Description |
|---|---|
| KSRQD_ARRAY_SIZE | If set to an unsigned integer, indicates the array size for array fetch by KSR QD parallel subqueries. KSR QD array fetch minimizes the number of client-server messages by fetching multiple rows per message in arrays. To enable KSR QD array fetch, KSRQD_ARRAY_SIZE must be set to a non-zero value. The default value is zero and means no array fetch. A value of one also means no array fetch, although the array fetch mechanism would be employed. |
| KSRQD_ARRAY _THRESHOLD | If set to an unsigned integer, indicates the array fetch threshold. A given parallel subquery starts using array fetch only after this many rows have been fetched. The default value is 0, meaning start right away (i.e., before the first row is fetched). If KSRQD_ARRAY_SIZE is zero, there will be no array fetching. |
| KSRQD_DISPLAY_TIME | If set to any value, causes KSR QD timing information to be computed and displayed. By default, this variable is not set. See Section 11.6 for more information. |
| KSRQD_DISPLAY_FILE | If set to a file specification and KSRQD_DISPLAY_TIME is also set, indicates the file where timing information is to be written. By default, this variable is not set, and all information is displayed on standard output. |
| KSRQD_MAXPARTITIONS | If set to a positive integer, determines the maximum degree of parallelism for queries (even if the partitioning table has more partitions than this value). The actual degree of parallelism for a query will be the minimum of this value (if set), and the number of partitions in the partitioning table of the query. The default value is the actual number of partitions. This parameter must be greater than zero. |
| KSRQD_MINPARTITIONS | If set to an unsigned integer, determines the minimum number of table partitions for which decomposition will be used. For example, if KSRQD_MINPARTITIONS = 3, a query against a 2-partition table will not be decomposed. The default value is two. |
| KSRQD_NOPARTITION | If set to any value, disables KSR QD within the user environment. It cannot be overridden by a KSRQD_MAXPARTITIONS query directive. Unsetting or removing this variable re-enables KSR QD within the local shell. By default, this parameter is not set. |

11.2 KSR QD Directives

Directives are used to control KSR QD on a per-query basis.

There are directives corresponding to the following environment variables:

- KSRQD_ARRAY_SIZE
- KSRQD_ARRAY_THRESHOLD
- KSRQD_MAXPARTITIONS
- KSRQD_MINPARTITIONS
- KSRQD_NOPARTITION

Directives follow the syntax rules of ORACLE optimizer hints, and they may be interspersed with ORACLE optimizer hints and other, non-directive comments.

In general, directives override or restrict settings of the environment variables of the same name. The only exception is the KSRQD_NOPARTITION directive (see Section 11.3.3, "Enabling/Disabling KSR QD per Query").

11.2.1 Syntax Rules for Directives

- Directives must appear within a directive comment.

- A directive comment is any comment which immediately follows the SELECT keyword (with or without intervening white space), and has a plus sign (+) immediately after the open-comment delimiter (/* or --).

- Each KSR QD directive consists of either a single keyword or a keyword followed by an equal sign (=) followed by an unsigned integer.

- A directive comment may contain zero or more KSR QD directives separated by blanks.

- For those directives which are followed by an equal sign and an integer, there can be no intervening tokens between the directive, the equal sign, and the integer.

- Any number of intervening tokens may appear between KSR QD directives and are treated as comments. This includes ORACLE optimizer hints.

- If a query contains a directive comment, that comment will be included in the parallel subqueries generated by KSR QD, either unmodified or with additional ORACLE optimizer hints generated by KSR QD to coerce specific optimizer behavior.

- KSR QD directives are case-insensitive. (In the examples below, directive names are in all-upper-case to better identify them with their environment-variable counterparts.)

➤ The same directive may not be specified twice in one query. Otherwise, all combinations are syntactically legal. If KSRQD_NOPARTITION is specified, however, the query will not be decomposed, and any other directives will be ignored. (This facilitates testing, because you can add and remove KSRQD_NOPARTITION for experimental purposes without having to make any other editing change to a query.)

11.2.2 Examples of Directive Comments

Example 1
```
select /*+ KSRQD_NOPARTITION */ avg(salary) from emp;
```

This query will not be decomposed due to the KSRQD_NOPARTITION directive.

Example 2
```
select --+ KSRQD_MAXPARTITIONS=10 KSRQD_ARRAYSIZE=100 full(emp)
* from emp, dept where emp.dno = dept.dno;
```

KSR QD will use a maximum of 10-way parallelism, and it will use array fetching to fetch 100 rows at a time, per parallel subquery. The full(emp) ORACLE optimizer hint will be treated as a comment by KSR QD but passed along to the ORACLE optimizer in the parallel subqueries, forcing ORACLE to use a full-table scan on the emp table.

11.3 Enabling/Disabling KSR QD

KSR QD can be enabled/disabled at three levels:

➤ Per database (by DBAs only)
➤ Per user environment (via environment variables)
➤ Per query (via KSR QD directives)

Disabling KSR QD at a higher level prevents enabling it at a lower level (i.e. if KSR QD is disabled in a database, it cannot be enabled within user environments for queries on that database; if it is disabled in a user environment, it cannot be enabled for any query run in that environment). At each level, the default is for KSR QD to be enabled, unless it is disabled at a higher level.

Enabling/disabling KSR QD is largely transparent except insofar as it affects performance. The same queries will return the same results. Queries containing explicit KSR QD directives can be run in an environment where KSR QD is disabled; the KSR QD directives will simply be ignored, and the query will not be decomposed.

The following are some of the visible differences seen when KSR QD is enabled or disabled:

- Execution plans generated while KSR QD is enabled will show parallel execution as one of the steps for all queries which will be decomposed. Execution plans generated while KSR QD is disabled will not show parallel execution as one of the steps for any query.

- Queries with no ORDER BY or GROUP BY clause will tend to return their results in a different order when they are decomposed than when they are not decomposed. When such a query is decomposed and executed several times, it will tend to return results in a different order each time. The SQL language does not define the order in which rows are returned for queries with no ORDER BY or GROUP BY clause.

- The parallel connections do not see the same transaction-consistent copy of the database, so if another user commits an update just as you are making connections for a KSR QD query, it is possible some of those connections will see the update, while others will not. The window of opportunity for this to happen is brief (the time it takes to make 20 or so connections in parallel).

- Executing a decomposed query in a transaction having uncommitted updates can have undesirable side effects.

- Because the parallel connections do not see the same "transaction snapshot" of the database as the main connection, they will not see any updates which the calling program has made, but has not yet committed. Inserting an extra COMMIT after the last update prior to a decomposable query will solve this problem.

- When KSR QD is used on a query containing aggregate functions or a GROUP BY clause, there is an implicit commit when the cursor for the query is opened, and another implicit commit when it is closed (caused by KSR QD creating and dropping the temporary table used to collect aggregate results from the parallel subqueries). Users are advised not to use KSR QD on queries in transactions having uncommitted updates unless the implicit commits generated by KSR QD are perfectly acceptable.

11.3.1 Enabling/Disabling KSR QD per Database

KSR QD is enabled by default in a newly created database, provided the scripts described in Section 10.1 have been run. Any user with DBA privilege may disable query decomposition for that database by executing the following SQL script:

@$ORACLE_HOME/rdbms/admin/ksr_disable_qd

A DBA may re-enable KSR QD for that database as follows:

@$ORACLE_HOME/rdbms/admin/ksr_enable_qd

These settings are persistent across shut-downs and start-ups of the database. They are associated with the database rather than with an ORACLE instance, so with Parallel Server, they affect all instances for a given database. They take effect immediately for all programs executing their first query after the setting has been changed. Once a given program has executed its first query, it will continue to run in whichever mode (enabled or disabled) was in effect when that query was executed.

11.3.2 Enabling/Disabling KSR QD per User Environment

KSR QD is enabled by default in a user environment, unless the user accesses a database for which KSR QD is disabled. KSR QD may be disabled in a user environment by setting the environment variable KSRQD_NOPARTITION to any value. KSR QD may be re-enabled by unsetting that environment variable.

11.3.3 Enabling/Disabling KSR QD per Query

KSR QD is enabled by default for a query, unless it is disabled at the database or environment level. It may be disabled by specifying the KSRQD_NOPARTITION directive within the query. KSRQD_NOPARTITION overrides any other KSR QD directives specified in the same query (so a user may add it and remove it without making any other editing changes to the query).

When KSR QD is disabled for a query, the query will not be decomposed. When KSR QD is enabled, it may be decomposed at the discretion of KSR QD, based on whether analysis of the query indicates decomposition is likely to be effective. If a minimum number of partitions has been specified for either the environment or the query (using the KSRQD_MINPARTITIONS environment variable or KSR QD directive, both discussed above), then a query will not be decomposed if its driving table has fewer than the specified number of partitions, even if KSR QD is enabled.

11.4 Kendall Square Extensions to EXPLAIN PLAN

When query decomposition is enabled and EXPLAIN PLAN is invoked for an SQL query, if the query in question would be decomposed, EXPLAIN PLAN produces an execution plan that includes a row providing information about how KSR QD is used for this query. The other rows of the plan show the optimization strategy ORACLE has chosen for executing the parallel subqueries.

Not all fields of the plan table are used for every kind of ORACLE row source. The following are the fields used for the special KSR QD row of an execution plan for a decomposed query; fields not mentioned here are set to null.

| | |
|---|---|
| STATEMENT_ID | Set as specified in EXPLAIN PLAN statement, or to null. |
| TIMESTAMP | Set to current date/time. |
| OPERATION | Set to KSR PARALLEL EXECUTION |
| OPTIONS | Indicate the type of combining function used by KSR QD: UNION ALL, MERGE, or AGGREGATION. |
| OBJECT_OWNER | Indicate the owner of the partitioning table. |
| OBJECT_NAME | Indicate the name of the partitioning table. |
| SEARCH_COLUMNS | Indicate the degree of partitioning (i.e., the number of parallel subqueries). |
| ID | Indicate the unique ID of this row within this particular plan. Set to 1 for the special KSR QD row. |
| PARENT_ID | Indicate the ID of the logical parent of this row. Set to null for the special KSR QD row (PARENT_ID is always null for the row whose ID is 1). |

11.4.1 EXPLAIN PLAN Examples

The following are examples of EXPLAIN PLAN statements for queries using KSR QD and their resultant execution plans. For more information on ORACLE's EXPLAIN facility, see the *ORACLE7 Server Application Developer's Guide*.

Example 1

The first EXPLAIN PLAN statement is for a simple query (no ORDER BY or GROUP BY clauses, joins, or aggregates). The emp table has 20 partitions.

```
EXPLAIN PLAN
SET STATEMENT_ID = 'query1'
FOR SELECT * FROM EMP WHERE SALARY > 30000;
SELECT OPERATION, OPTIONS, OBJECT_NAME, ID, PARENT_ID, SEARCH_COLUMNS
FROM PLAN_TABLE WHERE STATEMENT_ID = 'query1'
ORDER BY ID;
```

The following output is produced:

| OPERATION | OPTIONS | OBJECT_NAME | ID | PARENT_ID | SEARCH_COLUMNS |
|---|---|---|---|---|---|
| SELECT STATEMENT | | | 0 | | |
| KSR PARALLEL EXECUTION | UNION ALL | EMP | 1 | 0 | 20 |
| TABLE ACCESS | FULL | EMP | 2 | 1 | |

Example 2

The second EXPLAIN PLAN statement is for a query requesting DISTINCT values. KSR QD uses a MERGE combining function in this case.

```
EXPLAIN PLAN
SET STATEMENT_ID = 'query2'
FOR SELECT DISTINCT LNAME FROM EMP;
SELECT OPERATION, OPTIONS, OBJECT_NAME, ID, PARENT_ID, SEARCH_COLUMNS
FROM PLAN_TABLE WHERE STATEMENT_ID = 'query2'
ORDER BY ID;
```

The following output is produced:

```
OPERATION                OPTIONS      OBJECT_NAME   ID  PARENT_ID  SEARCH_COLUMNS
-------------------------------------------------------------------------------
SELECT STATEMENT                                     0
KSR PARALLEL EXECUTION   MERGE        EMP            1   0              20
SORT                     UNIQUE                      2   1
TABLE ACCESS             FULL         EMP            3   2
```

Example 3  The third EXPLAIN PLAN statement is for a query joining two tables and has aggregation and grouping. KSR QD chooses emp as the partitioning table because it is the driving table in ORACLE's plan for the join. ORACLE uses a nested-loops join and uses the unique key pk_dept to retrieve dept in the parallel subqueries.

```
EXPLAIN PLAN
SET STATEMENT_ID = 'query3'
FOR SELECT DNAME, AVG(SALARY) FROM EMP, DEPT
WHERE EMP.DNO = DEPT.DNO
GROUP BY DNAME;
SELECT OPERATION, OPTIONS, OBJECT_NAME, ID, PARENT_ID, SEARCH_COLUMNS
FROM PLAN_TABLE WHERE STATEMENT_ID = 'query3'
ORDER BY ID;
```

The following output is produced:

```
OPERATION                OPTIONS       OBJECT_NAME   ID  PARENT_ID  SEARCH_COLUMNS
--------------------------------------------------------------------------------
SELECT STATEMENT                                      0
KSR PARALLEL EXECUTION   AGGREGATION   EMP            1   0              20
SORT                     GROUP BY                     2   1
NESTED LOOPS                                          3   2
TABLE ACCESS             FULL          EMP            4   3
TABLE ACCESS             BY ROWID      DEPT           5   4
INDEX                    UNIQUE SCAN   PK_DEPT        6   5
```

11.5  Relationship of ORACLE Hints and KSR QD Directives

The KSR QD directives follow the general syntax of an ORACLE hint:

> They must appear in a comment immediately following a SELECT statement.

ORACLE hints are allowed in SELECT, DELETE, or UPDATE statements, but since DELETE and UPDATE statements are never decomposed, KSR QD directives only have meaning after a SELECT statement.

➤ The open comment delimiter (/* or --) must be immediately followed by a plus sign (+) with no intervening white space.

➤ Other comments, in addition to the reserved KSR QD directives, may appear within the same comment, and they will be ignored by KSR QD.

NOTE: ORACLE also permits non-hint comments to be interspersed with hints. From ORACLE's perspective, the KSR QD directives are comments, while from KSR QD's perspective, ORACLE hints are comments.

KSR QD directives and ORACLE hints are semantically independent. The presence of ORACLE hints in a query does not affect KSR QD's decision whether to decompose the query, except insofar as the hints yield an optimizer plan appropriate for decomposition. Conversely, the presence of a KSR QD directive in a query has no affect on ORACLE's optimization. Note, however, that the presence of any ORACLE hint other than NOCOST implies use of the cost-based optimizer, even in cases where statistics are not available for any table in the query. Without the hints, the heuristic optimizer will be used.

The KSR QD parser does not need to understand ORACLE hints, and it ignores them along with anything else within a comment that is not a KSR QD directive. When KSR QD passes the input query to the ORACLE EXPLAIN PLAN facility, the latter will take any hints into account in producing the execution plan. KSR QD does not need to know whether the plan was influenced by hints, only what the plan is. When a query is decomposed into parallel subqueries, any hints are replicated in the subqueries. This ensures ORACLE chooses the same strategy for executing the subqueries as when EXPLAINing the input query (KSR QD relies on the assumption this will be the case).

Driving Table    KSR QD always partitions on the driving table of a join, provided that table is retrieved in a manner facilitating partitioning (indexed and full-table scans permit partitioning). ORACLE hints provide a way to control the choice of driving table and the manner of retrieving that table, and thereby provide a way to control the choice of the partitioning table.

The ORACLE optimizer's default strategy for a query may not always be the most efficient strategy to use in conjunction with KSR QD. In this situation, ORACLE hints provide a means for users to second-guess the ORACLE optimizer, based on their ability to take KSR QD into account and coerce a different choice of driving table.

11.6 KSR QD Timing Utility

You can choose to receive timing information to help you evaluate the effectiveness of KSR QD processing your queries. The timing utility can be enabled at the session level with an environment variable. The timing utility is accessed through SQL*Plus or a KSR QD linked Pro*C program.

| Environment Variable | KSRQD_ISPLAY_TIME controls display of KSR QD's timing information. If it is set, KSR QD measures and displays timing statistics for various steps in the execution of a query. Setting the environment variable KSRQD_DISPLAY_FILE to a filename causes the timing statistics to be placed in that file. If this is not set, the information is sent to standard output. |
|---|---|

The timing utility provides information about five processing phases, as shown in Table 11-2.

Table 11-2  KSR QD Timing Information

| Processing Phase | Timing Statistic | Description |
|---|---|---|
| Preparing Query | Full Preparation time | Time to analyze and prepare a query (including parsing the query, performing semantic analysis, checking whether the query would benefit from decomposition, and generating data structures needed for later KSR QD processing) |
| Opening Query | Create Temp Table time | Time to create the temporary table used for processing aggregate functions. |
|  | Query Open time | Time for the main thread to open the query (including creating threads, forking processes, and waiting for child threads to open parallel subqueries) |
| Executing Subqueries | Subquery | Identifies which subquery the following statistics refer to |
|  | Rows | Number of rows retrieved |
|  | Connect | Time for the subquery to connect to ORACLE |
|  | Fetch | Time for the subquery to retrieve all its rows |
|  | Close | Time to close the subquery, including closing the parallel cursor |
| Closing Query | Drop Temp Table time | Time to drop the temporary table used for processing aggregate functions |
|  | Query Close time | Time for the main thread to close a query, including waiting for child threads to close parallel subqueries |
| Execution | Full Execution time | Total time for KSR QD to execute a query, including open and close times for the main thread, but not including preparation |

—47—

NOTE: The sum of times for all timing statistics in a given processing phase may not be the total time for that phase. Timing statistics are provided only for *significant* steps in the KSR QD process.

Example

The following example shows the times involved in decomposing a query with aggregate function into five subqueries:

Timing Utility Example (Part 1 of 2)

```
18% setenv KSRQD_DISPLAY_TIME ""
19% setenv KSRQD_DISPLAY_FILE qdstat.dat
```
Internal SQL*Plus timing options are enabled from the start.
```
20% sqlplus user/password SQL*Plus: Version 3.1.1.4.2 - Developer's Release on Tue Jul 27 10:17:22 1993

Copyright (c) Oracle Corporation 1979, 1992. All rights reserved.

KSR Query Decomposer: Version 0.1.4.10

Connected to:
ORACLE RDBMS V7.0.13 - Developer's Release

SQL> set timing on

SQL> select /*+ KSRQD_MAXPARTITIONS=5 */ count(*) from sample_table;
5 ORACLE servers started.

COUNT(*)
----------
  922789 real: 32.0000
SQL> exit
Disconnected from ORACLE RDBMS V7.0.13 - Developer's Release 21% cat qdstat.dat Query Decomposition started Tue Jul 27 10:21:14 1993

Preparing Query
Number of Subqueries: 5
Full Preparation time: 5.860122

Opening Query
Create Temp Table time: 1.079930
Query Open time: 4.960028
```

Timing Utility Example (Part 2 of 2)

```
Executing Subqueries
Subquery     Rows    Connect      Fetch        Close
4            1       2.999250     19.460084    0.260256
1            1       2.559894     21.619996    0.260256
3            1       2.858944     20.079922    0.360002
2            1       3.099778     20.039926    0.440000
5            1       2.623164     19.496708    0.500002

Closing Query
Drop Temp Table time: 2.380004
Query Close time: 2.940004

Full Execution time: 29.019922
```

11.7 Array Processing

Array processing can improve performance by reducing the number of calls from an application to ORACLE. Array processing allows an application to fetch multiple rows with only a single call to the ORACLE kernel. This is an important performance technique you can use in your applications.

Choosing Array Size  The performance benefits of array processing depend upon the size of the array. By increasing the array size, you can further reduce the number of calls to ORACLE. Increasing the array size beyond a certain point, however, will yield negligible performance gains at the expense of memory consumption.

Example  For example, suppose your application fetches 10,000 rows. Without array processing, the application must call ORACLE 10,000 times, once for each row. However, with array processing and an array size of 100, the application must call ORACLE only 100 times, once for every 100 rows. In this case, increasing the array size to 100 reduces the number of calls by 9,900.

Increasing the array size above 100 does not significantly improve performance. An array size of 1,000 reduces the number of calls to 10. This performance gain is relatively small compared to the gain from increasing the array size from 1 to 100. Increasing the array size to 1,000 also increases the amount of memory needed to hold the array.

11.7.1 Use of Array Processing at the Query Level

Many ORACLE application tools can take advantage of array processing. These tools include:

- ORACLE Precompilers
- ORACLE Call Interface (OCI)
- SQL*Plus

-49-

SQL* Plus, for example, uses array processing automatically to return many rows from the database at once. It allows you to control the number of rows returned at a time through the SQL*Plus variable ARRAYSIZE (see *"SQL*Plus User's Guide and Reference"*). You can improve the performance of your queries by setting ARRAYSIZE appropriately. The trade-off is SQL*Plus needs a larger buffer to store the rows of your query if it is fetching them using a bigger array size.

Setting ARRAYSIZE in an application like SQL*Plus when KSR QD is enabled is not sufficient to ensure array fetches will be used across the client-server interface. It only ensures array fetches will be used between SQL*Plus and KSR QD. The KSRQD_ARRAY_SIZE environmental variable or directive must be used to cause the parallel subqueries to use array fetches when communicating with the server.

11.7.2 Use of Array Processing at the Subquery Level

Array processing can be used at the query level, the subquery level (by KSR QD), or both. Both query and subquery array processing give you an analogous way to improve your query performance, but they operate independently.

When you choose the array-fetch feature of KSR QD, you are applying array processing to each subquery. You can set the array size explicitly or you can let KSR QD help you determine the appropriate array size through a threshold mechanism. The threshold enables you to use array fetch even though you do not know how many rows will be fetched by your query. If you set the threshold, array fetching will not begin until the threshold has been reached. It will then set the array size to the value of the threshold. For those cases where the number of rows fetched is so small that array fetching will be inappropriate, it is not enabled.

The performance gains from array fetching can be considerable because of the multiplicative effect of the number of subqueries. However, the trade-off between performance and memory utilization needs to be watched even more closely. With each subquery accessing additional buffers for row storage, be careful memory does not become a performance bottleneck.

11.8 KSR QD Usage Notes

1. Do not execute queries using KSR QD if you are in the midst of a transaction with uncommitted updates. See Section 11.3, "Enabling/Disabling KSR QD" for further details.

2. Users of KSR QD require the ability to create tables in their TEMPORARY tablespace to use KSR QD on queries using an intermediate table (all queries containing aggregate functions).

By default, a user's TEMPORARY tablespace is SYSTEM, but this can be altered by the TEMPORARY TABLESPACE clause of the ALTER USER statement. Ordinarily, the TEMPORARY tablespace is used by ORACLE to create temporary segments (e.g., for sorts), and this does not require any special privilege on the user's part.

However, KSR QD intermediate tables, while temporary from KSR QD's standpoint, are ordinary tables as far as ORACLE is concerned. The user must have the privilege to create tables.

A user can be enabled to create tables in a given tablespace either by granting the RESOURCE role to the user, or by using the QUOTA clause of the ALTER USER statement to grant the user a storage quota in a specified tablespace. If a quota is used, it must be sufficient to permit creating a table with default storage attributes. The quota also must be sufficient to hold all the rows of the intermediate table, which can be quite large in some cases (see usage note 3).

NOTE: If a user without the ability to create tables in the TEMPORARY tablespace attempts to execute a query for which KSR QD requires an intermediate table, the query will be executed without using KSR QD (no warning will be issued).

3. Queries using an intermediate table (queries containing aggregates) may run out of space for the intermediate table.

This can happen if either the tablespace containing the intermediate table runs out of space, or if the intermediate table grows to a point that exceeds the user's quota for that tablespace. In either event, the same ORACLE error that would be returned if the user were explicitly inserting rows into a table in that tablespace and ran out of space will be returned.

In most cases, the KSR QD intermediate table stays quite small, because at any given time it contains at most one row for each parallel subquery (i.e., number of rows ≤ degree of partitioning). For one particular class of queries, the intermediate table can potentially grow much larger: queries which contain both a GROUP BY clause and an ORDER BY clause. For such queries, the maximum number of rows in the intermediate table equals the degree of partitioning times the number of groups in the query result. It is very unlikely this will exhaust the space in the temporary tablespace, because it is less temporary space than ORACLE needs for each parallel subquery (which already will be freed up before the stage of query execution at which the KSR QD intermediate table is populated). It is possible a user's personal quota will be exhausted, however, since ORACLE's temporary segments for sorts are not governed by the quota, but the KSR QD intermediate table is governed by it.

4. Not all queries can be decomposed. KSR QD decides whether to decompose a query based on analyzing the query and ORACLE's explain plan. If KSR QD decides not to decompose, it silently lets ORACLE execute the query, as if KSR QD were not present.

NOTE: The only way to tell whether a query is decomposed is to use EXPLAIN PLAN to see the execution plan for the query. If KSR QD is used, the execution plan will include a KSR PARALLEL EXECUTION line.

5. KSR QD requires the driving table of a query have at least KSRQD_MINPARTITIONS partitions and be retrieved by either indexed scan or full-table scan (not hash access), to decompose a query.

6. There is a performance overhead for KSR QD. The following are approximate overhead figures to help decide whether it is a good idea to use KSR QD on a given application or query:

➤ Ten seconds or more for queries which are decomposed (increases with number of parallel subqueries). This cost is incurred only for queries which are decomposed.

➤ Sub-second to a few seconds to determine whether a query can be decomposed. This cost is incurred for all queries when KSR QD is enabled.

NOTE: For a given query you know will not be decomposed, you can reduce this to a minimum by using the KSRQD_NOPARTITION directive in the query— this avoids the cost of calling EXPLAIN or executing any dictionary queries to decide whether to decompose the query.

➤ Sub-second (generally very small) cost to check whether KSR QD is enabled. This cost is payed for all queries (whether or not KSR QD is enabled) when running a client application (e.g., SQL*Plus) with KSR QD linked in.

7. KSR QD intermediate tables may not get dropped in some cases, if errors occur during query execution.

Usually when this happens, they have no rows in them, but occasionally they do contain a few rows. A KSR QD intermediate table is created when a user executes a query containing aggregate functions, using KSR QD. It is owned by that user, and has a unique name starting with QDIT (for example, QDIT169538333). KSR QD is supposed to drop the intermediate table at the end of a query, or if any error occurs during query execution, but in some cases (particularly if the application executing the query crashes), this does not occur. The presence of these tables is relatively benign, but eventually they may exhaust a user's storage quotas, so it is best to drop them. They may be dropped using the DROP TABLE statement or running the qdcleanup program (see Section 10.3.2).

8. INSERT statements of the following form are decomposed by KSR QD and executed in parallel:

INSERT INTO TABLE X SELECT...

INSERT statements of the following form are not decomposed because the SELECT statement is syntactically treated as a subquery, which KSR QD does not decompose:

`INSERT INTO TABLE X (SELECT...)`

Parallelizing Decision Support Queries in Version 1 of ORACLE for KSR
(Database Note #21)

1. Introduction

Described below is a "front-end" to the ORACLE database management sytem that can parallelize a reasonable class of decision support queries *without* requiring major changes to the DBMS itself.

To achieve this goal, we propose herein a new *query decomposition* approach, in which parallel subqueries are submitted to the DBMS, matching the physical data declustering already permitted through table "striping" in ORACLE. We believe that query decomposition is applicable to a very significant class of decision support queries, has excellent potential for performance gain for this class, and will be achievable with reasonable engineering effort at KSR. Furthermore, this is an approach that can eventually benefit all users of ORACLE on parallel and shared-memory multiprocessor machines.

Section 2 (of this database note) describes our query decomposition approach in more detail, including a simple example. Section 3 discusses the critical problems that need to be solved to implement this approach. Section 4 analyzes the applicability of query decomposition with respect to a number of sample queries.

2. Query Decomposition Approach

ORACLE permits the DBA to specify table "striping" in the CREATE TABLESPACE command. A large table may be broken up into a number of files, spread across multiple disks. This is mainly viewed as an OLTP-oriented technique, aimed at optimizing random access to tables. Depending on how the file extents are populated, there may be some degree of data skew in terms of tuple distributions. However, striping is effectively a physical partitioning that we believe is adequate to support query decomposition.

Query decomposition is done by making a number of copies of the original query, and then appending additional predicates to each subquery to make it match one of the existing partitions of one of the tables in the query. These subqueries are then executed in parallel. Finally, a combining query (or function) over the subquery results produces the result of the original query. Most commonly, this is the union over the subquery results.

We use the notation "Q/t/i" to represent the ith subquery resulting from decomposing query Q to match an m-file physical partition of table t, where i=1, ..., n. Table t is called the *partitioning table*. We impose the reasonable constraint that n≤m, so that we don't produce more subqueries than there are underlying data partitions.

To give a simple example, assume that table *emp* is distributed over files with FILEIDs in the sorted list [2, 5, 91, 112, 113, 115], and that we want three subqueries to be formed from query Q, with *emp* as the partitioning table. In this case, m=6 and n=3. Assume further that an index exists on *emp.location*, and recall that in general, the FILEID component of a ROWID in table t can be calculated as SUBSTR(t.ROWID,15,4).

Let Q be *SELECT * FROM emp WHERE emp.location="Boston"*. Then we will produce three subqueries:

```
Q/emp/1: SELECT * FROM emp WHERE emp.location="Boston"
    AND SUBSTR(emp.ROWID,15,4)≥2 AND SUBSTR(emp.ROWID,15,4)<91

Q/emp/2: SELECT * FROM emp WHERE emp.location="Boston"
    AND SUBSTR(emp.ROWID,15,4)≥91 AND SUBSTR(emp.ROWID,15,4)<113

Q/emp/3: SELECT * FROM emp WHERE emp.location="Boston"
    AND SUBSTR(emp.ROWID,15,4)≥113
```

The predicates on *SUBSTR(emp.ROWID,15,4)* can be evaluated using ROWID values from the index on *emp.location*. Each subquery therefore retrieves its results from a separate partition of the *emp* table. The union over the three subquery results yields the result of the original query Q. (Note that the predicates on, e.g., Q/emp/1, are equivalent to "AND emp.ROWID>='0.0.2' AND emp.ROWID<'0.0.91'," the form used elsewhere.)

In this query decomposition approach, the degree of parallelism is limited by the number of physical partitions of the partitioning table, but not by the inherent parallelism in the query, as is the case for inter-operator parallelism. In the future it should be possible to leverage our initial work by basing query decomposition on hash-partitioned data, or by decomposing queries according to other criteria than matching data partitions.

3. Critical Problems To Be Solved

Critical problems to solve in implementing this approach are:

(1) Decomposing queries into effectively parallelizable subqueries that match one or more partitions, (2) Submitting subqueries to the DBMS and executing them in parallel, (3) Avoiding excessive query optimization overhead for the multiple subqueries, (4) Producing correctly-optimized access plans for the multiple subqueries, (5) Restricting subqueries to reading only the relevant physical partitions of the partitioning table, and (6) Assembling the results of subqueries.

Our initial cuts at solutions to these problems are presented below. Included are the modest requirements on the ORACLE DBMS that we believe are needed to support external query decomposition and subquery execution.

3.1 Decomposing queries into subqueries

We plan to build a *query decomposer* module that will read user-specified "comments" on SQL queries and produce the appropriate subqueries. These directives disguised as comments will specify the partitioning table and (possibly) the maximum number of subqueries to be produced. The rules and hints in section 4.4 should help the application programmer to make these choices. The directive language should be consistent with ORACLE's version 7.0 language for passing directives to the query optimizer.

It may also be possible for us to automate the choice of partitioning table. This avoids having to depend on the application programmer to correctly determine which queries can be effectively parallelized and how to do it. However, it requires the decomposer to analyze the entire query and predict optimization strategies.

A few classes of queries will require more than just appending partition-matching predicates to produce effectively-parallelizable subqueries. For example, queries involving the aggregate function *AVG* will require additional expressions in the target list of each subquery in order to later assemble subquery results correctly. As discussed in section 4, several classes of queries are not effectively parallelizable.

4. Characterization of Decomposable Queries

It is important to understand which queries are decomposable, since this defines the limits of applicability of the proposed decomposition approach. We begin with some useful notation. Then we treat abstract queries Q1-Q12, and more concrete queries Q13-Q16. Finally, we summarize the rules for choosing the partitioning table and join order, and characterize the class of decomposable queries.

This is an initial cut, where we have considered a representative but not exhaustive set of queries.

We assume the use of the ORACLE 7.0 query optimizer, but may not have captured its exact behavior. Many of the same results could be achieved with the 6.0 optimizer.

A reader wishing to skip the details on first reading should jump ahead to section 4.4.

4.1 Notation

As before, $Q/t/i$ represents the ith subquery resulting from decomposing query $Q$ to match an m-file physical partition of table $t$, where i=1, ..., n.

To make it simpler to describe the decomposed subqueries in sections 6.2 and 6.3, we introduce the *in_interval* predicate: *in_interval(t.FILEID,i)* is true for tuples in the *ith* group of files for table *t*. The predicate translates into the appropriate conditions on FILEIDs (i.e., on *SUBSTR(t.ROWID,15,4)*), as was shown in the example in section 2.

In the discussion, *index(t.x)* means there exists an index on the *x* attribute of table *t*.

A nested loops join, with *a* as the outer table and *b* as the inner will be written *NLJ(a,b)*. A merge join of *a* and *b* will be written *MJ(a,b)*.

4.2 Abstract queries

Queries Q1 through Q12 are against tables *a*, *b*, and *c*. By starting with simple, abstract queries and adding increasingly complex conditions, we hope to better characterize the applicability of the query decomposition approach. Given our decision-support orientation, we have considered just read-only queries, and not data manipulation statements that do updates, deletions, or modifications.

We assume that all tables are partitioned across multiple disks, so that any table can be the *partitioning table* for a given query. Some of the case-by-case analyses below depend on the existence of indexes to support join predicates; in a reasonably-designed database, such indexes are usually present. Parallelizing subqueries *effectively* is taken to mean achieving a significant speedup through parallel execution. We assume that a combining query or function is used on the results of subquery execution.

Simple selection

Q1: *SELECT \* FROM a*

Q1/a/i: *SELECT \* FROM a WHERE in_interval(a.FILEID,i)*

Under ORACLE 6.0 or 7.0, this will result in a full table scan for each subquery, with no performance speedup at all. However, once ORACLE is able to use the extent directory as a FILEID "filter" for this class of query, then the subqueries can be effectively parallelized.

Selection with a predicate

Q2: *SELECT \* FROM a WHERE a.x=v1*

Q2/a/i: *SELECT \* FROM a WHERE a.x=v1 AND in_interval(a.FILEID,i)*

Assume *index(a.x)*. According to ORACLE, the index will be used to apply the predicate on *a.x* and the predicates on *FILEID*. This effectively parallelizes the subqueries. If there is no index, then the query can be treated as was Q1, with the *a.x* predicate being checked against all rows scanned by each subquery.

Simple join

Q3: *SELECT \* FROM a,b WHERE a.z=b.z*

Q3/a/i: *SELECT \* FROM a,b WHERE a.z=b.z AND in_interval(a.FILEID,i)*

Assume only *index(b.z)*. Then the optimizer will generate *NLJ(a,b)*. The tuples in each partition of *a* are joined with *b*, using the index on *b*, effectively parallelizing the subqueries.

If *index(a.z)* instead, use *b* as the partitioning table and reverse the roles of the two tables. In other words, generate:   Q3/b/i: *SELECT \* FROM a,b WHERE a.z=b.z AND in_interval(b.FILEID,i)*

If *index(a.z) and index(b.z)*, then one of *a* and *b* will be chosen by the optimizer as the outer table, and should also be used as the partitioning table. By default, the optimizer will pick the *smaller* table as the outer one. However, if the smaller table has very few partitions, it is preferable to direct the optimizer to choose the *larger* table as the outer one, and to use it as the partitioning table as well. In either case, the subqueries can be effectively parallelized.

Finally, in the rare case where no index exists to support the join, then ORACLE will generate *MJ(a,b)*, and will sort both *a* and *b* before performing the join. While the query can still be decomposed into subqueries, say Q3/a/i, the problem is that *each* subquery will sort the entire *b* table. The likely result is relatively little performance speedup. Note that a parallel hash join operator would help in this case, if it were available.

Strictly speaking, one can do a nested loops join even if there is no index on the inner table. This is appropriate if the inner table is small and can be quickly searched in main memory. The ORACLE 6.0 optimizer can be forced to choose this strategy if desired.

Join with a single-table predicate

Q4: *SELECT \* FROM a,b WHERE a.x=v1 AND a.z=b.z*

Q4/a/i: *SELECT \* FROM a,b WHERE a.x=v1 AND a.z=b.z AND in_interval(a.FILEID,i)*

If *index(a.x) and index(b.z)*, then *NLJ(a,b)* will be generated. The index on *a.x* will be used to apply the predicate and to get FILEIDs; this is straightforward and effective. *NLJ(a,b)* will also be

- 59 - generated if *index(a.x) and index(a.z) and index(b.z)*, with the two indexes on *a* being intersected before *a* tuples are retrieved.

If *index(a.x) and index(a.z)*, then *b* should be used as the partitioning table, since *NLJ(b,a)* will probably be generated, with the two indexes on *a* being intersected before inner tuples are fetched. In other words, generate: Q4/b/i: *SELECT * FROM a,b WHERE a.x=v1 AND a.z=b.z AND in_interval(b.FILEID,i)*

If *not index(a.x)*, Q4 reduces to the Q3 case. In other words, there is no problem unless *not index(a.x) and not index(a.z) and not index(b.z)*. In that case, *MJ(a,b)* will be generated, and the subqueries cannot be effectively parallelized.

Join with predicates on both tables

Q5: *SELECT * FROM a,b WHERE a.x=v1 AND b.y=v2 AND a.z=b.z*

Q5/a/i: *SELECT * FROM a,b WHERE a.x=v1 AND b.y=v2 AND a.z=b.z AND in_interval(a.FILEID,i)*

Q5/b/i: *SELECT * FROM a,b WHERE a.x=v1 AND b.y=v2 AND a.z=b.z AND in_interval(b.FILEID,i)*

If *index(a.x) and index(b.y) and index(a.z) and index(b.z)*, then nested loop joins are possible with either *a* or *b* as the outer table. The choice will be made based on the selectivity of the two single-table predicates Ð the more selective predicate will be applied to the outer table. If *NLJ(a,b)* is generated, then Q5/a/i is appropriate; if it is *NLJ(b,a)*, then Q5/b/i is the preferred decomposition into subqueries. Either way, the subqueries can be effectively parallelized.

If only one of the indexes supporting single-table predicates is present, say *index(a.x)*, then Q5 reduces to the Q4 case. If neither is present, then Q5 reduces to the Q3 case.

Three-table join with predicates on two tables

Q6: *SELECT * FROM a,b,c WHERE a.x=v1 AND b.y=v2 AND a.z=b.z AND b.w=c.w*

We will not do an exhaustive, case-by-case analysis here. The heuristics to use for this query, and for more complicated p-way joins, are the following (generalized from Q3-Q5):

(1) If all tables are indexed (on either a join or a non-join attribute), the application programmer should choose as partitioning table the one with the most selective index on a non-join attribute. This will be the outer table in an initial nested loop join, with FILEIDs taken from its non-join attribute index.

(2) If all tables but one are indexed, choose that one as the partitioning table. This will be the outermost table in an initial nested loop join, with FILEIDs taken from its extent directory.

(3) If two or more tables do not have indexes, the largest of the non-indexed tables should be chosen as the partitioning table. The others should be the last tables to be joined, to minimize sorting costs for the merge join(s) required.

In summary, the preferred join order of tables is: first, the largest unindexed table, if one exists; followed by all indexed tables, in order of decreasing predicate selectivity (including both join predicates and single-table predicates); followed by all remaining unindexed tables, if any. This supports access plans that consist of one or more nested loops joins, followed by zero or more merge joins.

Join with an ORDER BY clause

Q7: *SELECT * FROM a,b WHERE a.z=b.z ORDER BY a.x*

Q7/a/i: *SELECT * FROM a,b WHERE a.z=b.z AND in_interval(a.FILEID,i) ORDER BY a.x*

Assume the existence of at least one useful index, so that an effective decomposition exists *without* the ORDER BY clause. It is up to the combining query or function to handle the final step of merging sorted subquery results. This can be generalized: any multi-way join that can be effectively parallelized can still be effectively parallelized when a simple ORDER BY clause is added. Expressions in the ORDER BY clause may cause a problem, however.

Simple aggregate retrieval

Q8: *SELECT MAX(a.x) FROM a*

Q8/a/i: *SELECT MAX(a.x) FROM a AND in_interval(a.FILEID,i)*

The subqueries themselves can be effectively parallelized, but the *union* of the subquery results clearly does not produce the correct result for the query. What is needed is a combining query or function over the union of the subquery results that selects (in this case) the maximum value.

Distinct value selection

Q9: *SELECT DISTINCT a.x FROM a WHERE a.y=v1*

Q9/a/i: *SELECT DISTINCT a.x FROM a WHERE a.y=v1 AND in_interval(a.FILEID,i)*

The subqueries can be effectively parallelized. Since ORACLE currently does a sort on *a.x* for each subquery in order to weed out duplicates, the subquery results are assumed to be sorted on this field. Combining the subquery results then requires just one more level of duplicate elimination.

The keyword *DISTINCT* can also appear inside of an aggregate function (e.g., *AVG (DISTINCT a.y)*). This construct cannot be effectively parallelized; it is impossible to combine subquery results in a meaningful way.

Aggregate retrieval with a GROUP BY clause

Q10: *SELECT MIN(a.x) FROM a GROUP BY a.y*

Q10/a/i: *SELECT MIN(a.x) FROM a WHERE in_interval(a.FILEID,i) GROUP BY a.y*

This is similar to query Q8. It is possible to generate parallel subqueries, and execute them effectively. Combining the results requires merging the result groupings produced by the subqueries.

HAVING clause with an aggregate

Q11: *SELECT a.x, MIN(a.y), AVG(a.z) FROM a GROUP BY a.x HAVING MIN(a.y)<v3*

Q11/a/i: *SELECT a.x, MIN(a.y), AVG(a.z) FROM a WHERE in_interval(a.FILEID,i) GROUP BY a.x HAVING MIN(a.y)<v3*

This subquery formulation will not lead to the correct result for the original query. The problem is that the *HAVING MIN(a.y)<v3* is only applied to *a* tuples for which *in_interval(a.FILEID,i)* is true (i.e., tuples in the subquery's partition). In fact, the *HAVING* clause should be applied to all *a* tuples instead.

If the form above is too abstract, think of: *SELECT emp.deptno, MIN(emp.sal), AVG(emp.sal) FROM emp GROUP BY emp.deptno HAVING MIN(emp.sal)<40000*

Correlated subquery

Q12: *SELECT a.x, a.y, a.z FROM a aa WHERE a.x=v1 AND a.y> (SELECT AVG(a.y) FROM a WHERE a.z=aa.z)*

Q12/a/i: *SELECT a.x, a.y, a.z FROM a aa WHERE a.x=v1 AND in_interval(a.FILEID,i) AND a.y> (SELECT AVG(a.y) FROM a WHERE a.z=aa.z)*

This seems to be effectively parallelizable. The correlated subquery will be evaluated once for each tuple in table *a* satisfying the single-table predicate, but that happens in parallel, matching the partitioning of the table.

If the form above is too abstract, think of: *SELECT emp.location, emp.sal, emp.dept FROM emp empxx WHERE emp.location="Boston" AND emp.sal > (SELECT AVG(emp.sal) FROM emp WHERE emp.dept=empxx.dept)*

4.3 Concrete queries

These are divided by type of database design.

Datacube-design query

Q13: *SELECT SUM(sales.volume), product.name FROM sales, product WHERE product_code≥6 AND product_code<12 AND sales.region="Boston" AND sales.quarter="Q2" AND sales.year=1990 AND product.product_code=sales.product_code GROUP BY sales.product_code*

This query is effectively parallelizable, given a sophisticated combining function.

Hierarchical-design query

Q14: *SELECT emp.last_name, emp.first_name FROM emp WHERE (dept.dept_name="MFG" OR dept.dept_name="QC") AND emp.deptno=dept.deptno AND EXISTS (SELECT training.type WHERE training.type="Quality Control" AND training.date>"010188" AND training.emp_name=emp.emp_name)*

This matches the form of Q12, and is effectively parallelizable.

Event-design queries

Q15: *SELECT claim.amt, claim.classification, vehicle.vno FROM claim, vehicle WHERE claim.amt>10000 AND vehicle.state='MA' AND (claim.classification="Suspicious" OR claim.classification IS NULL) AND claim.vno=vehicle.vno*

Assuming reasonable indexes (say, at least *index(vehicle.vno)*), this is effectively parallelizable. It matches the form of Q5 with a few extra predicates.

Q16: *SELECT * FROM policy, vehicle, more_vehicle_info, claim, estimate WHERE vehicle.coverage_date>"010190" AND estimate.claim#=claim.claim# AND claim.veh#=vehicle.veh# AND more_vehicle_info.veh#=vehicle.veh# AND policy.pol#=vehicle.pol#*

This is effectively parallelizable, with *vehicle* as the partitioning table (since indexes are assumed to exist on all relevant join fields). If *claim* and *estimate* tables are clustered, then one less join needs to be done.

4.4 Heuristic rules

The following heuristic rules characterize the choice of partitioning table (also referred to as "driving table" elsewhere) and join order, and the set of decomposable queries (assuming that the underlying tables are all partitioned). We expect these rules to be refined over time. A first implementation may use the first table in the optimizer's EXPLAIN plan as the partitioning table.

Choice of partitioning table

(1) If all tables are indexed (on either a join or a non-join attribute), choose as partitioning table the one with the most selective index on a non-join attribute. This will be the outer table in an initial nested loop join, with FILEIDs taken from its non-join attribute index.

(2) If all tables but one are indexed, choose that one as the partitioning table. This will be the outermost table in an initial nested loop join, with FILEIDs taken from its extent directory.

(3) If two or more tables do not have indexes, the largest of the non-indexed tables should be chosen as the partitioning table. The others should be the last tables to be joined, to minimize sorting costs for the merge join(s) required.

Choice of join order

(4) The preferred join order of tables is: first, the largest unindexed table, if one exists; followed by all indexed tables, in order of decreasing predicate selectivity (including both join predicates and single-table predicates); followed by all remaining unindexed tables, if any. This supports access plans that consist of one or more nested loops joins, followed by zero or more merge joins.

Decomposable queries

(5) Queries containing any of the aggregate functions *AVG, SUM, COUNT, STDDEV, and VARIANCE,* modified by the keyword *DISTINCT*, cannot be effectively parallelized, because subquery results cannot be correctly combined to produce the result of the original query.

(6) If an otherwise effectively parallelizable query contains *AVG* in a target list expression, the query is still effectively parallelizable, assuming a sophisticated combining function or query. However, additional expressions (i.e., *COUNT and SUM*) in the target list of each subquery need to be generated so that subquery results can be assembled correctly.

(7) Similarly, otherwise effectively parallelizable queries containing the aggregate functions *STDDEV* or *VARIANCE* can be effectively parallelized through target list modification and a sophisticated combining query.

(8) If an otherwise effectively parallelizable query contains a *GROUP BY* clause (i.e., a single field reference to a field in the target list), the query is still effectively parallelizable.

(9) If an otherwise effectively parallelizable query contains a HAVING clause, then the query is still effectively parallelizable by moving the having clause to the combining query.

(10) If an otherwise effectively parallelizable query contains a simple *ORDER BY* clause (i.e., a position reference to the target list, or a single field reference to a field in the target list), the query is still effectively parallelizable.

(11) If an otherwise effectively parallelizable query contains a *SELECT DISTINCT*, it can be effectively parallelized. In contrast to rule (6), *DISTINCT* is applied here to an expression in the target list.

(12) Non-flattenable nested subqueries can be effectively parallelized, if they do not contain any other problematic constructs.

(13) Clustered tables (such as *emp* kept clustered with *dept*) do not block effective parallelizability.

Query Decomposition in ORACLE for KSR Preliminary Design (Database Note #26)

1 Introduction

The process of decomposition requires the following questions to be answered:

a) Is decomposition enabled?
b) Can this query be correctly decomposed?
c) Will decomposition be effective for this query?
d) Which table should be used for partitioning?
e) What is the degree of partitioning (i.e., number of subqueries)?

Decomposition will be done when the answers to (a), (b), and (c) are yes. The user will always retain the ability to disable decomposition if desired. We intend to automate the answers to all of these questions.

An application programmer can override any of the automatic decomposition decisions by using directives in the SELECT statement, in the form of embedded comments. The exact form of these directives are not described in this database note, but will adhere to the style used in ORACLE. For purposes of this database note, we will make some rational guesses about what they might look like.

Query decomposition can be used with Pro*COBOL, Pro*C, SQL*Plus, OCI, SQL*Report, and possibly SQL*ReportWriter when it gets rewritten to use UPI in ORACLE version 7.0. (It might also work with the precompilers for other languages, but we will make no special effort to insure that.) We would like to support QD for PL/SQL, but have not yet determined how much additional work would be needed, if any.

The parallel execution of queries via QD can be selectively enabled and disabled without changing any application code. A parallel application can be written and initially tested in serial mode. After it is working correctly, parallelization can be turned on with some kind of switch.

We have a strong desire to *preserve the existing application programming model* and avoid embedding the notion of parallel programming in the application. An ORACLE application processes queries by iteratively performing fetches on a cursor, which steps through a virtual table of result rows. This result table does not necessarily exist as a complete entity at any

- 67 - point in time. It is frequently constructed on the fly, so that the result rows effectively "pass through it" on their way to the application. The application has the illusion of fetching directly from this virtual table.

In general, we will use *combining functions* to assemble subquery results into the final result. The possibility of storing all subquery results in intermediate tables, and then using a separate *combining query* to read these tables, was also considered. It was rejected as an overall approach, but might be used in some situations where aggregation has reduced the cardinalities of the intermediate tables.

Under our chosen approach, the results of parallel subqueries need not be stored in actual tables. Instead, we will try to maintain the concept of virtual result tables at the subquery level. When the application fetches from a cursor, we would like some or all of the subqueries to fetch from their corresponding cursors, as needed, with the results combined to return the appropriate row to the application. In this way, the results from all the subqueries would exist only in virtual tables, and not require any significant memory or I/O.

2 Design Overview

One of our design goals is to modularize query decomposition to allow that code to be maintained separately from the rest of the ORACLE code. This follows Oracle's policies on port-specific modifications and will simplify the appropriate sharing of maintenance between KSR and Oracle.

Figure 8:
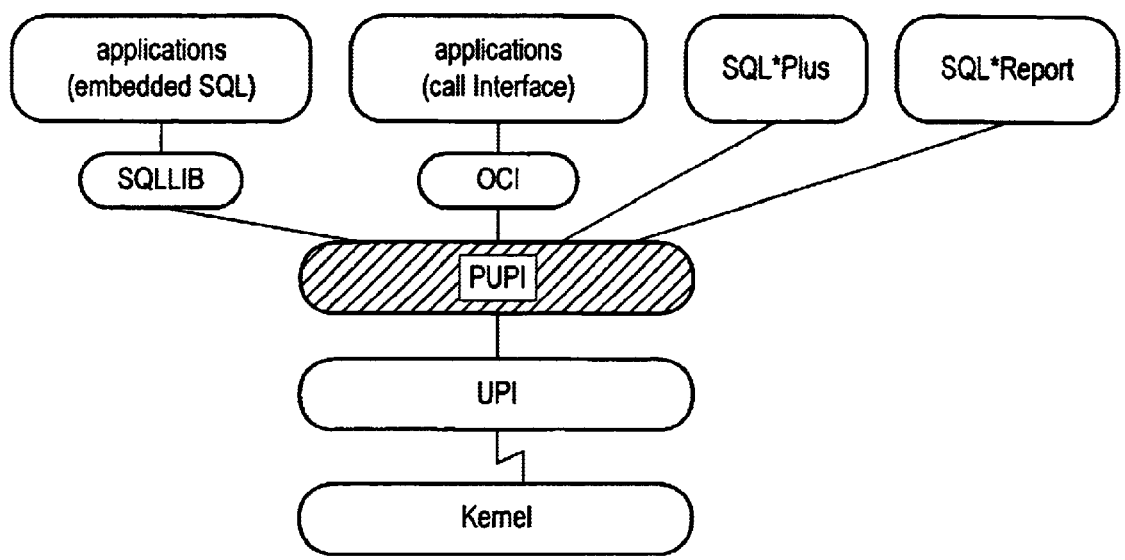
FIGS. 8–10 are used in connection with the discussion of design provided in Database Note #26.

The UPI (User Program Interface) is the common point of access to the ORACLE kernel for all applications. A parallel UPI library (PUPI, pronounced "puppy") will be developed that intercepts each call to UPI (for performing operations like connect, parse, fetch, etc.) and generates multiple calls to UPI, which generally will be executed in parallel (see Figure 8).

This is only a conceptual view; in some cases, it will actually work a little differently. For example, during a CONNECT, we don't know how many additional connections to make because we don't yet know how many subqueries there will be. Therefore, the additional connections must be deferred until later.

Most of our work will be implementing the PUPI, although a few enabling hooks might need to be added to other areas of the code. In principle, KSR ORACLE should be runable *without* the PUPI.

PUPI will pass the original query on to UPI to have it parsed and verify that the syntax is correct. After that, the query will be scanned to parse the parallel directives, if any. By default, we will decompose any queries where it is correct and effective to do so, as long as decomposition has been enabled. The user can override the decision to decompose or the choice of partitioning table. Once the partitioning table has been determined, the PUPI will look up the table name in ORACLE's catalog to find out the number of files comprising it and the list of *file_id*'s. The number of files determines the number of subqueries and, therefore, the number of additional connections to ORACLE that are needed.

Multiple subqueries will be generated as copies of the original query with an additional predicate appended to them, specifying which data partition to use. Each partition corresponds to exactly one physical file.

In order to correctly combine some subquery results, we may need to augment or otherwise transform the subquery select lists. For example, when the query contains an *AVG* function, we will also need to have each subquery return the number of rows used in calculating its average. Each *AVG* function in a query might use a different row count, since ORACLE does not include NULL values when calculating averages. Therefore, for each "AVG(XXX)" in the original query, we need to replace "AVG(XXX)" with "SUM(XXX)" and append "COUNT(XXX)" to the select list in each subquery. SUM is quicker to compute than AVG and will reduce the accumulation of roundoff errors when computing the overall average.

Before the subqueries are parsed or executed, additional connections must be made to the same database, which is not necessarily the default database. (Initially, we might require that the default database be used, and later extend query decomposition to any database.) The additional connections will only exist during the execution of the subqueries. Each subsequent query must establish its own subquery connections, based on the partitioning of that query.

Figure 9:
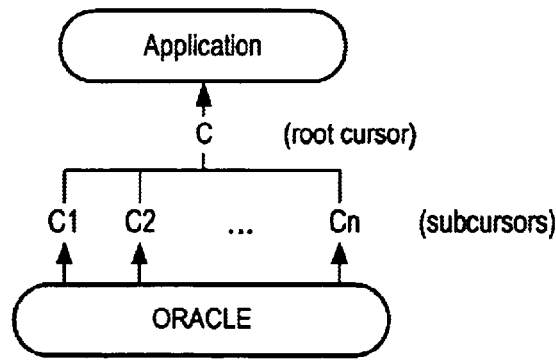
Figure 10:
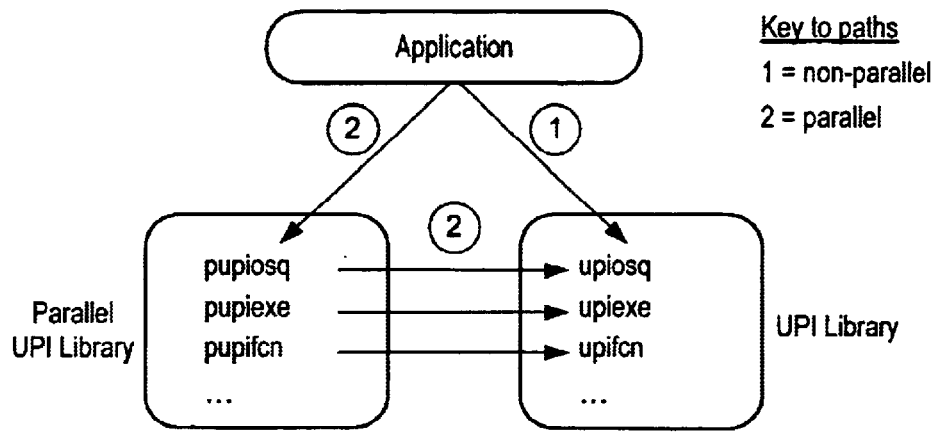

After parsing the subqueries, allocate and open a cursor for each of them. The concept of a *parallel cursor* is introduced here (see Figure 9). It will maintain the relationship between the cursor for the original query (the *root cursor*) and the cursors for the corresponding subqueries (*subcursors*). This will allow ORACLE to do parallel fetches from multiple cursors on behalf of an application.

Rows will be fetched asynchronously from the subcursors and returned to the application as needed. The rows returned from the subcursors may need to be combined or ordered in some way before the root cursor's fetch can be satisfied. See the Parallel Cursors section below for more details.

When the root cursor is closed, close all the subcursors associated with it and disconnect the corresponding sessions. This could also be done for each subcursor when it reaches end of file, to free up some resources sooner. If a COMMIT or ROLLBACK is done by the application, we must do one for each of the connections we have.

4 Design Details

4.1 Determining the Number of Subqueries

It is reasonable but, perhaps, not optimal to have more than one file per subquery. Maximum parallelism (and performance) is achieved when all files are being processed at the same time. However, it makes no sense to have more subqueries than files. Since we cannot partition the work into units smaller than a file, the extra subqueries would have nothing to do. In the first implemenation, the number of subqueries will be exactly the number of files.

Since we need to query the database to find out the file_id's, that will also tell us how many files there are and, therefore, how many subqueries to generate. There is no need for the application to tell us this, since we already know the correct answer. It requires no extra work to automate this, and it avoids checking for and dealing with incompatibilities between what the application tells us and what really exists.

This could be changed later when there is explicit support for parallel reads. Until then, assigning one subquery to each file is one way to get the same benefits indirectly. Reducing the number of subqueries will reduce some of the overhead of query decomposition. This will improve performance, as long as we can still read the same number of files in parallel.

4.2 Parallel UPI Library

The PUPI will consist of a set of functions that have the same external interface as their UPI counterparts, but will call the appropriate UPI functions multiple times. Not all the UPI functions will be duplicated in the PUPI, since not all of them can be or need to be parallelized. We need a way to easily switch between serial and parallel query processing. At different times, the same application may call either UPI or PUPI functions without (by our own requirements) changing any code. (See Figure 26-3. The three functions shown in each library parse a query, execute it, and fetch the results. There are many more functions that need to be implemented.) The "Application" in this figure can be assumed to include SQLLIB and OCI, i.e., everything above the UPI level.

All references in the existing code to UPI functions will be effectively changed (probably via conditionally-compiled macros so the actual code doesn't have to be touched) to function variables which can be assigned the name of a specific function at runtime (e.g., either pupiosq or upiosq). The initialization routine pupiini (parallel upi initialize) will be called at appropriate times to set the function variables to the proper values. This needs to be done shortly after each application is started up, and each time thereafter that parallel processing is enabled or disabled.

Note: A slight modification to this scheme will be needed to handle the case of a parallel cursor and a non-parallel cursor being active at the same time. The macros could conditionally invoke the PUPI routines whenever a parallel cursor was referenced, or the PUPI routines could be called unconditionally, and optionally pass the calls directly to the UPI without modification.

4.3 Multiple Connections

The UPI maintains a *hstdef* (host definition) structure for every connection that exists. We will allocate a *hstdef* for each additional connection we need (one for each subquery). The proper *hstdef* for each connection must be referenced when performing any actions related to the subqueries.

The extra connections can't be made until after the original query has been parsed and the number of subqueries has been determined. At that time, we will also have access to the *hstdef* that was set up on the first connection, which may contain information we need in order to make additional connections to the same database. (We need to have access to the connect string (user, password, host, etc.), or its equivalent. Without that, we have no way of knowing where the original connection was made.) We may also need access to the transaction time stamp in order to insure read consistency, depending on how Oracle chooses to implement that feature.

4.4 Parsing/Generating Subqueries

If the parser detects errors in the query, no decomposition will be done, since the subqueries will have the same errors, if not more. Any error messages issued by ORACLE at that time will refer to the original query. Subsequent errors in parsing the subqueries will likely be due to bugs in our code that generated invalid SQL. In that case, we should display a message that is meaningful to the user, to the effect that query decomposition has failed. To support debugging and offer a clue to possible workarounds, we should also display the error reported by ORACLE, along with the offending subquery.

After the query has been successfully parsed, we need to scan it to search for "PARTITION=", embedded within a comment. The next token will be the partitioning table name. Look up this table in the view ALL_TABLES to get the tablespace_name for it. Then look up the tablespace_name in the view ALL_DATA_FILES to get a list of file_id's. The number of file_id's is how many subqueries are needed.

(ALL_DATA_FILES doesn't yet exist, but could be created as a duplicate of DBA_DATA_FILES, with the additional condition that the tablespace_name must exist in ALL_TABLES. Alternatively, a public synonym could be created for DBA_DATA_FILES, with public select access. It depends on how concerned users are about letting everyone see what database files exist on the system.)

All of the subqueries will initially be copies of the original query. Then, a predicate in the form of FILEID=n needs to be added to each one. The proper place for this depends on the form of the query (refer to the examples below). The rest of the WHERE clause, if any, needs to be enclosed in parentheses and preceded by "AND" to insure the desired precedence. Views containing joins may present additional problems and need to be studied further.

Query examples:

```
Before:   SELECT ENAME FROM EMP;
```

```
After:    SELECT ENAME FROM EMP WHERE FILEID=1;

Before:   SELECT ENAME, SAL FROM EMP WHERE SAL < 10000 OR JOB='CLERK'
    ORDER BY SAL;

After:    SELECT ENAME, SAL FROM EMP WHERE FILEID=1 AND (SAL < 10000
          OR JOB='CLERK') ORDER BY SAL;
```

4.5 Combining Functions

Returning the proper results to the application is not simply a matter of putting the rows from the various subqueries in the right order. Sometimes, several subquery rows are needed to produce a single *result row* - a result row being what the application sees.

A set of *combining functions* will be developed to produce a single result row for the application from all of the subquery rows available for consideration. Only the most recent row from each subquery needs to be considered. The specific method used for merging or ordering the subquery results is completely dependent on the nature of the query. The existence of aggregate functions, ORDER BY, or GROUP BY clauses are the main factors to consider. Sometimes multiple combining functions need to be applied to the same query. For example, the query

```
SELECT MIN(SAL), MAX(SAL) FROM EMP GROUP BY STATE.
``` would require three combining functions to be applied.

As mentioned above, in order to effectively determine what combining functions are needed for each query, we will need to determine or request certain information about the form of the query.

Several questions need to be answered when deciding how to combine subquery results. The two main ones are:

a)    Which subquery rows do we want to use?
    b)    How do we combine those rows?

Which rows depends on the form of the query and the specific data values in the subquery results. How to combine the rows depends only on the form of the query. We are considering using combining queries to handle complex situations (e.g., HAVING clauses or expressions in the select list).

4.5.1 Selecting Subquery Rows

In selecting or constructing a row to be returned to the application, we need to examine the most recent row fetched from one or more of the subqueries. If there are no aggregates in the query, then only one row from one subquery will be selected to satisfy each root cursor fetch. If there is an aggregate, then rows from several subqueries might be selected and combined into a single row.

No aggregate:

If there is no ORDER BY clause, then this is a simple union. Take one row at a time from each subcursor, in round-robin fashion.

If there is an ORDER BY clause, then the sorted results of each subquery need to be merged. For each root cursor fetch, take the row with the highest or lowest sort column values, depending on whether ASC or DESC was specified. We must take into account the collating sequence currently in effect when determining high and low values.

With an aggregate:

If there is no GROUP BY clause, then each subquery will have returned a single row containing the aggregate result for its partition. Combine all of these rows into a single row, using the appropriate aggregate function(s).

If there is a GROUP BY clause, then all the possible group values may not be present in every subquery result.

For example,

```
SELECT DEPTNO, AVG(SAL) FROM EMP GROUP BY DEPTNO;
``` might produce the following partitioned results:

| DEPTNO | AVG(SAL) | DEPTNO | AVG(SAL) | DEPTNO | AVG(SAL) |
|--------|----------|--------|----------|--------|----------|
| 10     | 1500     | 10     | 2000     |        |          |
| 20     | 2250     | 20     | 3200     | 20     | 4000     |
| 30     | 1700     | 30     | 1100     |        |          |

In this case, the combining function cannot simply take one row from each subquery and combine them. It needs to select and combine rows where the group values match each other. For the first root cursor fetch, all the DEPTNO 10's will be combined; the next fetch will combine the 20's, etc. Since GROUP BY implies ascending ordering before the aggregate function was applied, we can select the lowest available group value and all of its duplicates.

4.5.2 How to Combine Subquery Rows

Once the rows to be returned to the application have been selected, we need to combine them into a single row. If only one row was selected, obviously no combining is necessary. The particular combining technique to be used is dependent only on the form of the query, not on any specific data values.

The need to combine multiple rows implies that the query has at least one aggregate. Combining can be viewed as collapsing several rows into one. All the eligible subquery rows are identical in the non-aggregate columns. These columns can simply be copied into the result row. The aggregate columns can be combined by calling the appropriate combining function, passing the column number and pointers to the relevant rows. Note that averages need some special handling - the corresponding COUNT column also needs to be identified and taken into account by the combining function.

Example:

Assume columns 1,2 are not aggregates and columns 3,4 are.

```
for column = 1,2
    copy column_value(column, row_ptr) to result for column = 3,4
    copy combining_function(column, set_of_row_ptrs) to result
```

After processing and disposing of each subquery row, set the buffer state to empty and notify the appropriate fetch thread so it will initiate another asynchronous fetch.

Array fetches will need some special consideration. The combining functions may have to be called iteratively until the array is full.

4.6 Error Handling

A detailed description of all possible errors has not yet been created. When we do, we should try to classify errors into the following severity categories and decide how each of them will be handled in each of our several versions:

- The user requested decomposition and the query cannot be decomposed *correctly* .

- The user requested decomposition and the query can be correctly decomposed, but not *effectively*. It may even run slower.

- Infinite loop, ORACLE or application crash, or database damage.

Error handling might get a little tricky with multiple fetches going on at once. If any of the subcursor fetches encounters an error, bubble it up to the root cursor so the application knows about it. Maybe we need to terminate all the other subqueries, too. The P1 version might not be too robust in this area, and more issues will probably be uncovered during implementation. I haven't tried to predict them all at this time.

5. Limits of Parallelization

The potential degree of parallelization, using query decomposition, is limited by several factors:

- The number of physical files comprising the partitioning table

- Data skew or partition skew in the partitioning table, with respect to the query. I am defining *data skew* here to mean any distribution of data that causes result rows to be fetched from the subcursors in something other than round-robin fashion. For example, sorted output may appear in clumps so that several rows in succession from the same subcursor are returned to the root cursor. During such periods of time, little, if any, parallel fetching will occur. This phenomenon may appear and disappear many times during the course of a single query. Increasing the number of fetch buffers per subquery will help to minimize the effects of this type of data skew.

- *Partition skew* is defined as a distribution of data that results in unequal-sized partitions. During the latter part of query execution, and possibly even during the entire query, some partitions will have no more rows to fetch. This will reduce the degree of parallelism for the remainder of the query. The database partitions may actually be equal in size, but the effective partition size for any given query might be reduced by predicates in the query.

- The cost of the combining functions, relative to the cost of executing the subqueries

- The amount of processing done by the application for each row (single-threaded)

- ORACLE or OS limits on the number of processes, threads, connections, etc.

- Overhead of opening, closing, and maintaining extra connections and cursors.

- The number of partitions is limited by the maximum number of database files ORACLE supports, which is currently 256. To achieve a higher degree of parallelism (through query decomposition) we will need to increase the file limit, while reducing the maximum number of blocks per file by a corresponding factor.

- Bear in mind that query decomposition is designed to work in conjunction with other parallel processing techniques, such as parallel relational operators and pipelining. Thus, we are not depending solely on QD for parallelism in query processing.

Query Decomposition and ORACLE Clustering Techniques (Database Note #76)

This is an informal discussion which is a first attempt to pull together in one place the issues involved in using Query Decomposition in conjunction with ORACLE's clustering techniques and ORACLE's approaches to laying out extents and data blocks within files. A primary immediate goal is to identify assumptions about ORACLE's behavior which need to be verified, and questions which need to be answered by either of these means. A medium term goal is to develop application design guidelines for use in modeling and pilot projects. An ultimate goal is to develop end-user documentation providing DBAs with detailed guidelines for planning and configuring their databases and applications to make the best use of QD in conjunction with ORACLE's native techniques for optimizing data access.

Overview of Basic Query Decomposition Mechanism

Our Query Decomposition parallelizes a query by dividing it into subqueries, each of which use a rowid range predicate to specify one or more files to which that query's reads will be restricted. The approach depends on partioning tables across files on multiple disk drives, so that the files can be read in parallel. So, for a trivial example, if the table EMP is partitioned across 3 files with ORACLE fileid's 1, 2, and 3, then the query SELECT * FROM EMP can be decomposed into three subqueries:

```
SELECT * FROM EMP WHERE ROWID >= '0.0.1' and ROWID < '0.0.2'
SELECT * FROM EMP WHERE ROWID >= '0.0.2' and ROWID < '0.0.3'
SELECT * FROM EMP WHERE ROWID >= '0.0.3' and ROWID < '0.0.4'
```

The first query will only read blocks of the EMP table which are in file 1, the second will only read blocks from file 2, and the third from file 3. This is an example of decomposing a full table scan: the overall query needs to read all blocks of the table, and we gain near-linear speedup by reading the separate files across which the table is partitioned in parallel. The total number of reads has not been changed, but they happen in parallel. ORACLE has been modified to restrict reads during full table scans, based on rowid range predicates, as a necessary prerequisite to implementing this approach.

Query Decomposition can also work with queries that use an index. Suppose our query were SELECT * FROM EMP WHERE DEPTNO = 5, and there is an index on DEPTNO. This can be decomposed similarly to the first example:

```
SELECT * FROM EMP WHERE DEPTNO = 5 AND ROWID >= '0.0.1' and ROWID < '0.0.2'
SELECT * FROM EMP WHERE DEPTNO = 5 AND ROWID >= '0.0.2' and ROWID < '0.0.3'
SELECT * FROM EMP WHERE DEPTNO = 5 AND ROWID >= '0.0.3' and ROWID < '0.0.4'
```

Each of these subqueries must redundantly read the same index blocks, to find index entries for DEPTNO 5, but hopefully the index blocks will be cached by the first subquery which gets to each one, so they are only read once. When a subquery finds an index entry for DEPTNO 5, however, it will examine the rowid stored in that index entry, to see whether it fall within the range for that subquery. Only if it does will that subquery read the data page containing the row with that DEPTNO value and rowid. Speedup is not as close to linear as with full table scans, because only the table reads are partitioned. Logically, the total reads are increased due to redundant reading of the index, but the redundant reading happens in parallel, and hopefully caching will eliminate most actual redundant I/O.

Using QD with indexed queries depends on ORACLE implementing the feature of restricting table reads during indexed scans to blocks which fall within the specified rowid range predicate. ORACLE has not yet implemented this feature, but KSR has devised an interim implementation in our port of ORACLE 7.0.9. (KSR still relies on ORACLE to implement a "real" solution, because our interim solution is unduly CPU-intensive, since it re-evaluates the rowid range predicate for every fetch, rather than once when a cursor is opened.)

Both full table scan QD and indexed scan QD rely for their effectiveness on good distribution of target data across the files of a partitioned table. For full table scans, this means that ideally each file should contain an equal proportion of the total blocks of the table, even when the table has only been loaded to a fraction of its capacity. For indexed scans, it also means that rows with duplicate key values, or rows with adjacent values of a unique key, should be well-scattered among the partitioning files, rather than contained within one or a few files.

Query Decomposition and Clustering

Query Decomposition as described above speeds up query execution by parallelizing the reads involved in a query, but not by reducing their total number. While this improves individual query response time, it does not improve system throughput (and may even reduce throughput, due to the added overhead of additional threads and processes, and of redundant index reads).

ORACLE's clusters and hashed clusters are approaches to speeding up query execution by greatly reducing the number of reads needed to accomplish certain queries. "Regular" (i.e. non-hashed) clusters reduce the reads needed for commonly-executed joins by clustering together the rows of several related tables based on common join column values, further reducing the number of blocks needed to read a related set of rows by storing each cluster key value only once for all rows of all tables sharing that key value. This kind of cluster still has an associated index on the cluster key, but the index entries simply point the to root block for the cluster key value, rather than having separate rowid entries for individual rows.

Hashed clusters reduce reads for queries which seek rows of an individual table that exactly match a given key value. Rows with key values that hash to the same hash key value are clustered together, and no index is needed to navigate directly to the root block for a given hash key value.

Both of these clustering approaches require that a DBA decide in advance which access paths are likely to be used frequently enough to require organizing the data in a way that optimizes them. A given table can only be clustered on one column or set of columns, and doing so reduces performance of updates which change the values of cluster key columns. Query Decomposition has more general applicability: as long as a DBA decides in advance to partition a given table across multiple disks, Query Decomposition can be used on that table for any query that uses either a full table scan or any regular index, rather than being restricted to queries with predicates on certain predetermined columns.

In general, Query Decomposition and clustering cannot be used in conjunction to optimize access to the same table in the same query. This is so because accessing a table through a cluster key, whether hashed or otherwise, does not use either a full table scan or a regular indexed scan. Instead, it uses the cluster index (for regular clusters) or hashing to find the root block for the cluster key value. Then, if all rows for the specified cluster key value are in that one block, that's all that has to be read, so there's no opportunity for parallel partitioning. Otherwise, all of the chained blocks for that cluster key value must be read in sequence, whether they are in the same or different files. Even in the case of a regular cluster where an index is used, the index entry for a particular key value just points to the first block of the overflow chain, so there's no opportunity to examine rowid's and decide whether they fall in a specified range, to decide whether to read a data block.

Thus, it would appear that there is no opportunity for the QD and clustering techniques to leverage each other to retrieve a particular table. (They can leverage each other to retrieve a join, in cases where the driving table of the join is partitioned an can be retrieved using QD, and where that table contains a foreign key that can be used to join to other tables that are clustered on that key.) However, KSR has devised a way of leveraging QD with hashed clustering, by using hashed clusters in a way rather different than that envisioned by ORACLE, in an approach we may designate "small bucket hashing".

Small Bucket Hashing (elsewhere called "Scatter Clustering")

If an index has a fairly small number of distinct values, relative to the number of rows in a table, and if rows with a given index value can be scattered anywhere in the table, without regard to their key value on that index, then even after using the index, a much larger volume of data may have to be read from the table than the volume represented by rows with the desired key values, because only a small fraction of each block read consists of the desired rows. In the worst cases, all blocks of the table must be read, so that performance is worse than if the index isn't used at all (because of the extra reads of the index, and because of the higher proportion of random to sequential I/O's). QD can ameliorate the problem by splitting up the load in parallel, but it remains the case that if the index doesn't provide speedup relative to full table scan without QD, then it won't provide speedup relative to full table scan with QD.

If rows with matching key values could be clustered together, then using an index would reduce the total I/O in a much wider variety of cases, again, with or without QD. This is essentially what ORACLE clusters accomplish. Now, if instead of clustering rows with a given key value into one clump, they could be clustered in N clumps, where N is the degree of partitioning of the table, and if these N clumps could be read in parallel (i.e. if QD could be applied), we'd be better off by a factor approaching N.

This can be accomplished by the following trick: create a hash cluster keyed on the desired columns, in a partitioned tablespace (i.e. the hash cluster is partitioned over multiple files, on multiple disks). Estimate the expected volume of data for each distinct key value, as you would for an ordinary hashed cluster. But instead of using that volume as the size to specify for a hash bucket when creating the hashed cluster, specify a much smaller bucket size (at the largest, V/N where V is the volume of data for each distinct key value, and N is the number of table partitions). Assuming that your ORACLE block size is also no larger than V/N (i.e. that V is large enough to be at least N*blocksize), when you load the table you get an overflow chain for each key value that has at least N blocks (just the opposite of the usual goal in configuring a hashed cluster). If you load the table cleverly (and we'll need some further experimentation to define cleverly in this context, but probably loading in random hash key sequence will work, if your order of extents round-robins through the files), you end up with the blocks for each overflow chain well-distributed among the files of the partitioned table.

Now, create an (ordinary) index on the SAME columns as the hash columns. Because it is an ordinary index, each index entry consists of a key value /rowid pair, which points directly to the block containing the row in question. Also because it is a regular index, it can be used for range predicates as well as direct match predicates.

When presented with a query that has an exact-match predicate on the hash key columns, the ORACLE optimizer will choose hashed access rather than using the index on those same columns, because under normal circumstances, hashed access would unquestionably be faster. However, when the Query Decomposer notices (in the EXPLAIN plan) that ORACLE has chosen hashed access, and that there is a regular index which has all of the columns of the hash key as its leading columns, it can generate an INDEX optimizer hint in the parallel subqueries, coercing the ORACLE optimizer to use the regular index rather than hashing. Since the parallel subqueries have rowid range predicates, this regular indexed query can be decomposed like any other. But because the data is clustered on the same column values, with blocks for each cluster key value well-distributed among the files of the partitioned table, many fewer blocks need to be read than if this were not a hashed table.

As an example, consider the query:

```
SELECT * FROM HASHED_TABLE WHERE HASHKEY_COLUMN = 5
```

This would be decomposed into parallel subqueries of the form:

```
SELECT /*+ INDEX(HASHED_TABLE REGULAR_INDEX) */ * FROM HASHED_TABLE
    WHERE HASHKEY_COLUMN = 5 AND ROWID >= <low end of range>
                            AND ROWID < <high end of range>
``` where a partitioned table called HASHED_TABLE is hashed on the column HASHKEY_COLUMN, and there is also an index called REGULAR_INDEX on that same column.

The regular index may optionally contain additional trailing columns, beyond those which match columns of the hash key. This means it can be used to further restrict the rows read, according to additional predicates in the query. This could be particularly useful to give added flexibility, because a hash key must be decided upon by a DBA before a table is created, and once the hashed table is populated, it would require a complete reorg to add additional hash key columns. It is much easier, however, to add columns to an index (or replace it with a different index) without affecting the data itself. So if additional frequently-used selection criteria are identified after a hash table already exists, these columns could be added to the regular index.

If more than one regular index has leading columns matching the hash key (but with different trailing columns), the Query Decomposer must choose one of these indexes arbitrarily, as the one it will tell ORACLE to use, because it is not equipped to perform the function of a full-fledged query optimizer, to analyze the predicates in the query and decide which index would be best to use. In this event, however, the user may optionally choose the index by placing the INDEX optimizer hint in the original query. The Query Decomposer always leaves any hints from the original query in the parallel subqueries, to provide the user this extra degree of customized control over optimization when needed in this or other situations.

Supporting Query Decomposition for Applications Running on Client Workstations
(Database Note #61)

1 Introduction

Our Query Decomposition (QD) approach exploits the shared-memory parallel architecture of the KSR1 to speed up the execution of large ORACLE queries. It is our aim to support this approach for as wide a range of queries, and within as wide a range of ORACLE applications and contexts, as is feasible.

ORACLE applications use a client-server architecture in which all database access is performed on behalf of an application program by a separate server or "shadow" process. While this architecture is used even when the client application and the server are running on the same machine, ORACLE's SQL*Net network software supports the seamless connection of remote clients and servers running on heterogeneous platforms. This permits the KSR1 to play the role of database server for a network of workstations, a configuration which is becoming increasingly prevalent, and may be preferred or even required by some potential KSR customers.

Clearly, it would be desirable for Query Decomposition to work for queries issued from applications running on client workstations, against a KSR1 database server. While this does not pose a problem for the internal design of the QD code, it will require significant changes to the architecture by which QD is integrated with ORACLE. Section 1 below explains why remote workstations cannot be supported by the current QD architecture; Sections 3 and 4 present alternate architectures to solve the problem; and Section 5 draws conclusions about which architecture is likely to be preferable, and how much effort will be required to implement it.

2 The Problem

If Query Decomposition were implemented as an integral part of ORACLE, the most natural approach would be to decompose a query inside the ORACLE kernel (which is in the server), and parallelize that portion of the kernel required to execute the parallel subqueries into which the original query is decomposed. Since KSR is implementing QD as a separate body of code which must be integrated with ORACLE as seemlessly as possible, but with the minimum necessary changes to ORACLE code, a rather different approach was chosen: QD is integrated with ORACLE within the ORACLE *UPI (User Program Interface)* layer. See DBN #26, *Query Decomposition in ORACLE for KSR - Preliminary Design*, for a detailed explanation of this design.

Figure 11:
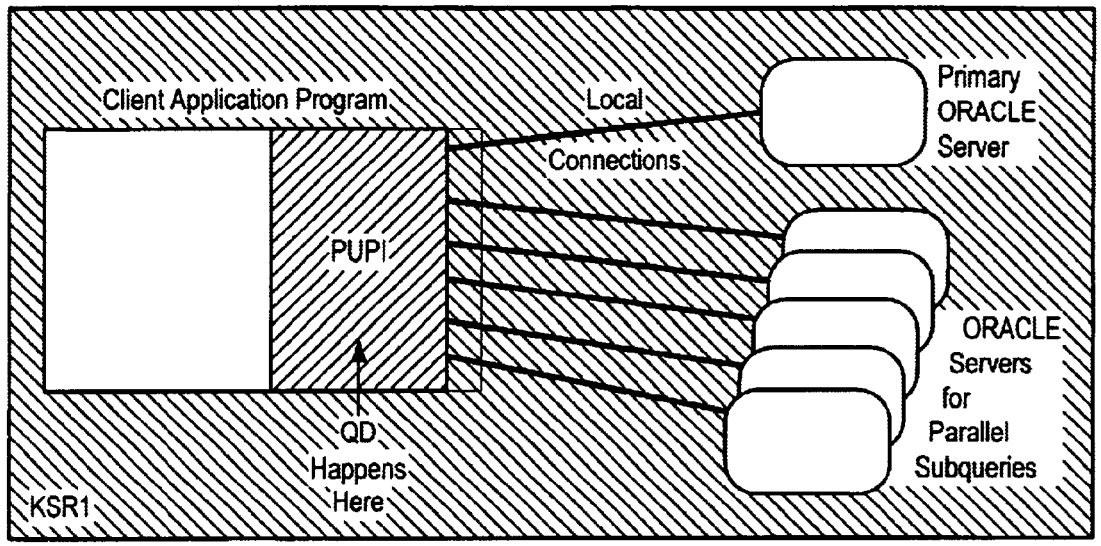
FIGS. 11–13 are used in connection with the discussion of query decomposition for applications running on client workstations in Database Note #61.
Figure 12:
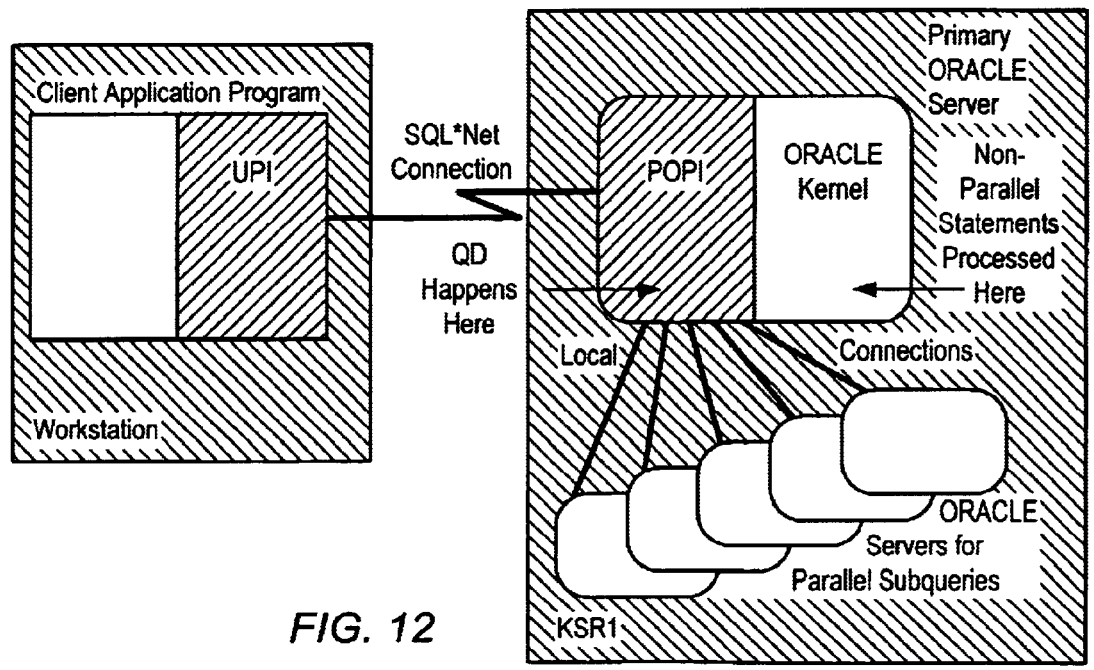

This is the common set of function calls underlying all of the ORACLE front-end tools and APIs. UPI calls accomplish their functions by sending messages to the ORACLE server, which are serviced by corresponding *OPI (ORACLE Program Interface)* routines. Because the UPI is a part of client programs rather than a part of the ORACLE server, no *architectural* changes were required to the ORACLE kernel to implement this approach. Though, some changes were required in the mechanics of indexed and full table scans, to facilitate parallel partitioning Our version of the UPI is called the *PUPI (Parallel User Program Interface)*. This set of routines emulates the calling sequence and behavior of the UPI routines, but is also capable of decomposing a query into parallel subqueries, creating and managing the threads in which those parallel subqueries are executed, and combining the results to emulate the result of the original query. For each parallel subquery, a separate thread is created, and a connection is made from within that thread to a separate ORACLE server. When a PUPI routine is called for a task which does not require parallelism, behavior is the same as for an ordinary UPI routine, and the call is serviced by the server from the original user connection (which we may designate the *primary* server to distinguish it from the servers used for parallel subqueries). This architecture is shown in Figure 11.

This architecture takes advantage of ORACLE's separation of client and server processes, even for local connections, to manage parallelism inside the client process, thereby requiring minimal change to the server. Unfortunately, this only works when the client is executing on the KSR1. To support a remote client, the architecture must be changed so that parallelism can be managed on the server side of the remote client/server boundary.

3 Moving QD Inside the ORACLE Kernel

The approach which first suggests itself is to move the QD code from the client-side UPI, into the server-side OPI library. Since there is more or less a one-to-one correspondence between UPI and OPI routines, it would appear conceptually straightforward for KSR to develop a *POPI (Parallel ORACLE Program Interface)* library, along similar lines to the PUPI library. Like PUPI routines, POPI routines would determine whether a particular call required parallel processing; if not, they would behave like ordinary OPI routines. If parallel processing were called for, the POPI routines would behave as a client with respect to additional servers to which they would connect from parallel threads, to process parallel subqueries. To accomplish this, the POPI routines would have to call UPI routines to request particular services from the servers for the parallel subqueries. This architecture is shown in Figure ~~61=2~~ 12.  9/27/04

This is not the same architecture cited at the beginning of Section 2. Rather than parallelizing the existing query execution code within the kernel, this approach introduces into the kernel new code which parallelizes client access to additional servers, each containing a complete, non-parallelized kernel. The QD logic itself would be identical to the current design.

An advantage of this solution is that it introduces no new processes or connections, other than those specifically needed for executing parallel subqueries. When a client program makes sends a message to the server which does not require parallel processing, that call is simply passed on into the kernel, without requiring an additional message. Essentially, the ORACLE server is playing a dual role, both as a standard ORACLE server, and as a QD server.

The chief disadvantage of this approach is the very fact that it places QD inside the ORACLE kernel. From the standpoint of detailed design and implementation, changes of this nature to the ORACLE kernel present much room for unpredictable difficulties and side effects. Prior experience indicates that it can be very difficult to emulate client behavior inside a server, since the two sides of a client/server interface, if not specifically implemented to allow for this, may contain variables with corresponding names and purposes, but which are used in subtly different ways. Furthermore, the current implementation of QD assumes its residence in the client; ORACLE functions are called which have similar but different counterparts on the server side.

A potential security issue would also be raised by moving QD inside the kernel. Because QD code would have access to ORACLE's SGA (Shared Global Area), it could potentially bypass ORACLE's security enforcement. This can also be viewed as an advantage. Moving at least portions of QD inside the kernel has been previously proposed as a possible solution to security-related problems involved in decomposing queries over views. See DBN #55, *Decomposing Queries Over Views - Issues and Options*, for a full discussion of this complex issue. A separate QD server, as proposed in Section 4 of the current document, might also provide an avenue for solving view security problems

4 Separate QD Server

Figure 13:
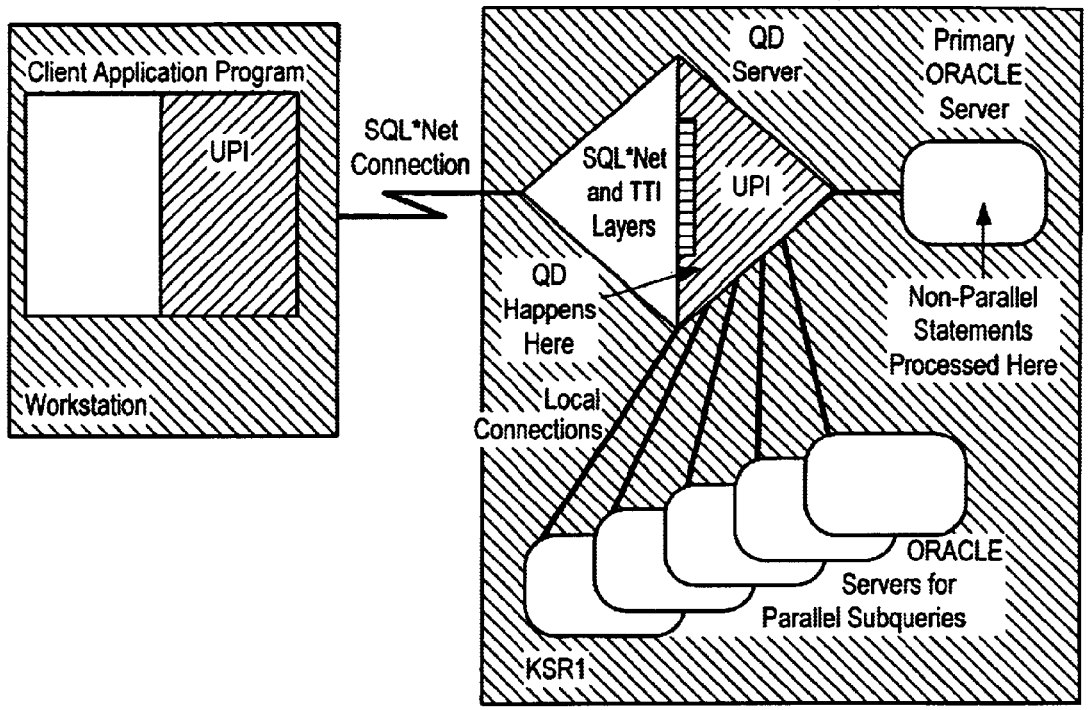

A less obvious, but perhaps preferable approach, is to implement a separate QD server. From the perspective of the remote client application, this would behave exactly like an ORACLE server, servicing requests emanating from UPI calls in the client program. From the perspective of ORACLE, it would appear exactly like a local client application program containing the PUPI library (as in Figure 61 - 1); it would contain PUPI routines which would pass messages, via UPI calls across a local connection, to a primary ORACLE server to perform non-parallel operations, and it would manage threads which connect locally to additional ORACLE servers, to execute parallel subqueries. The QD server would incorporate routines from the outermost, message handling layers of the ORACLE kernel (in particular, modules of the SQL*Net and *Two Task Common*, or *TTC*, layers), but its dispatcher would call PUPI routines, rather than OPI or POPI routines, to service requests. This architecture is shown in Figure 13 below.

A key advantage of this approach is that, while it incorporates some peripheral kernel routines, it does not constitute modification of the ORACLE kernel itself. As in the current architecture, QD code is completely segregated from the kernal. There are likely to be fewer dangers of side effects, and much less danger of unintentional security violations (the latter danger is not entirely eliminated, because emulating an ORACLE server from the client's perspective may still require access to the ORACLE SGA, but in a better-isolated and more easily-controlled context).

Another seeming advantage is that the PUPI as currently implemented could be grafted unchanged into the QD server, rather than having to re-integrate QD with the OPI layer inside the ORACLE kernel. From a design standpoint, this is clearly a good thing, because it means that the actual interface between QD and ORACLE is the same for remote clients as for local clients; the extra mechanics of message relaying for the remote case are a clean add-on. From a development cost standpoint, however, this is likely to be more of a tradeoff than a straight savings, because while there is a general one-to-one correspondence in name and function between UPI and OPI routines, they do not take identical parameters or operate in an identical context. Some degree of message translation may be necessary to relay incoming messages, intended to be processed by OPI calls, to UPI or PUPI calls which will pass them along to an ORACLE server. Furthermore, while the majority of UPI calls do not require PUPI counterparts in the current implementation, because they are not directly related to retrieving query results (e.g. calls for managing transactions, for connecting to ORACLE, or for modifying data), a QD server would need to be able to relay all of these calls to an ORACLE server. More detailed study of the ORACLE code will be required to determine the amount of effort involved, and whether it outweighs the advantages of leaving QD in the PUPI layer. It could turn out that this approach is not as different from the approach of relocating QD inside the OPI layer as it would superficially appear to be.

One disadvantage of this approach is that, by introducing a new server process to the overall ORACLE architecture, it adds complexity and introduces new unknowns. It may turn out to be fairly difficult to extract the appropriate SQL*Net, TTC, and other needed routines from their normal kernel contexts, to accomplish the goal of emulating the front-end of an ORACLE server. This approach also raises potential issues of packaging and code integration, since it introduces a new, KSR-specific executable to be shipped as part of ORACLE for KSR, and since it integrates in a single executable KSR-written code and code intended only as part of the ORACLE kernel.

Another disadvantage of this approach is that requests for database operations which do not require parallelization must make an extra message hop to get from the client application to the ORACLE server which will service them. Since the QD code decides whether a given UPI call requires parallelization, if the QD code is in the QD server rather than in the application program, then the application program can't "know" whether to send a given request to the QD server or the ORACLE server, so it must always choose one or the other. We can provide mechanisms to let the DBA or application user decide globally or per application whether to enable QD for remote queries, so that applications with little or no need for QD can avoid the extra overhead of the intermediate QD server. Alternatively, a hybrid approach could place inside the application program those portions of QD logic which determine whether to decompose a query, while managing the parallelism in a QD server. This approach, however, would require substantially more effort to implement, since it would involve a re-partitioning of QD functionality among processes.

A possible compromise approach would be to develop a means whereby those UPI calls that do not have PUPI counterparts are routed directly from the client application to the ORACLE server, while those which may require parallelism are routed to the QD server, which decides whether to parallelize or whether to "fall through" to ordinary UPI behavior. This would limit the extra hop overhead to calls which potentially require QD attention.

5 Conclusion

At the current preliminary stage of analysis, the QD server approach appears preferable to the approach of locating QD in the ORACLE server, but not dramatically so. The QD server approach avoids modifying the ORACLE kernel, but this is somewhat offset by the added architectural complexity and possible complications in packaging and code integration. Maintaining the same QD/ORACLE interface for remote and local clients is certainly preferable conceptually, but may be offset by difficulties in relocating some kernel routines in a separate server, and in relaying messages to UPI routines which were intended for OPI routines. The QD server approach introduces extra performance overhead for non-parallelized ORACLE calls; this can be limited at the cost of slight extra administrative complexity, and might be reduced further by optional hybrid approaches, at the cost of greater development effort.

A reasonably conservative initial estimate of development cost would be one person-month to implement the basic QD server functionality, with an additional two to three weeks to resolve peripheral issues of administration, configuration, and packaging. The initial phase of development would involve a detailed examination of the relevant ORACLE code, which would facilitate making a final decision between the alternate approaches, and producing a more reliable development cost estimate and task breakdown.

While support for physically remote QD clients depends on porting ORACLE's SQL*Net software to the KSR1, SQL*Net is not a prerequisite for developing and debugging a QD server, because the distinction between a local and remote connection is transparent at the levels of ORACLE which are relevant for this project. Detailed analysis of the relevant code could begin at any time, and implementation could begin as soon as the initial port of the basic components of ORACLE 7.0.9 has been completed.

Automating Query Decomposition - Framework for Rules (Database Note #32)

Introduction

This paper provides a conceptual framework for automating the process of query decomposition proposed in Database Notes #21 and #26. This framework can be viewed as a general structure within which to answer the question "What do we know, and when do we know it?", during the stages of transformation from an original input query to a decomposed query ready for parallel execution. In more down-to-earth terms, this paper provides a breakdown of the categories of rules involved in query decomposition, their input information and goals, and the categories of generated queries associated with them.

Top Level: The OAT Model

A good top level framework for query decomposition is provided by the *OAT* model, whose name is an acronym for three forms through which a collection of information passes during a transformation: the original form (O-form), the analyzed form (A-form), and the transformed form (T-form).

Figure 14:
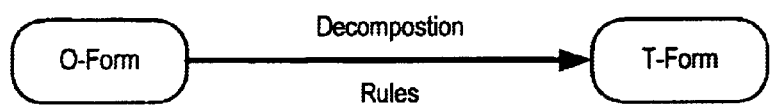
FIGS. 14–16 are used in connection with the discussion of the framework of rules for automating query decomposition in Database Note #32.
Figure 15:
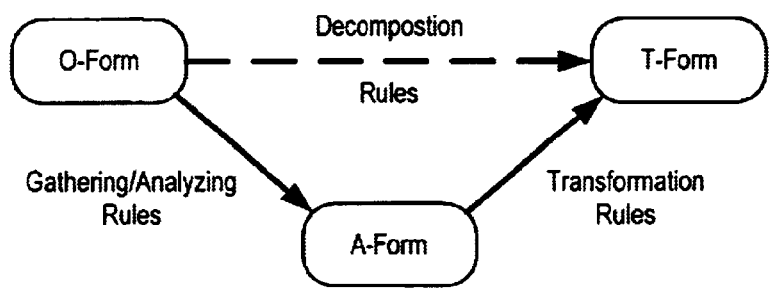

The process of query decomposition consists of producing, for a given input query, the collection of parallel subqueries, combining queries, combining function control structures, and other control structures needed to retrieve data in parallel and combine it to emulate the result table of the original query. This can be viewed conceptually as a transformation of the original query (which we will designate as the O-form of the query) to that collection of objects which comprise the decomposed query (which we will designate the T-form of the query). To automate this process, we must specify a collection of rules whose starting point is the O-form of a query, and whose ultimate goal is the T-form. This highest-level goal path is shown in Figure 14.

An SQL query submitted to the system does not contain within itself all of the information needed to decompose it. Strategic information such as index usage, table cardinalities, predicate selectivity, and join order and method must be obtained from the *query optimizer* to make decisions about decomposition strategy, such as choice of a partitioning table. Semantic information about tables, columns, clauses and expressions in the query must be gathered from the *data dictionary* to determine the details of combining functions and queries (for example, what kind of comparisons to perform for a merge sort, depending on the datatypes of the ORDER BY columns). This collected information must be analyzed to organize it into a structured form that defines everything we need to know about the query, in order to produce its T-form.

We will designate all of the analyzed, organized information about the query as the A-form of the query. The A-form includes the original query definition and any needed cross-references between that definition and the other collected information, so that no information is lost in the transition from O-form to A-form.

We can now consider all of the rules involved in decomposing a query to fall into two classes: those whose starting point is the O-form and whose goal is the A-form (which we will call *gathering/analyzing* rules), and those whose starting point is the A-form and whose goal is the T-form (which we will call *transformation* rules), as shown in Figure ~~32—2~~ 15.

It may appear rather arbitrary to designate the A-form as a discrete goal which must be reached before proceeding to the T-form, since separate pieces of information could conceivably be collected and analyzed as needed during the course of query transformation. However, the A-form provides a valuable "fire wall" between the *gathering/analyzing* rules and the *transformation* rules. It prevents radical differences in the *gathering/analyzing* approach from having any effect on the *transformation* approach (for example, the difference between parsing the input query and then querying the data dictionary to bind semantic information to the parsed query, or obtaining a parse tree with already-bound semantic information from the query optimizer, and translating that to our standardized A-form). It also permits us to expand our repertoire of parallelization techniques relatively independently of the *gathering/analyzing* rules.

Categories of Generated Queries

Much of the query decomposition process, both in the *gathering/analyzing* and *transformation* phases, is accomplished through the generation and execution of queries. (For this discussion, the term *query* is used in the broad sense to include DDL commands such as CREATE and DROP, para-DML commands such as EXPLAIN, and logical equivalents to these and other DML commands which do not necessarily involve explicit generation or processing of SQL. Query *generation* is used to mean applying rules to define a query and prepare it for execution. Query *execution* is used to mean retrieving information through the query.) Queries can be broken down into five categories: probing queries, set-up queries, clean-up queries, parallel subqueries, and combining functions and queries.

Probing Queries

These are generated and executed during the *gathering/analyzing* phase of query decomposition, and are the mechanism used for gathering information from the query optimizer and the data dictionary. This suggests that *gathering/analyzing* rules can be divided into two classes: *gathering* rules which govern the generation and execution of probing queries, and *analyzing* rules which analyze and restructure the gathered information to produce the A-form of the query.

Probing queries also fall into two groups: those which gather information on query optimizer strategy and associated cardinality and selectivity estimates; and those which gather semantic information about objects referenced in the query from the data dictionary. (This may be an over-simplification in some cases. For example, queries about file partitioning have more to do with retrieval strategy than semantics, but formally they may have more in common with data dictionary queries than with optimizer queries, if the file partition information is accessed through a data dictionary view.)

Optimizer strategy information can be obtained by invoking EXPLAIN to produce an access plan for the query, and then generating and executing appropriate queries against the plan table to obtain information about join order, join methods (nested loop vs. merge), and index usage. (If a later release of EXPLAIN also provides cardinality and selectivity estimates, these will be gathered as well.)

Semantic information can be obtained by asking queries against data dictionary views, and by using DESCRIBE SELECT to generate a SQLDA structure describing the output columns (select list items) of the original input query, or of transformations of that query. In some instances alternate strategies for obtaining information are possible (although we might choose to constrain the strategy space at design time). For example, to determine the datatype of an ORDER BY column which doesn't appear in the select list of the original query, we can either query an appropriate data dictionary view, or we can generate a transformed query in which the column *does* appear in the select list, and invoke DESCRIBE SELECT for that query. This entire category of queries could be replaced by a call to the query optimizer to return a parse tree for the original query, to which the necessary semantic information has been attached; such an optimizer call could itself be considered a probing query. (The information to be returned by semantic probing queries, and the manner of its organization after analysis, are discussed in detail in DBN #37.)

Additional data dictionary queries, beyond those which gather basic semantic information, may be needed in some cases to establish cross-references between the semantically-augmented parse tree and the query optimizer plan. These could be needed, for example, to determine which index name in the optimizer plan corresponds to which table name in the query definition, or to match table synonyms used in the query definition to actual table names.

Probing query execution precedes generation of the remaining classes of queries discussed below, which happens during the *transformation* phase of query decomposition.

Set-up Queries

Set-up queries are generated during the *transformation* phase of query decomposition, and, as the name implies, they are executed during an initial *set-up* phase of query execution. They fall into two general groups: DDL set-up queries to create temporary tables or indexes; and DML set-up queries, which could be used in multi-stage execution strategies to populate temporary tables with intermediate results. Potentially, a DML set-up query could itself be decomposed and executed in parallel.

Temporary tables may be created at set-up time, and populated during main query execution, to gather rows from parallel subqueries for final aggregation or testing of a HAVING clause by a combining query.

Creating temporary indexes, and populating intermediate sorted tables during set-up, are also steps of alternative approaches to merge joins which avoid redundant sorting of the non-driving table in the join by each parallel subquery, either by pre-sorting or by pre-indexing the non-driving table. If *pre-sorting* is used, only those rows which satisfy single-table predicates are inserted in a temporary table, which is indexed on the join columns, and the temporary table replaces the original table in the FROM clauses of the parallel subqueries. If *pre-indexing* is used, the entire table must be indexed on the join columns. Either way, the resulting table can now be used as the inner table in a nested loops join.

Any set-up queries which are generated as part of the transformation of a given query must be executed to completion before proceeding with *execution* of the remaining query types discussed below. However, the generation of set-up queries is not a prerequisite to the *generation* of the remaining query types, and could conceptually be performed in parallel with it.

Clean-up Queries

For each set-up query which creates a temporary table or index, a corresponding clean-up query is required to dispose of that temporary object. Clean-up queries are generated at the same time set-up queries are generated, and are executed when the overall parallel cursor is closed.

Parallel Subqueries

All of the parallel subqueries for a given decomposed query are identical except for a predicate in the WHERE clause which directs them to restrict their search space to a specified table partition. (There may be exceptions to this generalization, for example in the case of queries containing UNION, INTERSECT, or MINUS set operators.) Parallel subqueries are generated by a series of transformations from the A-form of a query. These transformations fall into five types:

1) Appending a partitioning predicate to the WHERE clause. Of the four types, this is the only one which must always be performed.

2) Select list transformations, which add columns to the select list, or replace columns with other columns. (These are specified in detail in DBN #39.)

3) Removing the HAVING clause, if any. (A HAVING clause cannot be correctly applied to partial group results, and therefore must be applied by a combining function or query, after groups have been merged. Note that Q11 of DBN #21 *is* thus decomposable.)

4) Replacing tables in the FROM clause with pre-sorted temporary tables, if pre-sorting is used to convert merge joins to nested loops joins.

5) Adding optimizer directive comments. Since a cost-based optimizer might not be guaranteed to chose the same strategy for a parallel subquery as it chose for the original query, and since the decomposition strategy might depend on that optimizer strategy, *confirming* directives might be needed to coerce the optimizer to stick to the original plan. Alternately, there may be cases where we want to generate *new strategy* directives to cause the optimizer to use a different strategy than the one revealed in the original EXPLAIN plan.

Output rows from parallel subqueries provide the input rows to the combining functions and queries discussed below. Conceptually, the combining functions or queries dynamically merge the output streams of the parallel subqueries, so that the parallel subqueries do not have to be executed to completion before executing the combining functions or queries.

Combining Functions and Queries

A combination of combining functions and queries is used to merge the output streams of parallel subqueries, producing a single output stream identical except possibly for ordering to that which would have been produced by directly executing the O-form of the query. In the simplest case, a single combining function is used to produce the logical "union all" of the separate parallel streams. More complex cases can involve multiple functions or queries working together to perform merging of sorted streams, merging of groups, aggregation, and expression evalution (e.g. testing of HAVING clauses), as well as the set operations UNION, INTERSECT, and MINUS. The means by which multiple combining functions and queries can coordinate their efforts are discussed in detail in DBN #36.

Combining functions are generic and predefined (e.g. one predefined grouping function, one predefined merging function, etc.), but their roles in executing a particular decomposed query are governed by control structures which are generated during the *transformation* phase of query decomposition. The interconnection of these structures governs the way in which the different combining functions and queries coordinate their work.

When a combining query is called for, a control structure will be generated as for a combining function, but in addition, the query itself must be generated. This is done by starting from the A-form of the query, and applying transformations analogous to, but different from, those used to generate parallel subqueries. These can include the following:

1) Replace the FROM clause with the name of the temporary table to which the combining query will be applied (a combining query could theoretically join data from multiple tables, but this is unlikely to be necessary).

2) Remove the GROUP BY clause if the combining query will be applied to a temporary table which contains only one group at a time.

3) Replace arguments of aggregate functions with the names of the temporary table columns which contain the corresponding partial aggregate results. In the case of AVG, replace the entire expression with "SUM(<partial sums>)/SUM(<partial counts>)".

Parallel Cursor Control Structures

In addition to set-up and clean-up queries, parallel subqueries, and combining functions and queries, a goal of the *transformation* phase of query decomposition is the generation of control structures to glue together and coordinate the overall parallel cursor, and to keep track of housekeeping details such as memory buffers and DBMS connections. In broader conceptual terms, this means that the several types of queries produced by *transformation* rules are not separate and independent goals, but rather coordinated pieces which together constitute the embodiment of a parallel execution strategy, which is the T-form of a query.

Summary of Generated Queries

Of the five classes of generated queries discussed above, probing queries differ from the other four in that they are created during the *gathering/analyzing* phase of query decomposition, rather than during the *transformation* phase. They also differ in that while their generation is a goal of some of the *gathering* rules, they are used as a tool by other *gathering* rules, and the output of their execution serves as input to the *analyzing* rules, and so, indirectly, to the *transformation* phase of query decomposition. The remaining categories of queries (set-up queries, clean-up queries, parallel subqueries, and combining functions and queries) can all be considered end products of query decomposition, and collectively (together with parallel cursor control structures) they constitute the T-form of a query.

Figure 16:
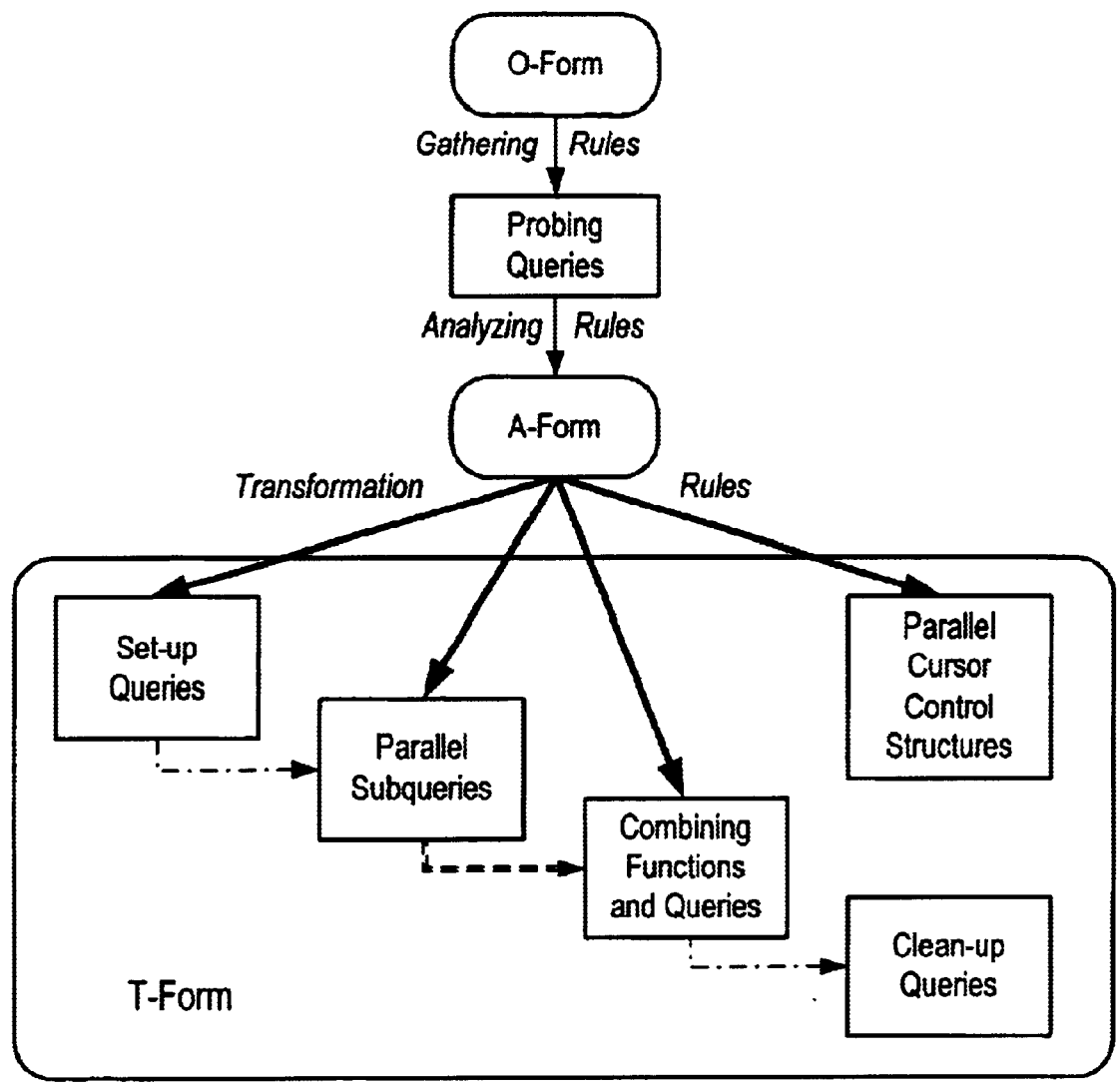

Figure 16 summarizes the query decomposition process. Solid arrows in the diagram represent the application of rules, and point towards the goals of those rules. Arrows with dashed lines indicate query execution, and point from the query being executed to the query which depends on the output of that execution. Note that while there is a sequence of execution dependencies between the four types of queries belonging to the T-form, the rules which generate them can conceptually be applied in parallel.

Prototyping Rules in Prolog

The goal-oriented language Prolog provides an ideal tool for the definition, prototyping, and "proof-of-concept" testing of the rules of query decomposition. Rules can be specified clearly, concisely, and non-procedurally in Prolog, which can greatly facilitate testing of complex combinations of rules. Prolog also supports syntax for concise specification of grammar, which would facilitate developing a basic SQL parser to drive the rule testing. Once the set of rules has been verified in Prolog, it can be hard-coded in C for optimal efficiency of the actual implementation. As rules change or new rules are added to the system in subsequent releases, the Prolog prototype will provide a flexible tool for testing them together with the existing rules before adding them to the C implementation. The present document provides a framework within which to define and test specific rules in the Prolog prototype.

Parallel Cursor Building Blocks (Database Note #36)

When we decompose an SQL query into separate queries which can be executed in parallel, we create, in addition to the separate (sub)cursors for the parallel queries, a master cursor structure (in the PUPI layer) called the parallel cursor (or pcursor for short), which drives the execution of the subcursors, and combines their results to return to the caller the result rows of the original query. In a first release, we may restrict the classes of queries which can be decomposed and parallelized, and consequently pcursors may tend to be relatively simple and limited in variety. But as we support increasingly complex queries which require more complex combining functions, both the complexity and range of variety of the pcursor will increase.

We can prepare for a smooth evolution to increasingly complex functionality, without sacrificing ease or efficiency of initial implementation, by adopting a building block architecture similar to that used by some query engines (and in fact, the PUPI really IS a query engine, except that its ultimate row sources are cursors over some other query engine, rather than base tables). Rather than building separate special combining functions for each of our general cases, we can factor out the basic functions which are common to all currently-planned and many future combining functions, and define building blocks specialized to perform each. A fairly small set of these building blocks can be combined to form arbitrarily complex pcursors. Implementation details of subfunctions can be hidden within building blocks, while the overall arrangement of building blocks in a particular pcursor will provide a clear diagram of its strategy (analogous to an Oracle EXPLAIN table, for instance). As the system evolves, some new functions will call for invention of new building block types, while others can be implemented simply by new combinations of existing building blocks.

Pnodes: General Characteristics

We may call the building blocks which make up a pcursor "pnodes" (referred to as "building blocks" or "bb's" elsewhere). These can be arranged into a doubly-linked tree called a pnode tree. Each pnode has one pointer to its parent, and zero or more pointers to its children, depending on its node type (some node types have a variable number of pointers to children). Other attributes of all pnodes include:

Node ID:    Uniquely identifies this pnode within a particular pnode tree

Node type: Identifies what kind of pnode this is
Pointer to executor: Each node type has its own executor function
State: The current state of this pnode A variant portion will contain attributes particular to each node type, sometimes including additional state attributes. Each node type also has a specialized executor function, but all executor functions take the same two parameters: a request code indicating the type of operation to perform, and an array of pointers to buffers which is used to locate data.

In general, pnodes are specialized row sources.

Pnode Tree Execution

Pnode trees are parent-driven. A parent "pulls" rows from its children, which passively respond to parent requests. A parent pulls a child by calling the child's executor function, passing it a request code to distinguish the specific nature of the request. Since all executor functions are of the same type, and since the generic portion of the pnode contains a pointer to its function, a parent can call a child's function without knowing the child's node type, or what specific function to call.

A very small set of request codes can be overloaded to have appropriate meanings to particular node types in particular states. Request codes might include:

NEXT: Return the next row
(We might want both synchronous and async versions of NEXT)
RESET: Reset to beginning of stream, return first row
PEEK: Return next row, but don't change currency
RESET_CACHE: Reset to beginning of cached group of rows, return first
NEW_CACHE: Start a new cached group of rows, return first
CLEANUP: Perform any necessary cleanup, e.g. close cursors A second (perhaps overlapping) series of reply codes is returned to the parent by the child, as the return value of its executor function. These might include:

| | |
|---|---|
| READY: | Requested row is ready |
| WILCO: | Have begun requested (async) fetch, but row is not ready yet |
| EOD: | End of data |
| EOG: | End of group |
| ERROR: | An error has occurred |

A third (again perhaps overlapping) series of state codes will be maintained by a pnode's execution function as values of its state field, to let the pnode remember its context from one pull to the next. State codes might include:

| | |
|---|---|
| UNINITIALIZED: | Haven't been pulled yet since pcursor was opened |
| EMPTY: | No data is ready or pending |
| PENDING: | Waiting on an incompleted operation to fetch data |
| READY: | Data is ready to return to parent |
| EOD: | Have reached end of input stream |
| EOG: | Have reached end of group |

(The state codes stored in pnodes tend to reflect their current state in their role as a child, since their local context is lost between one pull from their parent and the next. Local state variables in the executor functions of particular pnode types would serve to recall a parent's state after pulling a child, since context has not been lost in that case.)

The Buffer Translation Table

As mentioned earlier, when a parent pnode calls its child's executor function, it passes it, along with the request code, a table of pointers to buffers. This provides a coordinated means of managing buffers and locating atomic data items, among all the pnodes of a particular pcursor. When the particular pnode tree is created during query decomposition, decisions are made about which particular numbered buffer pointers within the buffer translation table will be used for which specialized purposes (for example, a particular buffer table entry might be reserved as the next-ready-row buffer for a particular subcursor pnode). In this way, individual pointers don't have to be passed around, and any data manipulation or expression evaluation logic built into particular pnodes can reference data by buffer number and offset within buffer, minimizing the need for data movement.

Associated with each pointer in the buffer translation table is a flag indicating whether the buffer has an associated semaphore, and if the flag is set, then a hook to the semaphore itself. Those buffers which are to be shared across thread boundaries will obviously require semaphores.

Pnode Types

Here is a first pass at defining a set of pnode types which could be used to parallelize most or all of the queries we have been considering:

Root

A root pnode serves as the root of a pnode tree, and has one child. It specializes in projecting result rows into a caller's buffer. When the caller requests an ORACLE array fetch (fetch a specified number of rows into arrays of target variables in a single call), the root pnode would "drive" the array fetch, pulling its child an appropriate number of times to gather the requested rows. A root pnode might not be needed in some trees, if there are cases where other pnode types can easily enough place results directly in the caller's buffer.

Union-All

A union-all pnode returns, in arbitrary sequence, the result rows of all of its children. It has a variable number of children (but fixed in any given instance), which would tend to be equivalent parallelized subcursors (although in future it could be used to union rows from heterogeneous sources). Conceptually, a union-all pnode pulls its children asynchronously (i.e. without waiting if a row is not READY) in round-robin fashion, and returns the first READY row encountered. Its additional state attributes keep track of where it left off in the round-robin, and which children have reached EOD; when the last child returns EOD, the union-all pnode returns EOD. In practice, the sequence of pulling children need not be strictly round-robin, and the union-all pnode may only actually "pull" a given child once, to get it started on asynchronous fetch-ahead, after which it simply checks a semaphore to see if a row is READY from that child. In the event that no child has a READY row, the union-all pnode should be able to wait on the semaphores of all of its children until one clears, to avoid a round-robin busy wait.

Merge

A merge pnode merges the results rows of its children, which are all assumed to be sorted in the same collating sequence, into a continuous run of that sequence. Like the union-all pnode, it pulls all of its children asynchronously, but it must wait for all children to be simultaneously READY or EOD, before returning a row. It then returns that row from among its children which is lowest in collating sequence, and re-pulls that child whose row was returned.

(Note: A merge pnode might want to use the PEEK request code when first pulling its children, if it doesn't actually remove a row from a child's buffer until it decides which row is next in collating sequence. Alternatively, it could move rows to its own buffers to free up child buffers for additional fetch-ahead.)

Group

A group pnode expects a stream of rows from its single child sorted by group columns. It returns rows to its parent until it encounters a row whose group column values do not match those of the preceding row, at which point it returns EOG. The offending row becomes the first row of the next group, and is returned the next time the group pnode is pulled.

Aggregate

An aggregate pnode performs aggregate functions AVG, MAX, MIN, SUM, and COUNT. (These are the standard SQL aggregate functions. ORACLE also supports STDDEV and VARIANCE, which require a somewhat more complicated approach, and will probably be supported through combining queries rather than combining functions in our first release.) It first initializes aggregate values, then accumulates data from rows from its single child until EOG or EOD is returned, and finally (in the case of AVG) performs the finish-up computation necessary. Having clauses could also be evaluated by the aggregate pnode, at the finish-up step. SELECT DISTINCT could also be handled by the aggregate pnode, by setting it up with a child group pnode which groups by all columns.

(Note: to implement DISTINCT, grouped aggregates, e.g. "select count(distinct job_title) from emp group by rept_dno", we can introduce a "subgroup" pnode which is actually not a distinct node type, but simply a group pnode which returns EOSG, "end of subgroup", instead of EOG. In the present example, the subgroup node would group by job_title, while a group node beneath it would group by rept_dno. Each time the aggregate pnode received EOSG, it would increment its counter of distinct job titles, and when it received EOG, it would return a group result to its parent.)

Subcursor

A subcursor pnode fetches rows from a parallelized subcursor and returns them to its parent. It can asynchronously fetch ahead and buffer a tunable number of rows.

The subcursor pnode functionality could potentially be decomposed to more than one specialized pnode types, but need not be. It is unique among pnode types described thus far in having two executor functions which share the same pnode data structure. The "master" executor is called by the subcursor pnode's parent. The primary job of the master executor is to spawn a parallel thread to run the parallel executor, when the subcursor pnode is first pulled in an UNINITIALIZED state. The parallel executor in turn starts an ORACLE session (or grabs one from the available sessions pool) and opens an ORACLE cursor for the parallelized subcursor. Subsequently, the master and parallel executors can coordinate their work by means of semaphores, with the master checking to see whether a next row is ready whenever one is requested by the subcursor pnode's parent. (To avoid a "busy wait" it may actually be preferable for the parent of the subcursor node to wait on semaphore of all of its children until one is ready. In this case, the role of the subcursor's master executor would be to perform whatever manipulation of buffer pointers and resetting of semaphores is necessary to return a row to the parent, to keep the details of the subcursor's buffer and semaphore management transparent to the parent, and to factor out these functions from the different possible parent types. The master's role is somewhat analogous to that of client-side DBMS software in a client-server DBMS. Conceptually, these tasks could be performed by the parent, so that the master executor is not strictly required.)

Pnode Trees for Various Types of Queries

The pnode types discussed thus far would comprise a fairly powerful "starter set" capable of effectively parallelizing a wide range of queries. As such, they would probably comprise a good goal for a first full-featured release. Before looking at some potential "advanced" pnode types, let's look at the types of trees that can be built using the starter set of pnodes, to handle various classes of queries. Query numbers in this section refer to the examples in KSR Database Note #21, *Parallelizing Decision Support Queries in Version 1 of ORACLE for KSR*. To simplify the diagrams, a degree of parallelism of 4 is assumed in all examples.

Basic Union-All of Parallel Subcursors

Figure 17:
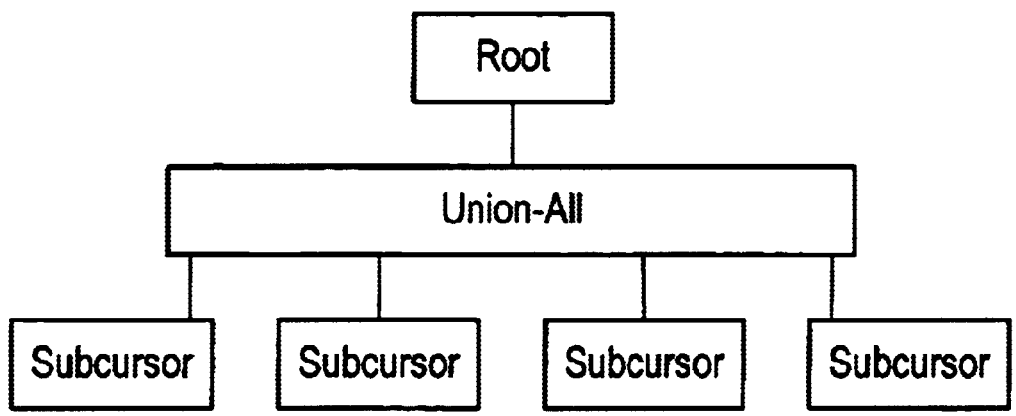
FIGS. 17–23 are used in connection with the discussion of parallel cursor building blocks in Database Note #36.

The simplest pnode tree type shown in Figure 17 can be used for all fully-parallelizable queries that don't involve ordering, aggregates, grouping, or duplicate elimination. These include parallelizable instances of examples Q1 through Q6, and Q12 (although better but more complex approaches are possible for Q6 and Q12).

Each time the root requests a row, the union-all pnode returns the first available row from any of its children, until all children have returned EOD.

Basic Merge for Order-by

Figure 18:
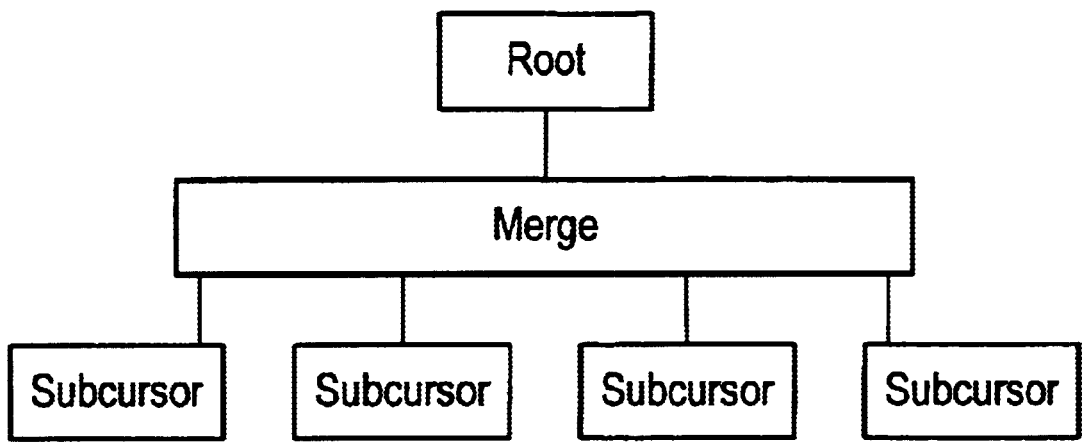

The pnode tree type shown in Figure 18 can be used for queries which could otherwise have been handled by a basic union-all tree, but for the addition of an order-by clause (e.g. Q7).

The subcursor nodes in this tree type are all assumed to return their rows in the desired order (this will tend to mean that the child subcursor's query has an ORDER BY clause specifying that order, but the actual means by which the child orders its rows is of no concern to the merge pnode). Each time the root requests a row, the merge pnode returns the first row in collating sequence, chosen from among the current rows of all children that have not yet returned EOD. In general the merge pnode can't return a row while any child is in a WILCO state, since that child might return the next row in sequence. However, the merge pnode could remember the sort column values of the most recently returned row, and if any READY child has a row with matching values, that row can be returned without waiting for non-READY children.

Basic Aggregation

Figure 19:
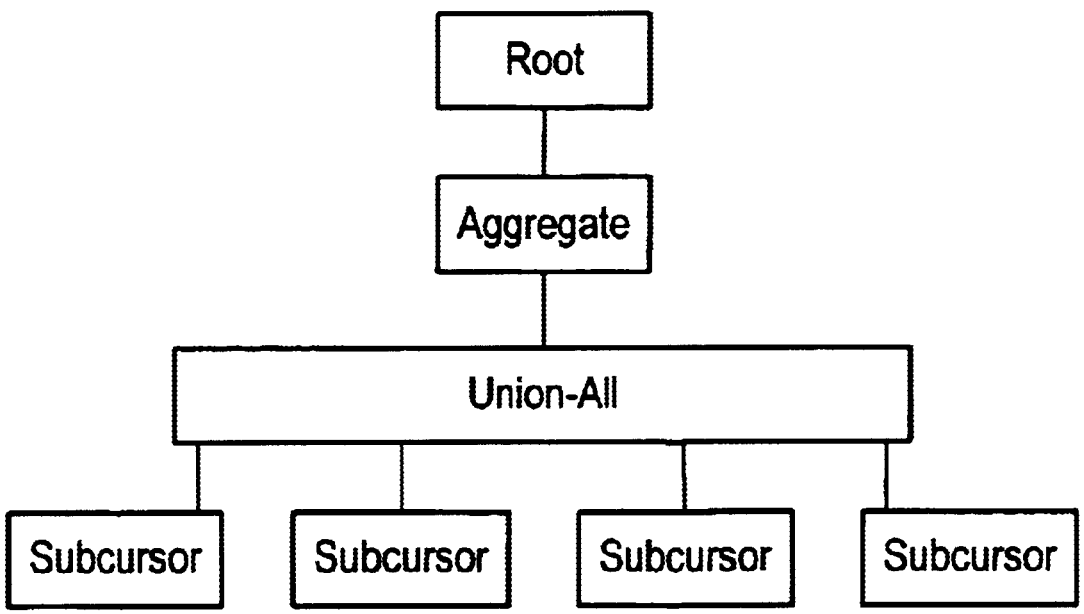

The pnode tree type shown in Figure 19 can be used for basic, i.e. non-grouped aggregation (e.g. Q8).

For aggregate functions SUM, MAX, and MIN, the aggregate pnode simply computes the function over the appropriate columns of its input rows; the fact that the input rows themselves are already partial aggregate results is transparent and irrelevant to the aggregate pnode. For COUNT, the aggregate pnode actually computes the SUM of the appropriate columns (i.e. the SUM of the partial counts yields the total count). Any AVG function in the original query will have been tranformed to SUM and COUNT of the corresponding column in the queries for parallelized subcursors; the aggregate pnode can simply sum up the partial SUM and COUNT values, and when its child returns EOD, it can divide the cumulative SUM by the cumulative COUNT to yield the AVG value.

The aggregate pnode returns a single row of final aggregate values when its child union-all pnode returns EOD, which happens when all of the latter's children have returned EOD.

(Note: the Figure 19 tree type can also be used for STDDEV and VARIANCE by using a combining query version of the aggregate pnode. Combining queries are discussed in a later section of this paper.)

Grouped Aggregation

Figure 20:
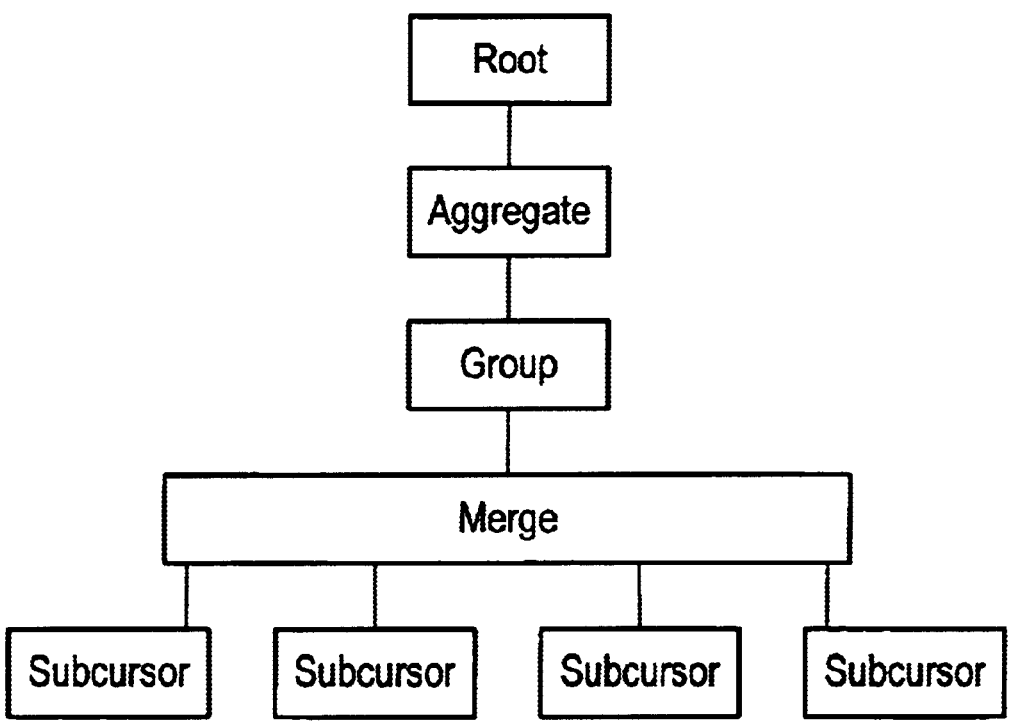

The pnode tree type shown in Figure 20 can be used for both grouped aggregation (e.g. Q10) and SELECT DISTINCT (e.g. Q9).

For grouped aggregation, the merge pnode merges its input rows into order on group columns; the group pnode passes the rows through to the aggregate pnode, but returns EOG when it sees a row whose group columns don't match the previous row. This is the signal for the aggregate pnode to return a row with aggregate results (and the associated group columns) to its parent. The aggregate pnode functions identically for grouped and basic aggregation; it is willing to recognize either EOG or EOD as the signal to finish its computations and return a row, so it needn't be "aware" of which type of tree it is participating in.

Duplicate elimination can be treated as simply a degenerate case of grouped aggregation, in which all columns are group columns, and there are no aggregate columns. The job of the aggregate pnode here is simply to return one row to its parent, for each group of identical rows received from its child group pnode.

(NB: In general, while it is reasonably safe to assume that a parallelized subcursor will return grouped or uniquified rows in order by group columns, a clever optimizer might sometimes choose descending rather than ascending order by those columns if an appropriate index is available, since any order which keeps like values contiguous serves the purpose. The group pnode can ignore the distinction, since it can compare group columns for equality, but the merge pnode must know whether it is merging an ascending or descending sequence. Ideally, this would be determined from ORACLE's optimizer plan and flagged in the pnode when the tree is generated during query decomposition, but if necessary, the merge pnode could peek ahead past the first rows of one or more of its children until it finds group column values which don't match those of the first row of the same child, and thus deduce whether the sequence is ascending or descending.)

Structurally, adding a HAVING clause does not change the approach to grouped aggregation. The aggregate pnode "simply" evaluates the having clause as a final step of finishing its computations after receiving EOG from its child; if a row fails to satisfy the HAVING clause, the aggregate pnode starts aggregating a new group, without returning the previous group's result row to its parent. (However, evaluation of HAVING clauses requires more powerful and generalized expression evaluation capabilities than previous examples. For a first release, we would use a combining query against an intermediate table to implement HAVING clauses, as discussed in a later section of this paper.)

(NB: This tree type could also be used for distinct aggregates, and for STDDEV and VARIANCE. However, in these cases the merge pnode would not be merging intermediate group results. Instead, the subcursors would order by the desired group columns, the merge pnode would merge the rows into a continuous stream in that order, and the group pnode would do the entire job of grouping rows "from scratch". This is necessary because in these cases all rows of a group must be considered in computing the function; it is not possible to merge intermediate group results. For a first release, these cases would use a combining query version of the aggregate pnode.)

(NB: In a more unified design, grouping could be handled as a special case of the MERGE building block. This way the same aggregate building block is used for grouped or non-grouped aggregations.)

"Advanced" Pnode Types and Trees Using Them

The additional pnode types introduced here (and perhaps others as well) could be introduced in a second release to broaden the universe of effectively parallelizable queries. As described here, these would carry the pcursor further in the direction of general query engine functionality.

Cache

A cache pnode is similar in function to a group pnode, but each group is rereadable. This pnode caches each row pulled from its child, and also returns the row to its parent, until it encounters a row not in the current group, at which point it returns EOG just like a group pnode. However, the parent may now request RESET_CACHE, which will cause the cache pnode to start returning rows from the current cached group, in the same order they were initially returned. Alternately, the parent may request NEW_CACHE, which causes the cache pnode to start caching a new group, and return its first row to the parent. (We might not really need a separate NEW_CACHE request code, since NEXT could imply that meaning in this context.)

Merge-Join

Database Note #21 discusses cases of multi-way joins (Q6) in which more than one table lacks an index on join columns. There it is proposed that the largest non-indexed table be chosen as the partitioning table, and that the remaining non-indexed tables be put last in the join order, but it is pointed out that when this query is parallelized, each subcursor will redundantly sort both sides of each merge join step. One way to eliminate this redundant sorting would be to introduce a merge-join pnode.

A merge-join pnode has two children, each of which are assumed to return rows grouped (which implies ordered) on join columns. Furthermore, if (as in the general case), the join columns are not known to comprise a unique key on the left child, then the right child is assumed to support rereading of its groups (i.e. it is a cache pnode). Having pulled an initial row from each child, the merge-join pnode continues pulling from whichever child's most recent join key values are earlier in collating sequence, until it finds a match. It now returns the current left-hand row joined to the current right-hand row, and to each right-hand row until it encounters EOG on the right. Then it pulls the next left-hand row; if it is still in the same group, it resets the cache on the right a joins each record in the cache to the new left-hand row. This continues until EOG on the left, at which point a fresh row is pulled from each child and we're back at the beginning of the algorithm, to continue until EOD is returned from one or the other child.

Assume a multi-way join of the form "select * from TI(1), ... TI(n), TN(1),... TN(p) where ...", where TI(1) ... TI(n) are tables indexed on join columns, while TN(1) ... TN(p) are tables not indexed on join columns, and where TN(1) is the largest non-indexed table. First we can decompose this into two queries, Q(1) joining TI(1) ... TI(p) and TN(1); and Q(2) joining TN(2) ... TN(n). Q(1) has the property that all but one of the joined tables has an index on join columns, so it is effectively parallelizable with TN(1) as the partitioning table. Q(2) is a join where no tables have indexes on join columns, and so is not effectively parallelizable by any means proposed thus far. Add to each of these two queries an ORDER BY clause requesting ordering by any columns appearing in join predicates from the original query, which join tables retrieved by Q(1) and tables retrieved by Q(2).

Figure 21:
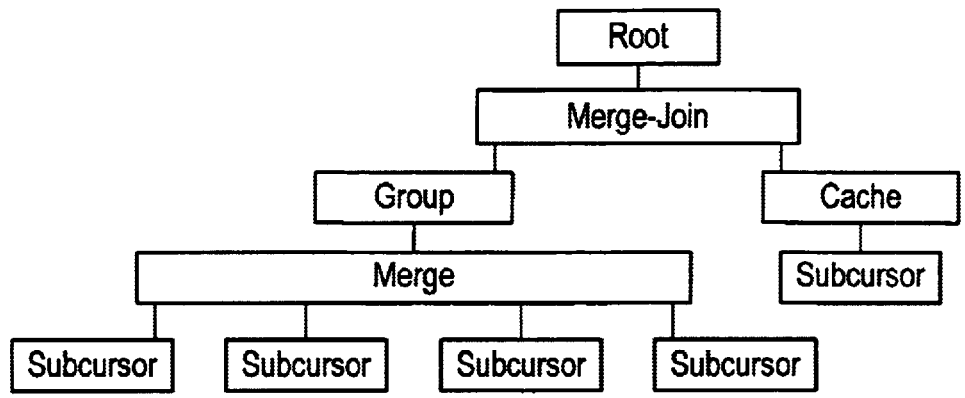

Now, the pnode tree which would be used to parallelize Q(1) if it stood alone, can be used as the left branch of a merge-join pnode (with a group pnode in between to let the merge-join pnode know when a new set of join column values is encountered). Since Q(2) is not effectively parallelizable, it can be handled by a single subcursor pnode, hung off a cache pnode which lets the merge-join pnode reread groups with matching sets of join column values. This gives us the tree type shown in Figure 21.

Unfortunately, since Q(2) does not contain the join predicates between the tables it retrieves and the tables retrieved by Q(1), it cannot use them to restrict which rows are sorted. This could be remedied by a further refinement: retain those join predicates as part of Q(2), with the references to columns of TI(1) ... TI(n), TN(1) transformed to query parameters. Now, each time the merge-join pnode requests a new cache group from its right-hand child, the subcursor pnode in that branch will re-open its subcursor with the new parameter values. This will require enhancing the subcursor pnode to know how to find parameter values and use them to re-open a cursor. (Note that with the parameterized subcursor enhancement, the cache node would not be required when querying a DBMS that supports scrollable cursors, i.e. cursors whose results can be re-read as cheaply or more cheaply than we can do our own caching. Also note that the evaluation of Q(2) will eventually be done in parallel once parallel sorts and merge joins are available.)

Sort

A sort pnode would be useful for that relatively rare class of queries which contains both grouped aggregation, and an ORDER BY clause requesting ordering on aggregate columns, for example:

select avg(sal), dno from emp
    group by dno
    order by avg(sal) desc

Figure 22:
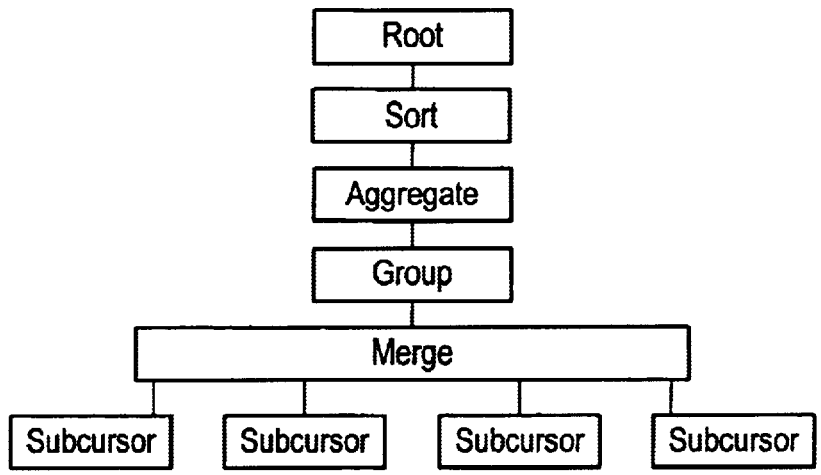

Since we can only merge pre-sorted parallel input streams once, and we "use up" that capability to do the grouping, we need to completely sort the output aggregate rows as a last step, giving us a tree like Figure 22.

When the parent of the sort pnode requests a row, the sort pnode pulls rows from its child until EOD is encountered, then sorts them and returns the first row in sorting sequence. When pulled again, it returns sorted rows until none are left, and then returns EOD.

"Mini-Sort"

Figure 23:
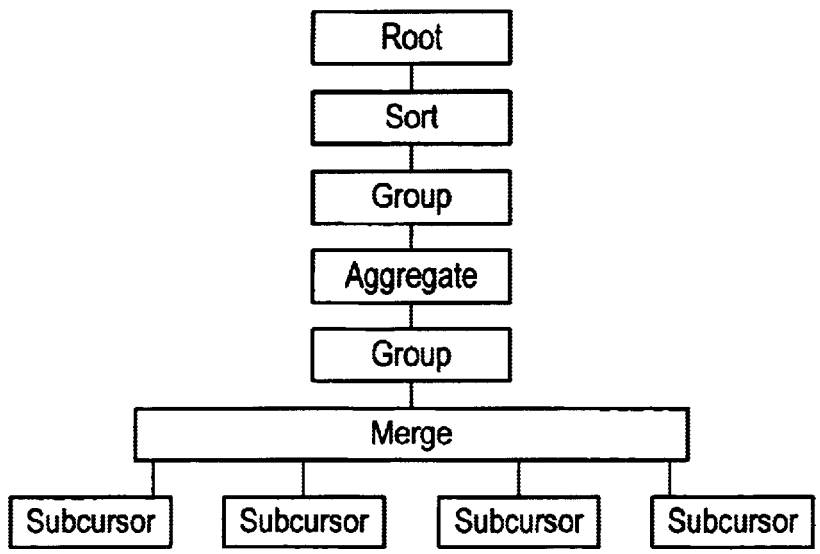

One last example will give a taste of the additional refinements which the pnode tree architecture will permit, sometimes, as in this case, without requiring any new pnode types. Consider a query such as:

```
select dno, subdno, avg(salary) from emp
group by dno, subdno
order by 1, 3
``` which computes the average salary for each subdepartment, and returns them sorted overall by department number, but within each department sorted by average salary. If at decomposition time we are smart enough to notice that the input stream to our final sort is already ordered by a leading subset of our sort columns, we can group on that leading subset, and perform a "mini-sort" of each group, potentially significantly cutting our sort costs (it would take cost-based optimization to determine the best choice case by case, but a reasonable heuristic would be to use mini-sort whenever possible instead of full sort). The only change on the execution-time side is that the sort pnode must recognize EOG as an alternate signal that it's time to sort the rows it has been collecting. The pnode tree would look like Figure 23.

Combining Functions vs. Combining Queries

Database Note #21 distinguishes two classes of approaches to combining the output streams of the parallelized subcursors resulting from query decomposition. In a *combining functions* approach, functions which we implement as part of the PUPI library manipulate the output streams from the parallelized subcursors, to emulate the result stream which would be produced by handing the caller's original query straight to ORACLE. The pnode architecture as presented thus far is a proposed instance of a *combining functions* approach. An advantage of such an approach is that it permits rows to stream from function to functions, with caching required only when an algorithm demands it. A disadvantage is that as complexity of cases handled increases, the *combining functions* require more and more of the attributes of a query engine, to do their jobs. In particular, they begin to require the ability to mimic the generalized expression evaluation capabilities of the DBMS.

In a *combining queries* approach, the output rows from parallelized subcursors are inserted into one or more temporary intermediate tables (We believe one is always sufficient for cases we have discussed). A combining query is formed, which can be handed to ORACLE to execute against the intermediate table(s), producing an output stream which mimics that which the original query would have produced if handed direct to ORACLE. An advantage of this approach is that it might be much easier to implement, particularly for more complex cases, because it lets ORACLE do most of the combining work, avoiding the tendency to re-invent a query engine inside the PUPI library. A disadvantage is that it incurrs the considerable extra overhead of creating, populating, and dropping one or more temporary intermediate tables. (This would be much less a problem with a DBMS that supported private, transient, preferably-in memory tables, or better yet, a mechanism for directly streaming the output of one cursor as a virtual input table of another cursor.)

In general, the tradeoff here is between development cost, which is higher for combining functions especially in cases requiring generalized expression evaluation; and performance, which is slower for combining queries especially in cases where intermediate results would tend to be large. Thus, a case such as grouped aggregation with a having clause would be a good candidate for combining queries, at least in a first implementation, since it requires fully generalized expression evaluation (a having clause may test the value of arbitrary expressions over group or aggregate columns), and intermediate results will be relatively small (only one row per distinct set of group column values per subcursor). Straightforward cases where union-all suffices as a combining function would be obvious candidates for a *combining functions* approach. For intermediate cases, the tradeoff may not be so obvious.

It may be desirable to implement some cases entirely by means of combining functions, and others entirely by means of combining queries. However, it is preferrable to combine the two approaches by encapsulating combining query behavior inside pnodes. This would permit mixing and matching of *combining function* and *combining query* approaches, and would minimize and localize the changes needed to substitute more efficient *combining function* implementations of particular functions for first-release *combining query* versions of them, in later releases.

The general architecture of a *combining query* pnode would be as follows: externally, its general appearance and behavior would be like any other pnode: it would have one parent and zero or more children; it would recognize the standard request codes and return the standard reply codes; it would pull rows from its children as needed and return rows to its parent when requested. Internally, it would have an associated combining cursor (not unique for a pnode, since the subcursor pnode already knows how to manage a cursor) and one or more associated tables (which it might create when pulled while UNINITIALIZED, and drop when called upon to CLEANUP). When pulled to return a row, it would pull rows from its children and insert them in the appropriate intermediate table until all children returned EOD (or perhaps EOG in some cases), and would then open its combining cursor over the intermediate table(s), and fetch and return rows from that cursor.

The simplest approach to using a combining query within a pnode tree would be to have an appropriate *combining query* pnode "masquerade" in place of a *combining function* pnode in one of the tree types we have already discussed. As the most general instance, a *combining query* pnode could masquerade as the root pnode in the basic union-all tree (Figure 17). This tree structure could handle a wide variety of cases, depending on the nature of the combining query (but there would be no point in using a combining query for cases that the basic union-all tree could have handled without one). For example, the combining query could contain an ORDER BY clause, to perform as full sort as an alternate to using a merge pnode to implement sorted queries. Or it could contain GROUP BY and HAVING clauses, and appropriate aggregate functions over columns of the intermediate table(s), as an alternative to the grouped-aggregation tree shown in Figure 20.

This "simple" approach has the disadvantage that all rows retrieved from all parallel subcursors must be inserted in the intermediate table, which can therefore grow arbitrarily large. We can do much better by implementing *combining functions* versions of the merge and group pnodes, and implementing a *combining query* pnode to masquerade as an aggregate node. We could then build trees like Figure 20 if we build a *combining query* pnode to masquerade as the aggregate node. For each group of rows from its child, it could populate an intermediate table and execute a combining query to perform aggregation and test the HAVING clause; it could then empty the intermediate table and repeat for subsequent groups. This requires us to implement only the relatively simple expression evaluation needed to compare sort and group column values, while letting a combining query handle the potentially complex expressions involved in aggregate functions and the HAVING clause. And it limits the cardinality of the intermediate table, at any one time, to at most the degree of partitioning of the overall query.

As a next incremental improvement, we might implement the "real" aggregate pnode, but without the ability to evaluate a HAVING clause. We could then build the Figure 20 tree with a combining query pnode masquerading as the root pnode. This

- 113 - time, the combining query pnode would only have to insert into an intermediate table one row per group, rather than one row per group per subcursor (i.e. inserts would be cut by the degree of partition of the pcursor); and the combining query could use a simple WHERE clause in place of the HAVING clause, to decide which rows from the intermediate table should be returned.

"Set-Up" Functions and Pnode Architecture

In some cases we may wish to perform "set-up" functions such as creating secondary indexes, or having ORACLE pre-sort rows into temporary tables, to facilitate better-optimized queries. This could be of particular advantage in cases where sorts would otherwise need to be performed redundantly in parallelized subcursors. This kind of approach is not incompatible with pnode architecture, and could perhaps be handled as an adjunct function of the root pnode, to be performed once when the root is pulled in an UNINITIALIZED state. It is necessary to create secondary keys or temp tables before opening any parallelized subcursors, because the latter may reference temp tables, and ORACLE may take advantage of secondary indexes in optimizing the subcursors.

We can distinguish two general types of pnode combining architectures, parallel and sequential, for those pnode types which have more than one child. In the latter, a given child must complete its entire task before the next child is pulled; this approach would be used to handle set-up functions, and possible in some cases "non-masquerading" combining queries.

One possible problem must be considered: the query decomposition process is driven by examining the query execution plan returned by ORACLE's EXPLAIN call. Only after we examine this plan for a particular query will we decide which, if any, set-up functions to perform. But once the set-up functions are performed, we can assume (in all interesting cases) that ORACLE would now return a different EXPLAIN plan; indeed, that's what we're counting on. However, if we don't actually execute the setup functions until we first pull the pnode tree, then they haven't yet been executed while we're creating the tree, so we can't examine ORACLE's revised EXPLAIN plan, and must guess at its contents. Presumably we have a pretty good guess, or we wouldn't have chosen the set-up function strategy, but careful consideration may reveal some cases where we can't be sure. In that event, we might need to move the set-up functions to query decomposition time, rather than pnode-tree-execution time.

Overhead of Pnode Architecture for Trivial Cases

Assuming that we bypass the PUPI layer entirely at query execution time for those queries which we don't decompose, the overhead of using the pnode approach for simple decomposable cases should be insignificant. Pnode architecture differs from other possible approaches to combining functions in being more object oriented, and more geared towards factoring out common subfunctions. But any combining functions approach would require some kind of data structures to define the plan for the particular query and maintain state information during execution, some mechanism for coordinating activity across thread boundaries, and some number of levels of subroutine calls. It is only in the last area that pnode architecture might be seen to have slight additional overhead, due to separating functions that might potentially have been combined. But even this should be neutralized by the mechanism of a parent pulling its child by executing the child's function indirectly, which avoids the slight overhead of a dispatcher to functions based on pnode type.

More complex combining functions involving full (as opposed to merge) sorting (for ordering aggregate results) or caching (for merge joins) would ideally be built over a buffer paging layer to allow the size of intermediate results to exceed available memory. The need for paging management is inherent in the sort and cache functions, however they are incorporated into an overall design, rather than being inherent in the pnode architecture. These cases could be handled by combining queries in earlier releases.

Parse Tree Requirements for Query Decomposition (Database Note #37)

In order to decompose a query into parallel subqueries, and then execute those subqueries and combine their results to emulate the results of the original query, we need in each case to do one or more of the following:

1) Transform the input query to generate parallel subqueries.

2) Transform the input query to generate a combining query.

3) Identify and generate defining structures for any expressions which we will evaluate ourselves, whether they are implicit (e.g. comparisons on ORDER BY or GROUP BY columns) or explicit (e.g. HAVING clause) in the original query.

The general case of each of these tasks requires full parsing of the input query.

It should be noted that the SQLDA structure returned by DESCRIBE SELECT does not provide adequate information for the needs of the three decomposition tasks listed above:

1) SQLDA describes only the SELECT list items themselves, not underlying columns or other clauses of a query.

2) If a SELECT list item has an alias, then that alias, rather than the expression defining the item, appears as the name of the item in the SQLDA. Therefore, we can't rely on names in SQLDA for identifying aggregate functions, for example.

3) Apparently (according to my experiments) SQLDA does not return the precision or scale of numeric expressions which are not direct column references.

The output of EXPLAIN also does not provide the kind of information needed for query transformation; in particular, it gives no detailed information at all about expressions in the SELECT list, ORDER BY, GROUP BY, WHERE, or HAVING clauses.

This database note presents a general description of a set of data structures which could be used to form a parse tree to represent those attributes of a parsed query in which we are interested. If we have to parse queries ourselves, our parser would produce such a tree.

General Characteristics

The parse tree should ideally constitute a complete self-contained definition of a query, such that an SQL query specification can be generated from it. This implies that it should contain whatever names and aliases would be needed to specify tables and columns in an SQL query specification. It should embody the complete definition of a query and all of its clauses, but in a form suitable for easy and flexible traversal, manipulation, and transformation.

QDEF: Query Definition

The QDEF is the top level structure of the parse tree for a particular query (where query is used in the broad sense to include possible UNION, INTERSECT, or MINUS set operators connecting multiple SELECT blocks).

Attributes:

Number of ORDER BY columns (0 if there's no ORDER BY clause)

Pointer to ORDER BY clause (array of ORDCOLs).

Pointer to tree of set operators (SETOPs) and queries (QRYs). This will point directly to a single QRY if there are no set operators.

ORDCOL: ORDER BY Column

An ORDER BY clause is represented by an array of ORDCOLs, with one element for each ORDER BY column. Each ORDCOL has the following attributes:

Direction (ASC or DESC).

Poiner to ORDER BY column expression (value EXPR).

SETOP: Set Operator

A SETOP represents a UNION, INTERSECT, or MINUS set operator.

Attributes:

Operator type (UNION, UNION ALL, INTERSECT, or MINUS).

Pointers to two operands (QRYs or other SETOPs).

QRY: Query

A QRY represents an individual query (i.e. a SELECT block).

Attributes:

Number of SELECT list columns.

Pointer to SELECT list (array of SELITEMs).

Number of tables in FROM clause (array of TABs).

Pointer to FROM clause (array of TABS).

Pointer to WHERE clause (Boolean EXPR).

Number of GROUP BY columns (0 if there's no GROUP BY clause).

Pointer to GROUP BY clause (array of pointers to value EXPRs).

Pointer to HAVING clause (Boolean EXPR).

(? Pointers to CONNECT BY and START WITH clauses?)

SELITEM: Select List Item

Attributes:

Name (the name which DESCRIBE would return for this SELECT list item; this will be the item's alias if an alias was specified in the query, otherwise it will be the actual expression text for the item).

Pointer to expression for this SELECT list item (value EXPR).

TAB: Table Reference in FROM Clause

Attributes:

Name (the actual name of the table).

Alias (alias specified for table in query definition).

(Note: the alias is particularly needed for queries with self-joins or correlated subqueries against the same table, where we need to distinguish between multiple instances of the same table.)

EXPR: Expression Element

An EXPR is used to represent each of the elements in the expressions which specify the SELECT list columns, ORDER BY and GROUP BY columns, and WHERE and HAVING clauses. These elements include fields (i.e. base table or view table columns); literals; host parameters; and expression operators, which include both value expression operators (e.g. +, ||, substr) and Boolean operators (e.g. =, <, AND, OR, NOT). EXPRs are arranged in trees to represent arbitrarily complex expressions. An overall EXPR tree represents a value expression or a Boolean expression depending on whether its root EXPR represents a value operator or a Boolean operator.

Attributes:

Operator (code indicating type of expression element: field, literal, host parameters, or particular value or Boolean operator).

Pointer to next EXPR (so all EXPRs can be linked together in a list for easy traversal).

Datatype (ORACLE datatype code).

Length.

Precision (for numeric types only).

Scale (for numeric types only).

Variant portion for fields only:

Name.

Pointer to table in FROM clause (TAB). (Alternately, table number, used as index into FROM clause array. Note that table name is not sufficient, since query may contain separate instances of same table with different aliases. Table alias might serve here, but link back to FROM clause will tend to be more convenient.)

Variant portion for operators only: pointers to operands (EXPRs).

Variant portion for literals: value of literal.

Variant portion for host parameters: some appropriate means of finding the parameter value after the cursor for this query is opened.

(Note: Datatype, length, precision, and scale do not apply to Boolean operators. For value operators, these attributes describe the value resulting from applying that operator to its particular operands. Also note that while we won't always need to know the type attributes of every intermediate expression within an EXPR tree, we will sometimes need to know the type attributes of operands, as well as type attributes of results, so that in general we need to know type attributes of all EXPRs to which type attributes apply.)

Common Subexpression Sharing

Figure 24:
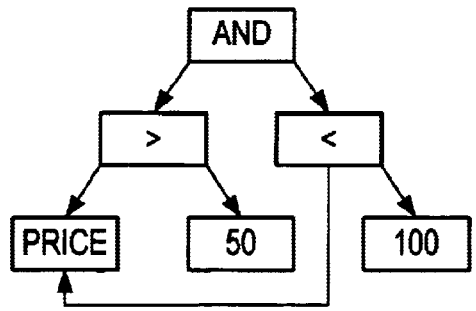
FIGS. 24–25 are used in connection with the discussion of parse tree requirements for query decomposition in Database Note #37.

While not strictly necessary, it would be useful to represent any common expression by a single EXPR subtree, and share that subtree by pointing to it from each place it is referenced. For example, the expression "PRICE > 50 AND PRICE < 100" can be represented as shown in Figure 24 with a single instance of the EXPR for PRICE pointed to by both the > and < operators. Doing this when generating the parse tree can save us a lot of trouble each time we need to determine if two expressions reference the same subexpression, while we are using the tree. For example, during query decomposition we will need to determine whether each expression in the ORDER BY clause is also contained in the SELECT list. With common subexpression sharing, we can simply traverse the SELECT list and see whether we find a matching pointer; without sharing, we might have to traverse the entire expression tree of each SELECT list item to determine whether it is identical to the expression tree of an ORDER BY column.

Example

Figure 25:
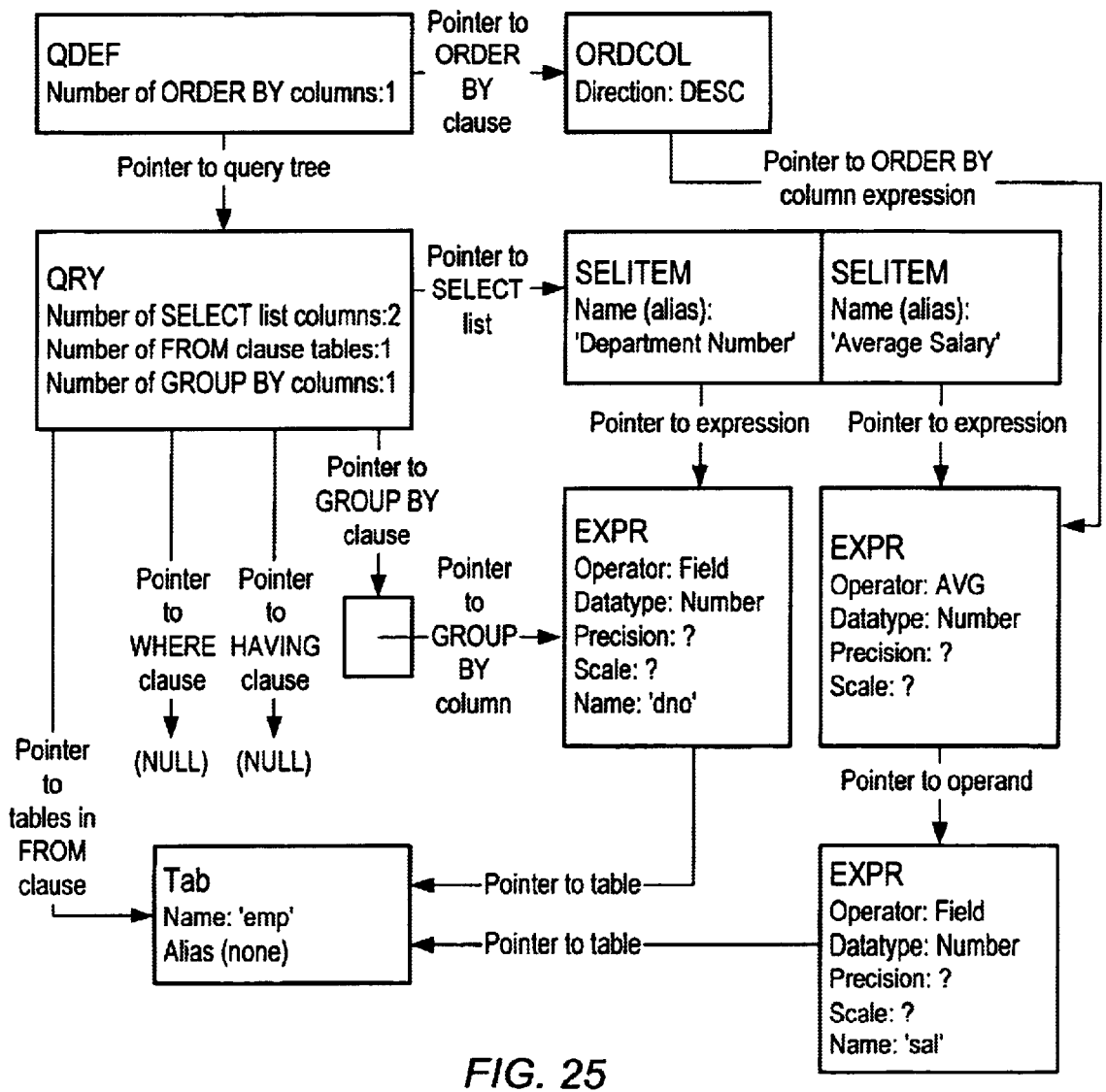

Figure 25 is a schematic diagram of an example parse tree, for the query:

SELECT DNO "Department Number", AVG(SAL) "Average Salary"
FROM EMP
GROUP BY DNO
ORDER BY 2 DESC A fairly simple example was chosen for the sake of readability, but note that in this example, the FROM, ORDER BY, and GROUP BY clauses each contain only one element, so it may not be obvious from the diagram that the structures representing those clauses are (in this case single element) arrays. In particular, note that the QRY structure's pointer to GROUP BY clause does not point directly to the EXPR representing the (first) GROUP BY column, but rather to a (single element) array of pointers to GROUP BY elements. The SELECT list in this example contains two items, so the QRY's pointer to SELECT list points to an array of two SELITEMs.

Select List Transformations (Database Note #39)

This section aims at providing a more complete list than we have previously discussed of cases in which we need to transform the select list of a query when generating parallel subqueries.

1) AVG

Each select list item consisting of an AVG function in the original query is transformed into two select list items, a SUM function and an COUNT function each with the same argument as the original AVG function, in the parallel subqueries. For example:

SELECT AVG(SALARY) FROM EMP becomes

SELECT SUM(SALARY), COUNT(SALARY) FROM EMP
WHERE {partitioning predicate}

If the results rows from all such parallel subqueries are inserted in an intermediate table TEMP, with columns SUMSAL and COUNTSAL containing the intermediate results for SUM(SALARY) and COUNT(SALARY) respectively, then the final weighted average can be computed with a combining query against the intermediate table, of the form:

SELECT SUM(SUMSAL)/SUM(COUNTSAL) FROM TEMP

2) ORDER BY column not in select list

ORACLE SQL permits ordering by a column not present in the select list, for example:

SELECT LNAME, FNAME FROM EMP
ORDER BY SALARY

To make such a column available for merging of several sorted streams, whether through a combining function or a combining query, the column must be added to the select list, so that the above query yields parallel subqueries of the form:

```
SELECT LNAME, FNAME, SALARY FROM EMP
WHERE {partitioning predicate}
ORDER BY SALARY
```

3) GROUP BY column not in select list

SQL permits grouping by a column not present in the select list, for example:

```
SELECT AVG(SALARY) FROM EMP
GROUP BY DNO
```

We wish to parallelize such a query by computing intermediate aggregate results for the groups retrieved by each parallel subquery, and then merging the streams to compute weighted aggregates for each group. Since we can't merge the groups if the grouping columns are not retained, they must be added to the select list of the parallel subqueries if not already there, so that the above query yields parallel subqueries of the form:

```
SELECT SUM(SALARY), COUNT(SALARY), DNO FROM EMP
WHERE {partitioning predicate}
GROUP BY DNO
```

4) HAVING contains aggregates not in select list

One could, for example, get a list of departments with high average salaries with the query:

```
SELECT DNO FROM EMP
GROUP BY DNO
HAVING AVG(SALARY) > 30000
```

Whether we implement HAVING clause evaluation ourselves or use a combining query, we cannot apply a HAVING clause until we have merged our parallel streams and computed the final weighted aggregates for a group. By that point, in the example above there would be no column to which to apply the HAVING predicate, without select list transformation. Any aggregate mentioned in the HAVING clause and not already present in the select list must be added to the select list, and if necessary transformed according to rule 1 above, so that the above query yields parallel subqueries of the form:

SELECT DNO, SUM(SALARY), COUNT(SALARY) FROM EMP
WHERE {partitioning predicate}
GROUP BY DNO Also note that the HAVING clause itself is omitted from the parallel subqueries, as it cannot be applied until the combining step.

5) ORDER BY an expression

Up to this point, we've looked at examples where combining the results of our parallel subqueries would be logically impossible without performing the specified select list transformations. There are other cases where transformations which are not strictly required can simplify our requirements for expression evaluation. For instance, merging streams sorted on a select list column requires the ability to compare two values according to SQL's collation rules. Merging stream sorted on an expression not appearing in the select list requires the additional ability to evaluate that expression. We can eliminate the latter requirement by adding the expression to the select list of the parallel subquery. For example:

SELECT PRICE, QUANTITY FROM LINE_ITEMS
ORDER BY PRICE * QUANTITY could be transformed to:

SELECT PRICE, QUANTITY, PRICE * QUANTITY FROM LINE_ITEMS
WHERE {partitioning predicate}
ORDER BY 3

Note that this case is really the same as case 2 above, in that the ORDER BY clause refers to an expression not present as a select list item, except that in this case the expression happens to involve operands which ARE present in the result list, so that the transformation is logically optional.

Also note that a wide variety of expressions which yield values may legally appear in an ORDER BY clause. For example, this is a legal query:

SELECT * FROM EMP
ORDER BY SUBSTR(LNAME, 2, 2)

So this class of transformation can potentially eliminate the need to re-invent a wide class of expression evaluation.

6) GROUP BY an expression

This is similar to case 5, except that if a given column is referenced in the GROUP BY clause within an expression, then if it appears at all in the select list, it must appear within that expression (or within an aggregate function). To give a nonsense example (since a meaningful one is hard to imagine), the following query is legal:

SELECT DNO + 2, AVG(SALARY) FROM EMP
GROUP BY DNO + 2 as is this one:

SELECT AVG(SALARY) FROM EMP
GROUP BY DNO + 2 but this one is not:

SELECT DNO, AVG(SALARY) FROM EMP
GROUP BY DNO + 2

The middle example above would have to be transformed to parallel subqueries of the form:

SELECT DNO + 2, AVG(SALARY) FROM EMP
WHERE {partitioning predicate}
GROUP BY DNO + 2

7) **Transformations to "SELECT *"**

ORACLE SQL does not permit a select list containing an unqualified "*" to contain any other separately-specified columns. However, ORACLE SQL supports the syntax <table-name>.* as shorthand for all columns of a particular table, within a select list. It is permitted for this to be one of several separate column specifiers. In general, for a query joining several tables, "SELECT *" is equivalent to "SELECT <table1>.*, <table2>.*, ... <tableN>.*".

Therefore, whenever it is necessary to transform a "SELECT *" select list by adding one or more additional columns, "SELECT *" must be transformed to "SELECT <table1>.* etc.". As a specific example:

```
SELECT * FROM EMP, DEPT
WHERE EMP.DNO = DEPT.DNO
ORDER BY SALARY + BUDGET
``` could be transformed to:

```
SELECT SALARY + BUDGET, EMP.*, DEPT.* FROM EMP, DEPT
WHERE EMP.DNO = DEPT.DNO AND {paritioning predicate}
ORDER BY 1
```

8) STDEV and VARIANCE

Each select list item consisting of a STDDEV (standard deviation) or VARIANCE function in the original query is transformed into three select list items: a SUM function, a COUNT function, each with the same argument as the original STDDEV or VARIANCE function; and a nested set of functions of the form SUM (POWER ( <expression>, 2 ) ), where <expression> is the argument of the original STDDEV or VARIANCE function. For example,

```
SELECT STDDEV(SALARY) FROM EMP
``` becomes

```
SELECT SUM(SALARY), COUNT(SALARY), SUM(POWER(SALARY),2) FROM
EMP WHERE {partitioning predicate}
```

If the result rows form all such parallel subqueries are inserted in an intermediate table TEMP, with columns SUMSAL, COUNTSAL, and SUMSQRSAL containing the intermediate results for SUM(SALARY), COUNT(SALARY), and SUM(POWER(SALARY),2), respectively, then the final weighted standard deviation can be computed with a combining query against the intermediate table, of the form:

```
SELECT DECODE( SUM(COUNTSAL), 1, 0, SQRT((1/(SUM(COUNTSAL)-1)) *
        ( SUM(SUMSQRSAL) - POWER(SUM(SUMSAL),2) / SUM(COUNTSAL))))
        FROM TEMP
```

The use of the DECODE expression within this combining expression is necessary to avoid a possible zero denominator in the case where "SUM(COUNTSAL)-1" evaluates to zero.

For a query referencing VARIANCE, such as:

```
SELECT VARIANCE(SALARY) FROM EMP
``` the parallel subqueries would be the same as for STDDEV, as shown above, and the combining query would be of the form:

```
SELECT DECODE( SUM(COUNTSAL), 1, 0, ((1/(SUM(COUNTSAL)-1)) *
        ( SUM(SUMSQRSAL) - POWER(SUM(SUMSAL),2) / SUM(COUNTSAL))))
        FROM TEMP
```

(Note that the only difference in the combining expression for STDDEV and VARIANCE is the nesting of the entire expression within a SQRT function in the case of STDDEV.)

9) INSERT/SELECT

Queries which are INSERT/SELECT statements (i.e., which insert into a specified table the result rows of a query specified within the same statement) can be decomposed, and fall into two classes. Neither class requires special transformations to the select list itself, but both classes generate queries of distinctive form.

The first class consists of INSERT/SELECT statements in which the query portion does not contain grouping or aggregation. In queries of this class, each parallel subquery is generated as an INSERT/SELECT statement, which inserts rows directly into the table specified in the original query. For example:

INSERT INTO MANAGERS SELECT * FROM EMP WHERE JOB_TITLE = MANAGER becomes

INSERT INTO MANAGERS SELECT * FROM EMP WHERE JOB_TITLE = MANAGER AND {partitioning predicate}

The other class consists of INSERT/SELECT statements in which the query portion contains grouping or aggregation. In queries of this class, the parallel subqueries do not contain the INSERT INTO... portion of the original statement, and look just like parallel subqueries generated for the query portion of the original statement, if the original statement were not an INSERT/SELECT statement. Instead, the combining query is generated as an INSERT/SELECT statement, which fetches final query results from the intermediate table, and inserts them in the table specified in the original query. For example:

INSERT INTO AVG_SALS SELECT AVG(SALARY) FROM EMP GROUP BY DNO generates parallel subqueries of the form:

SELECT SUM(SALARY), COUNT(SALARY), DNO FROM EMP
    WHERE {partitioning predicate}
    GROUP BY DNO and generates a combining query of the form:

INSERT INTO AVG_SALS SELECT SUM(SUMSAL)/SUM(COUNTSAL) FROM TEMP GROUP BY GROUPCOL (where GROUPCOL is the column of TEMP containing DNO values fetched from the parallel subqueries)

Query Decomposition Control Structures (Database Note #41)

Introduction

This section raises a number of questions about query decomposition and parallel query execution, and suggests alternative approaches in some areas.

PUPI Control Structures

The PUPI potentially requires control structures at four levels: session, user connection, parallel cursor (pcursor), and parallel subquery (psubqry). A user session can potentially open multiple concurrent ORACLE connections, each of which may have multiple concurrent open cursors, each of which, if decomposed, will have multiple parallel subqueries. Within a connection, a cursor is uniquely identified by cursor number, but if we choose to support multiple concurrent user connections, then the *hstdef* for its connection is required in addition to the cursor number to uniquely identify a cursor.

Figure 26:
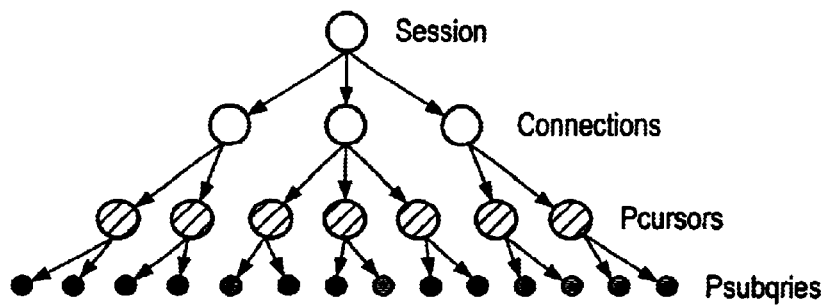
FIGS. 26–27 are used in connection with the discussion of query decomposition control structures in Database Notes #41.

This section proposes four levels of control structures connected in a tree, as shown schematically in Figure 26.

Figure 27:
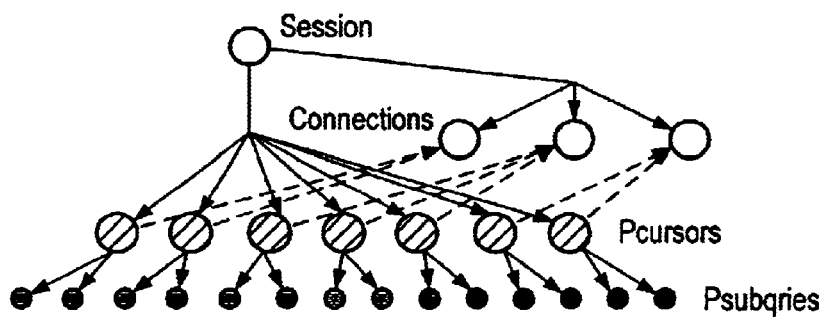
Figure 28:
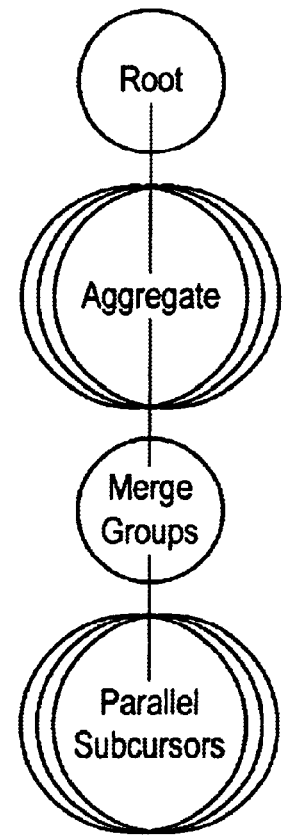
FIGS. 28–30 used in connection with the discussion of upper tree parallelism in parallel cursors in Database Note #42.
Figure 29:
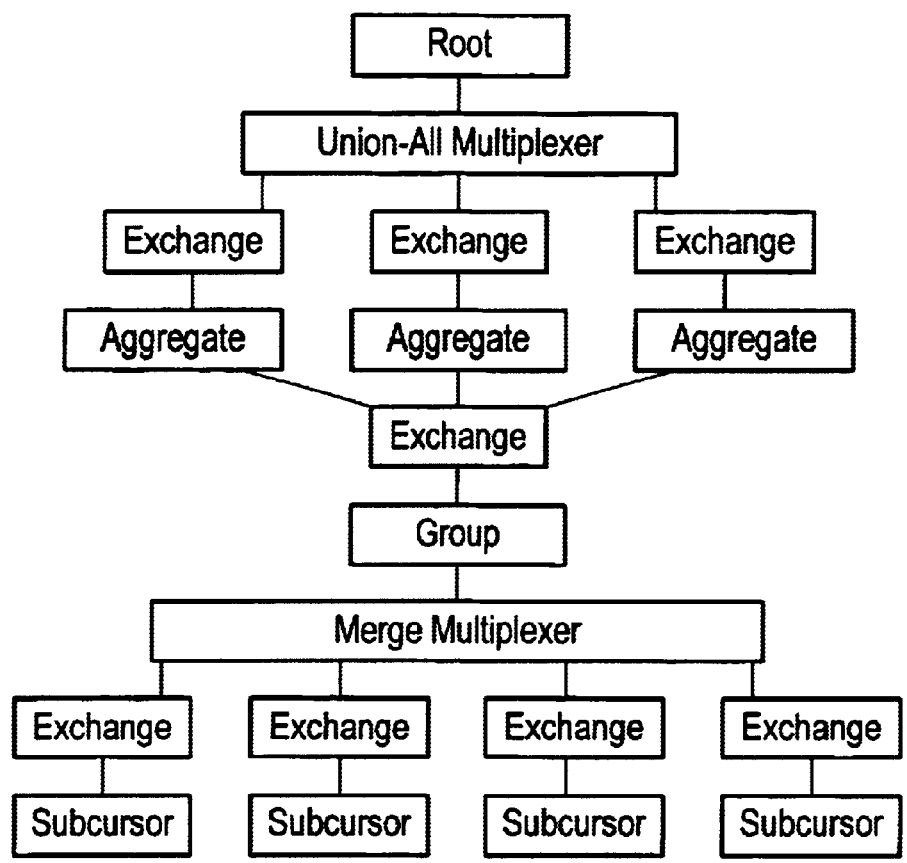
Figure 30:
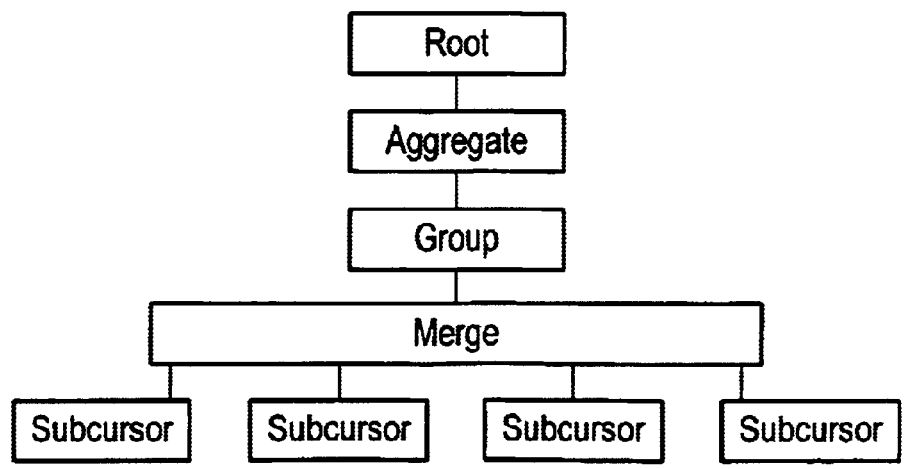

An alternative approach would be to group pcursors directly under the session level, but with pointers back to their respective connection structures, as shown in Figure 27.

This would reduce a little more gracefully to the single-connection case, since it would require fewer levels of indirection to find a pcursor. We have chosen the four-level approach (for the time being) because it provides a simpler framework within which to specify more detailed data structures. If we choose to support only a single user connection, the session and connection levels proposed here can be collapsed into a single level.

Session level control structures provide for top-level PUPI housekeeping, and coordinate PUPI activities for a user session, which may include multiple connections with ORACLE.

Connection level control structures coordinate all PUPI activities for a particular user connection with ORACLE.

Pcursor level control structures contain definitional, state, and context information about a parallel cursor and its combining functions and queries, and coordinate the parallel subqueries of that pcursor.

Psubqry level control structures contain definitional, state, and context information for an individual parallel subquery. It is proposed that psubqry-specific information be clustered together in memory, connected to a master control structure (the subquery pnode) for each psubqry. Alternately, psubqry level information might be clustered by type of information, collected in arrays attached to the pcursor level control structures, indexed by psubqry number (e.g. an array of *hstdefs* for the parallel connections, arrays of *bind* and *select* descriptors for the parallel subcursors, etc.). This paper proposes the former approach for two reasons: first, to allow greater flexibility in adapting the system to handle heterogeneous parallel subqueries, which might not each have the same kinds of control information; and second, to minimize memory subpage contention, on the assumption that the control information for a given psubqry will be accessed much more often by that psubqry's thread than by any other parallel thread.

Session Level Control Structures

PCOM - PUPI Common Area

This is the master control structure for the entire PUPI. It is created and initialized by pupiini(). All other PUPI structures can be accessed via pointer paths from this structure, so that a pointer to this structure is the only global variable required in the PUPI. (ISSUE: We're not sure yet whether we have any particular reasons to want to avoid global variables, but my previous experiences with multi-threaded programming have led me to consider it prudent to avoid globals if they aren't necessary.)

PCOM contains:

- Pointers to UPI functions, which pupiini() sets to point to either PUPI or UPI functions, depending on whether query decomposition is enabled or disabled. (NOTE: Function calls will be slightly faster if each individual function pointer is a global variable, so we might want to separate them from PCOM if we don't have any particular reasons to avoid globals.)

- Number of active user connections to ORACLE (mainly of interest to distinguish between one and many).

- Pointer to first CONNECTION structure. CONNECTION structures form a linked list. PUPI calls which specify a cursor number will also specify a connection, by *hstdef*, so we must first search the linked list of connections, and then search the list of pcursors for the specified connection. (It is assumed that the number of concurrent user sessions will tend to be quite small, so that searching a linked list to find a session should not be a problem.)

- Error state information (details to be determined). It is assumed that connection-specific error and other status information is communicated to the user application via the *hstdef* for that connection, and we will probably need to emulate some of that behavior. The error state information in PCOM relates to PUPI-specific errors, or instances in which we need to translate errors returned by psubqries into something more meaningful to the user. Since we process user calls one at a time, it is assumed that this information can be maintained in PCOM, rather than separately for each connection.

- Pointers to memory heaps (optional). We could make direct system calls whenever we need to dynamically allocate a structure or buffer. However, this makes it inconvenient to free a complex network of structures all at once (e.g. to get rid of all decomposition-time structures when we're done decomposing a query, or to get rid of a pcursor and all of its associated structures when we close it). One (expensive to implement) solution to this problem would be to develop our own heap management layer. When we create a heap, we would allocate its initial extent from the system; we could then allocate and free individual structures at will; and when we delete the heap, we simply make one system call to free the initial extent, and an additional system call for any expansion extents, and all of the heap's contents are freed without any need to traverse a structure network to find them. We could maintain, for example, one decompose heap which gets recreated and deleted each time we decompose a query; and a separate execution heap for each pcursor.

Connection Level Control Structures

CONNECTION

This is the master control structure for a particular user connection. While it could be created for a given connection when the connection is established, its creation could alternatively be deferred until the first time we decompose a query for that connection. It contains:

- Pointer to ORACLE *hstdef* for this original user connection; this is the *hstdef* which will be "cloned" for parallel connections. (ORACLE's UPI holds the caller responsible for allocating a *hstdef* for each connection. It is assumed that we can point directly to that *hstdef*, and do not need to copy it.)

- Number of pcursors currently open for this connection. (NOTE: We're not sure we actually have a use for this.) (NOTE 2: By a "currently open" cursor, we mean a cursor which has been decomposed and not yet closed and discarded. Decomposition happens in pupiosq(), which is called during execution of an OPEN CURSOR statement for a static SQL cursor, but during execution of PREPARE for a dynamic SQL cursor.)

- Pointer to pcursors for this connection. There may be occasions when we need to visit all pcursors (e.g. to close all of them), but more typically we must randomly access a particular pcursor by cursor number, whenever the PUPI receives a request aimed at a particular cursor number (e.g. upifch). (In fact, we must do this even for non-parallel cursors, since there's no way to tell from the number itself whether it belongs to a parallel or non-parallel cursor.) If the number of concurrently opened pcursors stays small, a linked list would be adequate for both types of access. Otherwise, we might want a faster random access organization (e.g. a hash table), perhaps in addition to a linked list. (NOTE: We probably have to assign the same cursor number to a pcursor which ORACLE returns when we parse its input query; otherwise, we might collide with cursor numbers of non-parallelized cursors in the same application. This means we probably can't use cursor numbers directly as array indices for fast random access.) (NOTE 2: If we adopt the alternate approach in which pcursors for all connections are gathered in one list, attached to PCOM, then we would probably want to hash together the *hstdef* and the cursor number for quick pcursor lookup.)

- Pointer to unused parallel connections pool (if and when we implement connections pooling).

Parallel Cursor Level Control Structures

PCURSOR - Parallel Cursor Structure

PCURSOR is the master control structure for a particular decomposed cursor which is currently open. It is created when the cursor is decomposed, and is discarded when the cursor is closed. (Since decomposition of a particular query happens entirely within a single PUPI call, pupiosq(), transient data structures needed only during decomposition can be discarded once decomposition is completed.)

PCURSOR contains:

- Root cursor number. This is the number returned by ORACLE when the input query is parsed, and is the number user calls will use to identify this cursor (together with the *hstdef* for the connection to which the cursor belongs). It must be distinct from other cursor numbers of this user connection, whether they belong to parallel or non-parallel cursors.

- Pointer to next PCURSOR for this session (to connect it in linked list starting from pointer to first PCURSOR, in PCOM).

- Pointer to buffer translation table (BTT). This is an array of pointers to buffers used by this pcursor; data can be referenced by index into this array, and offset within buffer. (Each psubqry has its own buffer translation table for its fetch-ahead buffers; the pcursor BTT has one entry for each psubqry BTT. This avoids subpage contention from psubqries accessing their BTTs in parallel. This is only necessary if pointers in a psubqry BTT need to be modified during query execution; otherwise, each psubqry could simply be assigned a range of buffer numbers within the BTT of the pcursor.)

- Pointer back to CONNECTION to which this pcursor belongs. (This is provided for convenience, so that routines operating on the pcursor can easily find the *hstdef* or other connection-specific information when they need it, without having to search for it in the list attached to PCOM, or having it passed as a separate parameter.)

- *Bind* descriptor for the root cursor. This describes any host parameters referenced in the original input query which has been decomposed. It is modified each time the pcursor is re-opened. (ORACLE permits re-opening a cursor to bind new host parameter values, without an intervening close. This causes the same user-visible behavior as if there were an intervening close, but the query does not have to be re-parsed and re-optimized.) Since host variables described in the bind descriptor are not modified by query execution, and since they are referenced identically in all parallel subqueries of the same pcursor (unless we choose to specify fileid through a host parameter), the root cursor's *bind* descriptor can be shared by parallel subqueries.

- *Select* descriptor for the root cursor. This describes target host variables into which select-list items are placed to satisfy a fetch request. It is potentially modified prior to each fetch, to specify different target locations and/or different data conversions. (ISSUE: Several descriptor formats are used by various UPI routines, so we will need to determine the most appropriate format to store with the pcursor, and the most appropriate point(s) to "tap into" the various UPI routines which can be called to describe target variables. Also, we may want to keep a separate, "vanilla" descriptor which describes the way select-list items look when they are returned from parallel subqueries, i.e. the source types for conversion to requested output types. Since psubqries fetch ahead asynchronously, in general one of them will already have fetched the next row to be returned to the user, before the user specifies the data conversions required for that row.)

- Pointer to combining tree (control structures for combining functions and queries).

- (?) Number of psubqries, i.e. degree of partitioning of this query. (We're not sure we actually need this for anything once the query has been decomposed.)

- (?) Pointer to psubqries. (NOTE: We doubt we need this here, because the multiplexing pnode types, UNION-ALL and MERGE, contain arrays of pointers to psubqries. But if there's any need to navigate easily from PCURSOR to psubqries, without traversing the pnode tree, a pointer in the PCURSOR could point directly to the same array which is embedded within the multiplexing pnode of that PCURSOR's pnode tree.)

- (?) Pointer to control structures for setup queries to be executed when this pcursor is opened (e.g. to create temporary indexes or indexed temporary tables so merge joins can be replaced by nested loop joins). It is not yet clear how much of the setup work would happen at decomposition time as opposed to execution time, so detailed specification of setup control structures is deferred.

- (?) Pointer to the original input query definition (the actual SQL text). We may want this here because ORACLE supports re-prepare and re-open of a cursor without an intervening close. If pupiosq() is called with a cursor number for which we already have a pcursor, we know that the user wants to re-prepare the pcursor, which means in general that we must discard everything and start from scratch. But if we can tell by comparing the new SQL text to a saved copy of the original query that it hasn't actually changed, we can treat re-prepare as a no-op, and simply wait for a subsequent call to bind new host parameters to the pcursor.

Combining Tree

The combining tree (or pnode tree) is a tree of control structures which coordinate psubqry execution and combine the result streams of individual psubqries to produce the result stream of the pcursor. Pnode architecture is discussed in DBN #36.

The following pnode types will be supported in the first release:

Root

The root pnode is respondible for loop control for ORACLE array fetches, and possibly for instances where final data conversions are needed when projecting results into user buffers. (The root may be omitted from some combining trees.)

Aggregate

The aggregate pnode is responsible for computing aggregate functions, and for evaluating HAVING clauses. There will actually be two types of aggregate pnode, a combining function version and a combining query version, but the distinction will be externally transparent.

The combining query version of the aggregate pnode will contain the following information for controlling its combining query and associated temp table:

- DDL query for creating temp table on initialization. (Conceptually, this could be an actual SQL 'CREATE TABLE' statement, to be executed dynamically, but perhaps it can be an equivalent definition to be executed at a lower level.) (NOTE: The temp table could be created at decomposition time, i.e. at pcursor open time, but it is conceivable that it would never be needed, e.g. if the overall query has no result rows, or if the user program never actually fetches from the cursor after it is opened.)

- DDL query for dropping temp table when pcursor is closed.

- Query definition for an INSERT statement to insert rows into the temp table as they are fetched from the aggregate pnode's child. (NOTE: as with temp table creation, the INSERT statement could actually be prepared at decomposition time, in which case its definition would not be needed here.)

- Cursor number for the INSERT statement.

- *Bind* descriptor for the INSERT statement.

- Query definition for the combining query. (NOTE: as with temp table creation, the combining query could actually be prepared and opened at decomposition time, in which case its definition would not be needed here.)

- Cursor number for combining query.

- *Bind* and *select* descriptors for combining query. The *select* descriptor might actually be the same as for the root cursor, in which case the combining query could place results directly in the user's buffers. The *bind* descriptor, however, would tend in general to differ from that of the root cursor, since any WHERE clause in the original query, together with any host variables it contains, can be removed from the combining query (since rows which don't satisfy it never get that far).

Group

The group pnode is responsible for detecting group boundaries in a stream of rows already sorted on GROUP BY columns.

Multiplexing Pnodes - Union-All and Merge

The union-all and merge pnodes are each able to coordinate the retrieval of rows from an arbitrary number of psubqries. They differ in that the union-all pnode returns rows in arbitrary order, as they become available from different psubqries, while the merge pnode merges the already-sorted output streams of its child psubqries into a single stream sorted on the same columns (these may be ORDER BY or GROUP BY columns, depending on the query).

A multiplexing pnode contains an array whose dimension is the degree of partitioning of the parallel cursor, with each array element containing the following elements:

- Pointer to psubqry pnode.

- Pcursor BTT entry number of this psubqry's BTT for fetch-ahead buffers.

- Number of buffers in psubqry's BTT.

- Buffer number of next ready row in psubqry's BTT. (This is just for the multiplexer to keep track of where it is in the round-robin through this psubqry's buffers. A separate bitmap, discussed below, indicates whether each buffer actually contains a row.)

Psubqry

The psubqry structure is a pnode in its role as leaf node of a combining tree, but its details are best addressed in its role as master control structure for a parallel subquery, which is discussed in the next section.

Parallel Subquery Level Control Structures

PSUBQRY - Parallel Subquery Structure

PSUBQRY contains:

- *Hstdef* for this parallel thread's connection to ORACLE.

- Cursor number for this parallel subquery.

- Pointer to *bind* descriptor for this parallel subquery. (This can probably point to the pcursor *bind* descriptor, since all psubqries of the same pcursor have identical parameter references, and since psubqries do not modify the parameters described by the *bind* descriptor.)

- *Select* descriptor for this parallel subquery. (NOTE: While psubqries place their output values in different locations, which may change from fetch to fetch, their output columns otherwise share the same description. We can economize on memory by separating out the sharable portions of the descriptor information, which could be collected in the "vanilla" descriptor discussed above, attached to the pcursor, and could be pointed to by each of the psubqries. We may want to keep separate copies of the location portion of the descriptor for each fetch-ahead buffer of each psubqry, to avoid having to reset each output column location between fetches. This decision depends on the tradeoff between memory and CPU use.)

- Buffer translation table (BTT) array of pointers to fetch-ahead buffers for this parallel subquery. (NOTE: This design, by giving each psubqry a separate BTT, would make it difficult to dynamically adjust the number of fetch-ahead buffers for different psubqries in reaction to data asymmetry. If our fetch-ahead design does not call for modifying fetch-ahead buffer pointers during execution, then the separate BTT and the number of buffers in the BTT can be replaced by a pair of buffer numbers indicating a range of buffers in the pcursor's BTT reserved for use by this psubqry as fetch-ahead buffers.)

- The number of buffers in the BTT (i.e. its dimension).

- Pointer to broadcast command area. The parent multiplexing pnode will place a command in this area, to be read by all of its child psubqries, which will be one of *fetch-ahead, re-open,* or *close* (these are discussed below).

- Pointer to a bitmap indicating which buffers are currently full. This is used as a private communication area between the psubqry and its parent.

A psubqry is able to perform the following tasks:

1) Initial open, which includes connecting to ORACLE (or finding an unused connection in the connections pool, if and when this is implemented) and preparing and opening a cursor.

2) Re-open, to bind new host parameter values to the cursor (ORACLE supports successive opens without an intervening close.) This implies resetting all bits in the full/empty bitmap to *empty*, and restarting the round-robin with the first buffer.

3) Close, which includes closing a cursor, disconnecting from ORACLE (or putting the session in the free connections pool), and terminating the parallel thread.

4) Fetch-ahead.

The first of these tasks, initial open, is performed automatically when the parallel thread for a pcursor is started. The broadcast command will initially be *fetch-ahead*. The psubqry will continue to fetch ahead as long as it has free buffers, but will check the broadcast command between fetches. If the broadcast command changes to *re-open*, the psubqry will re-open its cursor and then resume fetching. If the broadcast command changes to *close*, the psubqry will close itself.

In rough terms, the handoff of data rows from the psubqry to its parent works as follows: All bits in the full/empty bitmap are initialized to *empty*. The psubqry places rows in buffers in round-robin sequence, setting the flag for each buffer to *full* after it fills that buffer, until it reaches a buffer whose bit is already set to *full*. The parent removes rows from buffers in the same round-robin sequence, but does not attempt to remove a row from a buffer until that buffer's full/empty bit is set to *full*. After removing a row from a buffer, the parent resets that buffer's bit to *empty*. (Details of how to avoid busy waits when the psubqry "laps" the parent, or vice-versa, remain to be determined.) Note that the parent needs a persistent next-ready-row placeholder, which we have defined as an element in the parent's array of psubqry information, because the parent can return to its caller between fetches. The psubqry itself, on the other hand, never returns until it closes itself, so its round robin placeholder can be a local automatic variable.

Algorithm for Decomposing a Query

1) Call EXPLAIN (generate plan, don't read it yet)

a) Any errors? If so, return them (Assume query was illegal. Actually, error may be that query referenced a view not owned by the user, which could be fixed by expanding view and trying again, but for now we don't handle that case. Fortunately, EXPLAIN will give back parse errors, if any, and will only complain about views if query was otherwise legal.)

2) Parse the query. (There should be no errors here, if EXPLAIN was happy. But if there are any, return them.)

3) Is query legal to decompose? (PHASE 1)

Any FOR UPDATE, NOWAIT, CONNECT BY, START WITH sequence references (i.e. stuff we can identify just from syntax)? If so, return error.

4) Do semantic analysis of query: resolve synonyms, identify views, associate columns with tables, get datatype, length, precision, and scale of columns. (In general there should be no errors here. But if any system tables were referenced without authid, they won't be found. That's an ok error, because these would all tend to be join views which we can't handle anyway.)

5) Is query legal to decompose? (PHASE 2) Any views?

6) Analyze EXPLAIN information. Determine join order, types of joins, whether each table was retrieved by index (possibly index only). (Possible error at this stage: self-join where one or more instance of a table was retrieved by index only might lead to ambiguous join plan. That's an ok error if the index-only table would have been the driving table, because there's no point partitioning on an index-only table: indexes aren't partitioned.)

7) Can query be effectively decomposed?

(If user specified PARTITION, skip this step. If user specified PARTITION=table, and table is not driving table of join, go ahead anyway (?) - or do we want to rework the FROM clause to get ORACLE to use user's choice as driving table?)

a) Identify driving table in join (table with join_pos 1).

(Note: there may be cases where we want to second-guess the optimizer but for now, let's assume optimizer picked correct driving table.)

b) If it is retrieved index-only, no point in partitioning on it, so no point decomposing.

c) Else, retrieve its number of partitions. If only 1, no point decomposing.

d) (Any other reasons why decomposition would be considered ineffective?)

8) Choose degree of partition

Degree of partition = min (driving table partitions, effective number of parallel processes), where effective number of parallel processes = number of available processors times effective number of processes per processor.

NOTE on checking for queries which cannot be decomposed correctly and/or effectively: some causes of this (e.g. distinct aggregates) could be noted early in parsing, and we could abort at that point. I have chosen instead to complete parsing and then check for correctness, because we will gradually expand the set of cases we can handle, and I don't want to scatter special case code all over the place which will become redundant. I wanted to make sure that all legal ORACLE syntax could at least make it through the parser ok. If users really want to avoid the slight extra overhead of our completing the parse before checking, they can use the NOPARTITION directive on queries they know won't be decomposed anyway. We don't yet, but can add code to check for this directive up front, prior to performing a full parse.

Supporting QD for Queries with both GROUP-BY and ORDER-BY Clauses

I.  The Problem

SQL queries are permitted to have both a GROUP-BY clause and an ORDER-BY clause, as in the following example:

```
SELECT DNO, COUNT(*) FROM EMP
GROUP BY DNO
ORDER BY 2
```

This means that each result row consists of a DNO value and a count of the number of rows with that DNO value, and the result rows are ordered by that count. This requires an additional sort of the result rows, beyond the sort that was implicitly done on the GROUP-BY columns in order to do the grouping.

QD is currently able to merge-sort already-sorted input streams from parallel subqueries (to support the ORDER-BY clause without GROUP-BY), and is able to delimit groups in its merged stream and perform aggregates on those groups (to support GROUP-BY without ORDER-BY). But ORDER-BY on top of GROUP-BY requires sorting an entire stream of rows (namely, the result rows of the GROUP-BY query as they would be ordered without the ORDER-BY clause) into a completely different order (as opposed to merging pre-sorted streams). This is a capability that QD does not currently support.

QD support for queries containing both ORDER-BY and GROUP-BY clauses has been listed on the "deferred beyond P1" features list for over a year. However, presence of both of these clauses in 3 of the 8 benchmark queries from a U.K. bank has raised the question of whether this feature should be implemented for the initial alpha release of QD (i.e. immediately).

DBN #36, "Parallel Cursor Building Blocks", sketches the design solution to this problem: an additional type of QD building block called a "SORT" building block would be incorporated into the pcursor combining tree above the AGGREGATE building block and below the ROOT:

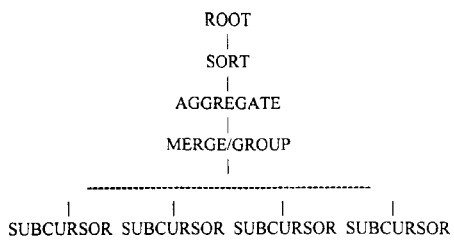

(DBN #36 showed the MERGE and GROUP as separate building blocks, but their functionality was collapsed into a single building block in the actual implementation.)

The SORT building block would be responsible for sorting its input stream of rows into the order specified by the query's ORDER-BY clause. Since the number of groups can be arbitrarily large, the SORT bb would need to be able to temporarily store an arbitrary number of rows, which requires either a full-blown sort utility, or (as proposed here) use of a temporary ORACLE table, with a combining query used to retrieve rows from that table in the desired order.

II. Complications

The example queries from the U.K. bank, based (presumably) on an IBM dialect of SQL, specify ORDER-BY columns by column number (as in the above example). This means the sort columns are always columns of the result rows of GROUP-BY, without any additional computations or transformations. Sorting in such case would be "simply" a matter of defining an intermediate table with the same format as the result rows of GROUP-BY, inserting those rows in that table, and retrieving them with a combining query that has the same ORDER-BY clause as the original query.

ORACLE, however, supports ordering by arbitrary expressions, and by columns not mentioned in the SELECT LIST of the query, and this applies to queries with both ORDER-BY and GROUP-BY clauses. For example, the following query is legal in ORACLE SQL:

```
SELECT DNO, COUNT(*) FROM EMP
GROUP BY DNO
```

- 144 -

ORDER BY AVG(SALARY)

The result of this query is ordered by the average salaries of departments, but the average salaries are not visible in the result rows. The following is also legal:

SELECT DNO
GROUP BY DNO
ORDER BY MAX(SALARY) - MIN(SALARY)

This query orders department numbers according to their salary range; the ORDER-BY column is an expression on aggregates neither of which are visible in the query result.

Supporting all of the legal ORACLE combinations of ORDER-BY and GROUP-BY clauses requires much more in the way of query transformations than supporting the standard SQL capabilities called for in the Bank's queries. However, supporting the minimal capabilities needed for the Bank's queries, while gracefully declining to decompose the ORACLE-extended cases, might require a significant amount of query-analysis logic which would be throw away code, assuming that we ultimately support all the cases supported by ORACLE. It would also introduce a more subtle and complex restriction to be explained to users, than the simple rule that queries with both ORDER-BY and GROUP-BY clauses can't be decomposed.

In the general interests of ongoing QD development, it would be best to introduce full support for combined ORDER-BY/GROUP-BY queries as one integrated new feature-set, rather than introducing the support piecemeal. It will have to be decided whether the Bank's benchmark presents sufficiently urgent priorities to consider a short term minimal solution that may cost more in the long run.

III. Design

A.  SORT Building Block

The QD SORT building block is structurally similar to the AGGREGATE building block: it has QD-generated SQL statements to create a temporary sort table, insert rows in that table, select rows in sorted order from that table, and drop the table when it is finished with it. It also has select and bind descriptors for the combining query, and a descriptor of the input rows from its child building block. The significant differences from the AGGREGATE bb are:

1)   The SORT bb does' t need a DELETE statement, because it only fills the temporary table once, unlike the AGGREGATE bb, which fills its table once for each group.

2)   The AGGREGATE bb uses a simple SELECT statement to combine results from its intermediate table, because for each group of rows inserted, it only needs to fetch a single aggregate row. The SORT bb needs to open a cursor for its combining query, and then needs to use a separate FETCH statement to fetch rows from that cursor.

B.   Query Transformations

DBN #39, "Select List Transformations Used in Query Decomposition", details the transformations that are currently supported in generating parallel subqueries from an input query. Internal transformations used in generating intermediate table definitions and combining queries are discussed in the on-line document qd/notes/transforms. Support for combined GROUP-BY and ORDER-BY clauses requires the following additional transformations:

1)   If an aggregate expression is mentioned in the ORDER-BY clause which is not mentioned in the SELECT list, it must be added to the SELECT list of the parallel subqueries. If the aggregate function is AVG, STDDEV, or VARIANCE, it must undergo the same transformations currently required for those functions (i.e. decomposing them into SUM, COUNT, and/or SUM(SQR) functions from which weighted aggregates can be computed). (This is similar to the currently-supported case of a HAVING clause mentioning an aggregate function not mentioned in the SELECT list).

2)   The CREATE TABLE statement for creating the temporary sort table must define columns for all of the columns in the input query's SELECT list, as well as all GROUP-BY columns (which may have been omitted from the SELECT list), and any aggregate functions which are mentioned in the ORDER-BY clause (which may have been omitted from the SELECT list).

3) The CREATE TABLE statement for creating the intermediate table used by the AGGREGATE bb must include columns for any aggregate functions mentioned in the ORDER-BY clause which were not mentioned in the SELECT list. The combining query for the AGGREGATE bb must perform the final weighted aggregates for these expressions.

Query transformations are not actually performed by directly manipulating query text; a complex internal data structure called the Column Map is used to track the transformations, positions, and interdependencies of column expressions in the various SQL statements and intermediate result formats generated by QD; the SQL text for the parallel subqueries, combining queries, and other supporting statements is then generated from the Column Map and the internal parse tree. The Column Map structure will need new attributes to track expressions in the SQL statements used by the SORT bb (precise details to be determined).

IV. Performance Implications

A. Fixed overhead per query:

An additional intermediate table must be generated and dropped. This can add up to around 4 seconds extra startup overhead, and 4 seconds extra cleanup overhead, per query, for a total of up to 8 seconds extra overhead per query (based on measured overhead of the AGGREGATE building block).

B. Variable cost:

Each result row must be inserted into the temporary sort table, and result rows must then be retrieved from the temporary sort table. This cost will vary depending on the number of result rows, but may be worse than around 0.1 seconds per row (which is our measured insert rate for ORACLE). However, for a given query, the insert component of this cost should be only a small fraction (approximating 1/degree-of-partitioning) of the cost of inserting rows in the AGGREGATE bb's intermediate table.

Explaining Decomposed Queries

1. Basic plan: If query won't get decomposed (either illegal or ineffective, or because of directive), generate normal explain plan Else, generate plan where row with id 1 describes the decomposition, and subsequent rows are the ORACLE-generated explain plan for one of the parallel subqueries, but with their id incremented by one to make room for the qd row. 2. Contents of QD row:

Operation KSR PARALLEL EXECUTION Options UNION ALL, MERGE, or AGGREGATION ID 1 Object name: name of partitioning table object owner: owner of partitioning table Search columns(?): degree of partition (optional: put the parallel subquery in the "other" field) 3. Strategy:

a) Check whether SQL statement we've been passed begins "EXPLAIN" (I think we could live with the restriction that there can't be a leading comment). If so, skip the usual call to EXPLAIN, and go straight to calling our parser.

b) Our parser will parse the whole statement (the EXPLAIN statement, as well as the query to be explained), and attach the plan-table name and statement-id to the qdef structure. (If plan-table wasn't supplied, we just use "plan_table". If statement-id wasn't supplied, we must generate a unique one, just as we do when explaining the query for our own purposes, so that we can find rows of the generated plan in order to fix up their id's - then we will set the statement-id of those rows to null.)

c) Proceed with normal QD as far a qgen. If it turns out we can't decompose this query, return the appropriate warning or error, which will cause pupiosq to fall through to upiosq and explain the query in its usual manner.

d) Else (we do want to decompose the query), explain the generated parallel subquery: create an explain statement similarly to the way we do for the input query, but do it for the parallel subquery instead.

e) Generate the plan row with id 1 and other attributes describing decomposition, as listed above. Fetch from the plan table all rows with the appropriate statement-id, and increment their id by 1 (also, set their statement-id to null if we were using an auto-generated statement-di). Then insert our row with id 1 into the plan table.

f) Return success. (Note - don't commit. It's up to the caller of EXPLAIN to commit, as with any other dml statement.)

2. Issues a) The above strategy breaks our usual rule of "clearing" statements through explain before passing them to our parser. This means we'd have to be robust to syntax errors in the explain statement.

b) Explain can be used for statements other than SELECT. The above strategy would leave it up to our parser to figure out the statement isn't a select statement.

c) Alternate strategy: Up front, search for "SELECT" in query string. If not found, return immediately, causing fallthrough to upiosq. Else, call explain STARTING FROM there, but then, if EXPLAIN is happy, start parsing from beginning. That way, we solve the problem of how to get the select statement itself into explain, which we'll need to do to decompose it, and also we only have to be robust to syntax error in the explain statement itself, not in the select statement. (Of course, to do this right we must allow for the possibility of comments within the sql statement).

d) EXPLAIN won't currently let us use the psq as the base query to explain, because it won't accept queries containing host variable references, which the psq has. Substituting literals won't help, because then we can't be certain ORACLE will choose the same plan. Just as good an approximation can be achieved by using the original input query, which is what I've settled for, at least for now.

3. Dummy pcursor

Pro*C generates sqllib calls which in turn make three relevant upi calls for an EXPLAIN statement: upiosq, upiexn, and upicls. For a query which would be decomposed, we do all the actual work in upiosq. However, we have to put a dummy pcursor structure in the list of pcursors, so that when upiexn or upicls is called for this cursor number, we can spot that this is neither an actual opened, decomposed cursor, nor an ORACLE: cursor that we should allow to fall through. In upiexn, we will simply return success, pretending to have done the job we actually already did in upiosq. In upicls, we will deallocate the dummy cursor structure, and remove it from the list.

Rather than add an extra flags field to the pcursor just for this one rather kludgy purpose, I have simply defined an alternate checkstring, QDCK_DUMMY, in place of QDCK_PCUR. (This could also potentially be used to do double duty in other structures that require dummy versions.)

Note that this should all be ok, because the three calls all expand from a single SQL explain statement, so there's no way the user could legitimately have stuck other code in between, such that our moving the real work to upiosq would change the behavior. This should be tested with SQL*Plus, though, when integrated with that product.

Decomposing Queries Over Views - Issues and Options
(Database Note #55)

1 Matrix of Problem Cases and Partial Solutions

We have examined a number of possible partial solutions to the general problem of decomposing queries over views. Some of these are self-contained solutions for certain classes of cases, but must be accompanied by other partial solutions to work for other classes of cases. Some more specific partial solutions would be obviated by other more general solutions.

To help sort out the interrelationships of the various problem cases and partial solutions, let us first list the basic parameters by which the problem classes vary, and assign numbers to them:

1) View refers to tables or views to which the user lacks direct access: yes/no

2) View owned by someone other than the current user: yes/no

3) View contains joins (and underlying ROWIDs are not in view query's SELECT list): yes/no 4) View contains the driving table of the join for the user's query: yes/no 5) View contains aggregation, grouping, distinct, or set operations: yes/no > (We have seen that views may also vary according to whether a join predicate is used to enforce row-level data hiding, but this has been omitted here since it does not vary independently of the others, and since it only affects the user workaround of intermediate views, to which we have already raised several objections.)

These parameters of variation have each been phrased so that the positive ("yes") case is the potential problem case. A query with all five parameters negative presents no special problems for query decomposition.

Now let us list the partial solutions we have considered, and assign letters to them:

A) Relax restrictions on EXPLAINing queries over views

B) Make ROWIDs visible through views with joins

C1) Move query *decomposition*, but not *execution*, inside ORACLE kernel (or functional equivalent)

C2) Move query decomposition *and* parallel execution inside ORACLE kernel (or functional equivalent)

D1) *Decompose* queries through DBA-privileged connection, but *execute* them through user connection D2) Decompose *and* execute queries through DBA-privileged connection (*or* run application as DBA, which is functionally equivalent for purposes of this discussion)

E) Perform full view expansion during query decomposition (To simplify the following discussion, the user workaround of explicitly including ROWIDs of underlying tables as visible view columns is not included here; parameter 3 has been phrased in such a way as to obviate it. The user workaround of defining intermediate single table views has also been omitted here, since our previously-raised objections rule it out as a desirable approach.)

On the following page is a matrix of combinations of positive parameter values which present problems, and combinations of partial solutions which address those problems. Each column represents a particular combination of positive parameter values, a *preferred* combination of partial solutions, and a *workable* alternative combination of partial solutions (where applicable).

Let us first examine the cases in which one problem parameter is positive while the rest are negative, and then examine various combinations of positives. The only single-parameter cases which introduce problems are those in which parameters 1 or 2 alone are positive.

Case 1: View refers to tables or views to which the user lacks direct access (parameter 1 positive).

With all other parameters negative, we can assume that ROWIDs of the underlying table are visible through the view, so parallel subqueries executable by the user can be generated without recourse to full view expansion. However, we must retrieve the file IDs of a table to which the user lacks access, which requires either the ORACLE solution of permitting query decomposition to run as privileged code (i.e. inside the kernel - solution C1); the KSR solution of using a separate, DBA-privileged connection for query decomposition (solution D1); or the user workaround of running the application as DBA. Since the parallel subqueries would be executable by the user, only the decomposition process (or portions thereof) would need to have special privileges; moving this inside the ORACLE kernel would be our peferred solution, since it is the only transparent solution from the user's perspective.

Case 2: View owned by someone other than the current user (parameter 2 positive).

With parameter 1 negative, the user could have executed the view's query directly, and there is no problem accessing dictionary information about underlying objects. ORACLE relaxing the restriction on EXPLAINing queries which refer to views not owned by the current user (solution A) would be a complete, self-contained solution for this class of queries. KSR expanding the view (solution E) would also be a workable solution in this case, but would probably require more performance overhead than the ORACLE solution.

Now let us examine various combinations of positive parameters. Let us begin with cases in which parameter 1 is positive, since this introduces the most difficult problems. This always requires that at least portions of the query decomposition process execute with greater privileges than those of the current user, but does not in itself require that the resulting parallel subqueries be executed with special privileges; therefore the preferred solution is to move the query decomposition process (or the necessary portions of it) inside the ORACLE kernel (solution C1), and the fallback workable solution is to use a DBA-privileged connection for query decomposition, while using the user's connection for query execution (solution D1). If parameter 2 (view owned by another user) is also positive (case 3), we would also need to relax the restriction on EXPLAINing queries referring to views not owned by the user (solution A), because we wish to avoid view expansion in the parallel subqueries, so that they can execute with the user's privileges. (It is possible that moving query decomposition inside the kernel would provide equivalent functionality to relaxing the EXPLAIN restriction as a byproduct, if we could examine kernel structures directly to determine optimizer strategy.) Without relaxing the EXPLAIN restriction, we would need to completely expand the view (solution E), and would need to both decompose and execute the query with special privileges, by one of the methods previously discussed (solutions C2 or D2). Again, of these methods, moving the entire query decomposition and parallel execution process inside the kernel is the only one which would be transparent to users and would not introduce potential security loopholes by requiring stored passwords.

A similar scenario results (case 4) if parameters 3 and 4 are positive along with parameter 1 (a view containing joins contains the driving table of the user's query; either of parameters 3 and 4 present no special problem if the other is negative). If ORACLE supports extended syntax to make ROWIDs visible through views with joins (solution B), then that plus decomposing queries with special privileges (solutions C1 or D1) would solve this class of cases. Otherwise, since the parallel subqueries would require full view expansion (solution E), both decomposition and execution would require special privileges (solutions C2 or D2). If all 4 of the first four parameters are positive (case 5), then the options are: relax EXPLAIN restriction, make ROWIDs visible for join views, and decompose with special privileges (solutions A, B, and C1 or D1); or perform full view substitution, and decompose and execute with special privileges (solutions E and C2 or D2).

If a positive parameter 1 is combined with positive parameters 4 and 5 (case 6: the driving table of the join is contained in a view which contains aggregation, grouping, distinct, or set operations; either of parameters 4 and 5 present no special problem if the other is negative), then in general full view expansion cannot be avoided. In some cases such queries are simply not amenable to query decomposition. In the remainder, special privileges are required both for decomposition and execution. Therefore, relaxing the EXPLAIN restriction is not essential (even if parameter 2 is positive - case 7), and making ROWIDs visible through views with joins is unnecessary, even if the view also contains a join (we need to expand it anyway).

When parameters 4 and 5 are positive, full view expansion will in general always be necessary, and some cases will simply be non-decomposable. With parameter 1 negative (case 8), no other special support is required; a positive parameter 3 is irrelevant since expansion is already necessary; and if parameter 2 is positive (case 9), relaxing the EXPLAIN restriction would be helpful but not essential.

When parameters 3 and 4 are positive with all others negative (case 10: view contains joins, and contains driving table of user's query), making ROWIDs visible through views with joins and view expansion are each complete solutions, with the former being preferable because it requires less performance overhead. When parameters 2, 3, and 4 are positive (case 11: same as case 10, but with a view not owned by the user), then either complete view expansion is needed, or the EXPLAIN restriction must be relaxed and ROWIDS made visible; in this case, view expansion may be the simpler solution.

2 Conclusion

If we wish to support query decomposition for all of those queries over views which are theoretically capable of benefiting from decomposition, then we have seen from the matrix above that to cover the worst cases, both query decomposition and query execution must be performed with greater privileges than those of the user whose query we are decomposing (solutions C2 or D2); and KSR must support full view expansion (solution E). In this event, other possible solutions, while in some cases helpful, would be non-essential. The preferred approach to decomposing and executing with greater privileges would be one which is transparent to users and does not introduce any security loopholes: moving query decomposition and parallel execution inside the ORACLE kernel (solution C2), or a functionally-equivalent solution yet to be proposed.

Since security enforcement is one of the primary practical functions of views in SQL, we must assume that cases involving underlying objects not owned by or directly accessable by the user represent an important class of cases to many of our potential customers. Cases of views containing complex constructs such as aggregates and grouping may be less critical. If we aim to support decomposition for the former but not the latter (i.e. support cases 1-5, 10, and 11, but not 6-9), then the ideal solution is to decompose queries with special privileges, but execute with the user's privileges (solutions C1 or D1), thereby avoiding the need for full view expansion and avoiding any risk of mistakenly being too permissive in the role of surrogate security-enforcers. (As with solutions C2 and D2, solutions C1 and D1 are equivalent in terms of the queries they enable to be decomposed, but C1 is preferable to D1 because it is transparent to users and safer from a security standpoint, because D1 requires a stored decryptable password.) This also requires ORACLE making ROWIDs visible through views with joins (solution B), since otherwise complete expansion and privileged execution is necessary in general.

The preceding discussion leads to the conclusion that relaxing ORACLE's restriction on EXPLAINing queries over views not owned by the current user (solution A) is only strictly necessary if we aim to support cases where the user does not own the view, but not cases where the user lacks access to the view's underlying objects. Relaxing the EXPLAIN restriction may be deemed desirable for its own sake, since it would make EXPLAIN a more useful tool in more cases, in particular to DBAs. It would also be helpful to query decomposition in many cases where it is not essential, and would provide more options in devising a phased approach to supporting various classes of view queries across multiple releases of query decomposition. Nevertheless, it is a lower-priority ORACLE change, from our point of view, than making ROWIDs visible through views with joins, or facilitating the execution of query decomposition code with special privileges.

We claim:

1. A database query system configured for use with a database management system, said database management system including a standard interface configured to receive database queries, the query system comprising:
   a parallel interface configured to receive a first database query; and
   a query decomposer configured to:
      detect a decomposition directive corresponding to the received database query;
      generate a plurality of subqueries from the received first database query, wherein said subqueries correspond to said directive; and
      convey said plurality of subqueries in parallel to the standard interface of the database management system;
   wherein said directive is embedded within a comment.

2. The system of claim 1, further comprising a result assembler configured to:
   receive results from said database management system generated in response to said subqueries; and
   generate an assembled result representative of a response to said first database query.

3. The system of claim 1, wherein said first database query is directed to said standard interface, and wherein receiving the first database query by the parallel interface comprises intercepting the first database query.

4. The system of claim 1, wherein said decomposer is configured to generate said subqueries in response to detecting said first database query is decomposable.

5. The system of claim 4, wherein said decomposer is further configured to route a second database query received by said parallel interface directly to said standard interface without decomposing said second database query, in response to determining said second database query is non-decomposable.

6. The system of claim 1, wherein the database management system is coupled to a database comprising multiple partitions, each of said partitions being independently accessible.

7. The system of claim 1, wherein generating said plurality of subqueries comprises generating a separate thread corresponding to each of said subqueries.

8. The system of claim 7, wherein each thread of said threads corresponding to said subqueries is executed in parallel on separate processors.

9. A computer system comprising:
   a processor;
   a storage element; and
   a database system configured to:
      receive a first database query;
      detect a decomposition directive corresponding to the received database query;
      generate a plurality of subqueries from the received first database query, wherein said subqueries correspond to said directive; and
      convey said plurality of subqueries in parallel to a database management system;
   wherein said directive is embedded within a comment.

10. The system of claim 9, further comprising a result assembler configured to:
    receive results from said database management system generated in response to said subqueries; and
    generate an assembled result representative of a response to said first database query.

11. The system of claim 9, wherein said first database query is directed to said standard interface, and wherein receiving the first database query by the parallel interface comprises intercepting the first database query.

12. The system of claim 9, wherein said decomposer is configured to generate said subqueries in response to detecting said first database query is decomposable.

13. The system of claim 12, wherein said decomposer is further configured to route a second database query received by said parallel interface directly to said standard interface without decomposing said second database query, in response to determining said second database query is non-decomposable.

14. The system of claim 9, wherein the database management system is coupled to a database comprising multiple partitions, each of said partitions being independently accessible.

15. The system of claim 9, wherein generating said plurality of subqueries comprises generating a separate thread corresponding to each of said subqueries.

16. The system of claim 15, wherein each thread of said threads corresponding to said subqueries is executed in parallel on separate processors.

17. A computer system comprising:
    a processor;
    a storage element; and
    a database system configured to:
       receive a first database query;
       detect a decomposition directive corresponding to the received database query;
       generate a plurality of subqueries from the received first database query, wherein said subqueries correspond to said directive; and
       convey said plurality of subqueries in parallel to a database management system.

18. The system of claim 17, wherein said database system comprises a query decomposer coupled to said database management system, wherein said query decomposer is configured to receive said first database query and generate said subqueries.

19. The system of claim 18, wherein said database system further comprises a result assembler configured to:
    receive results from said database management system generated in response to said subqueries; and
    generate an assembled result representative of a response to said first database query.

20. A computer readable medium comprising program instructions configured to perform database operations, said program instructions executable to:
    receive a first database query;
    detect a decomposition directive corresponding to the received database query;
    generate a plurality of subqueries from the received first database query, wherein said subqueries correspond to said directive; and
    convey said plurality of subqueries in parallel to a standard interface of a database management system;
    wherein said directive is embedded within a comment.

21. The system of claim 18, wherein said decomposer is configured to generate said subqueries in response to detecting said first database query is decomposable.

22. The system of claim 21, wherein said decomposer is further configured to route a second database query directly to said database management system without decomposing said second database query, in response to determining said second database query is non-decomposable.

23. The system of claim 17, wherein the database management system is coupled to a database comprising multiple partitions, each of said partitions being independently accessible.

24. The system of claim 23, wherein said database comprises data stored on said storage element.

25. The system of claim 23, wherein said database comprises data stored on a plurality of storage elements, each said partition corresponds to a separate storage element of said plurality of storage elements.

26. The system of claim 17, wherein generating said plurality of subqueries comprises generating a separate thread corresponding to each of said subqueries.

* * * * *